US008264405B2

(12) United States Patent
Pozgay

(10) Patent No.: US 8,264,405 B2
(45) Date of Patent: Sep. 11, 2012

(54) METHODS AND APPARATUS FOR RADIATOR FOR MULTIPLE CIRCULAR POLARIZATION

(75) Inventor: Jerome H. Pozgay, Marblehead, MA (US)

(73) Assignee: Raytheon Company, Waltham, MA (US)

( * ) Notice: Subject to any disclaimer, the term of this patent is extended or adjusted under 35 U.S.C. 154(b) by 326 days.

(21) Appl. No.: 12/533,185

(22) Filed: Jul. 31, 2009

(65) Prior Publication Data

US 2010/0033376 A1 Feb. 11, 2010

Related U.S. Application Data

(60) Provisional application No. 61/085,134, filed on Jul. 31, 2008, provisional application No. 61/085,142, filed on Jul. 31, 2008.

(51) Int. Cl.
*H01Q 21/06* (2006.01)
*H01Q 21/24* (2006.01)
*H04B 7/10* (2006.01)

(52) U.S. Cl. .......................................................... 342/363

(58) Field of Classification Search .................. 342/363
See application file for complete search history.

(56) References Cited

U.S. PATENT DOCUMENTS

| | | | | |
|---|---|---|---|---|
| 3,599,216 | A * | 8/1971 | Paine et al. | 343/771 |
| 3,836,973 | A * | 9/1974 | Shnitkin et al. | 342/362 |
| 4,189,683 | A | 2/1980 | Fassett et al. | |
| 4,590,480 | A * | 5/1986 | Nikolayuk et al. | 343/771 |
| 4,771,247 | A * | 9/1988 | Jacomb-Hood | 330/277 |
| 4,978,965 | A * | 12/1990 | Mohuchy | 343/727 |
| 5,061,943 | A * | 10/1991 | Rammos | 343/770 |
| 5,124,711 | A * | 6/1992 | Sorais et al. | 342/361 |
| 5,163,176 | A | 11/1992 | Flumerfelt et al. | |
| 5,172,128 | A * | 12/1992 | Bouko et al. | 343/797 |
| 5,173,702 | A | 12/1992 | Young et al. | |
| 5,184,137 | A | 2/1993 | Pozgay | |
| 5,185,608 | A | 2/1993 | Pozgay | |
| 5,283,587 | A * | 2/1994 | Hirshfield et al. | 342/372 |
| 5,504,493 | A * | 4/1996 | Hirshfield | 342/372 |
| 5,675,345 | A | 10/1997 | Pozgay et al. | |
| 6,087,988 | A | 7/2000 | Pozgay | |
| 6,320,541 | B1 | 11/2001 | Pozgay et al. | |
| 6,593,876 | B2 * | 7/2003 | Shuch | 342/351 |
| 6,633,253 | B2 * | 10/2003 | Cataldo | 342/25 R |
| 6,961,016 | B1 | 11/2005 | Pozgay | |
| 7,015,857 | B1 | 3/2006 | Pozgay | |
| 7,079,815 | B2 | 7/2006 | Pozgay et al. | |
| 7,183,969 | B2 | 2/2007 | Pozgay et al. | |
| 7,242,350 | B1 | 7/2007 | Pozgay | |
| 7,387,958 | B2 | 6/2008 | McCarroll et al. | |
| 2005/0007286 | A1 * | 1/2005 | Trott et al. | 343/770 |
| 2008/0204343 | A1 * | 8/2008 | Kildal | 343/792.5 |
| 2009/0073072 | A1 * | 3/2009 | Lindenmeier et al. | 343/810 |
| 2011/0122016 | A1 * | 5/2011 | Lomes et al. | 342/174 |

OTHER PUBLICATIONS

Ellis, Mike, "The Magic-Tee", copyright 1999.*

* cited by examiner

*Primary Examiner* — Jack W Keith
*Assistant Examiner* — Frank J McGue
(74) *Attorney, Agent, or Firm* — Daly, Crowley, Mofford & Durkee, LLP

(57) ABSTRACT

Method and apparatus for a receive electronically steered array aperture including a plurality of radiators each having a single complex phase/amplitude control at a radiating phase center of the radiators to simultaneously receive up to four circularly polarized plane waves, each of the plane waves being arbitrarily of left hand circular polarization or right hand circular polarization, from spatially diverse sources.

14 Claims, 60 Drawing Sheets

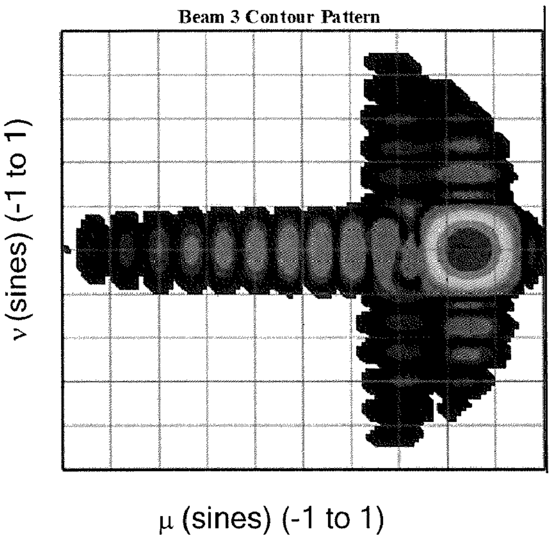
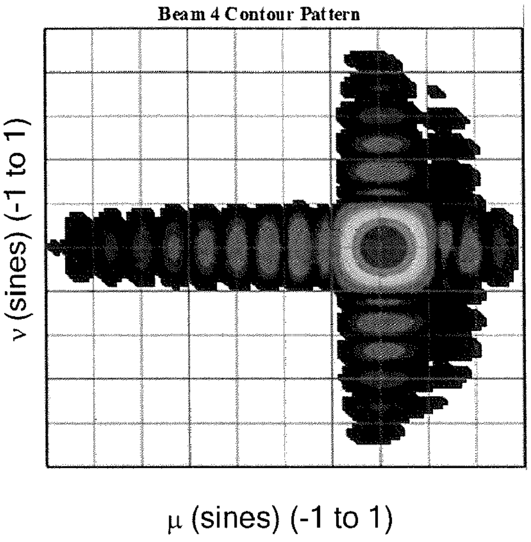
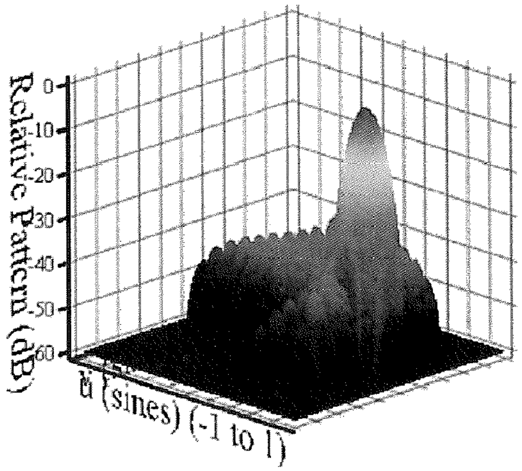
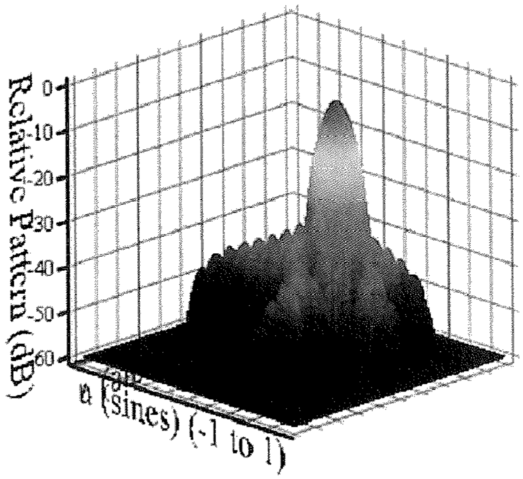
*FIG. 13B*

Beam 1 Contour Pattern

——— Through Beam Peak
········ Through Beam 1 Location
------ Through Beam 3 Location ——— Through Beam Peak
········ Through Beam 1 Location
------ Through Beam 3 Location $\mu_1 = -0.284$ $v_1 = -0.313$ $f_1 = 20.40$ GHz A = 17.816 in.

$\mu_2 = -0.304$ $v_2 = -0.310$ $f_2 = 20.70$ GHz B = 4.454 in.

$\delta x = 0.278$ in.

$\delta y = 0.139$ in.

$D_2 = 32.22$ dB $m^T = (0\ \ 2.4\ \ 2.4\ \ 1.7)$ $m'^T = (0\ \ 2.4\ \ 0\ \ 1.7)$

Beam 1 Produced with Rectangular Aperture

Beam 2 Contour Pattern

——— Through Beam Peak
········ Through Beam 1 Location
------ Through Beam 3 Location ——— Through Beam Peak
········ Through Beam 1 Location
------ Through Beam 3 Location $\mu_1 = -0.284$ $\nu_1 = -0.313$ $f_1 = 20.40$ GHz A = 17.816 in.

$\mu_2 = -0.304$ $\nu_2 = -0.310$ $f_2 = 20.70$ GHz B = 4.454 in.

$\delta x = 0.278$ in.

$D_2 = 32.22$ dB $m^T = (0\ \ 2.4\ \ 2.4\ \ 1.7)$ $m'^T = (0\ \ 2.4\ \ 0\ \ 1.7)$

Beam 2 Produced with Rectangular Aperture

Beam 2 Contour Pattern

| | | | |
|---|---|---|---|
| $\mu_1 = -0.284$ | $\nu_1 = -0.313$ | $f_1 = 20.40$ GHz | A = 17.816 in. |
| $\mu_2 = 0.304$ | $\nu_2 = -0.310$ | $f_2 = 20.70$ GHz | B = 4.454 in. |
| $\mu_3 = -0.501$ | $\nu_3 = -0.289$ | $f_3 = 20.25$ GHz | $\delta x = 0.178$ in. |
| $\mu_4$ = ▪ | $\nu_4 = 0.500$ | $f_4 = 20.85$ GHz | |

$D_2 = 32.12$ dB $m^T = (0\ \ 2.4\ \ 2.4\ \ 1.7)$ $m'^T = (0\ \ 2.4\ \ 0\ \ 1.7)$

Heavily Weighted Beam has Low Sidelobe Content

Beam 1 Contour Pattern

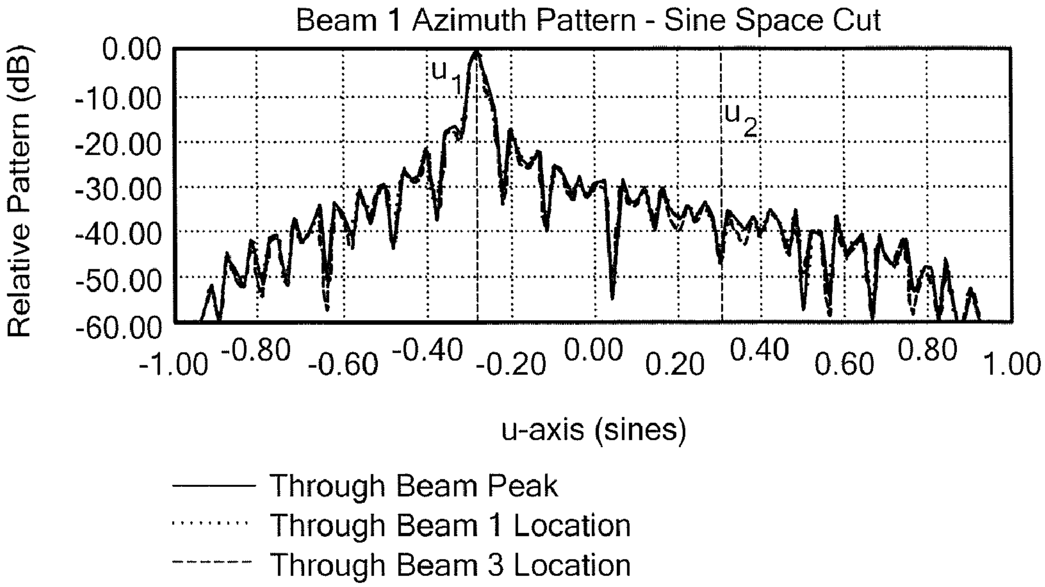
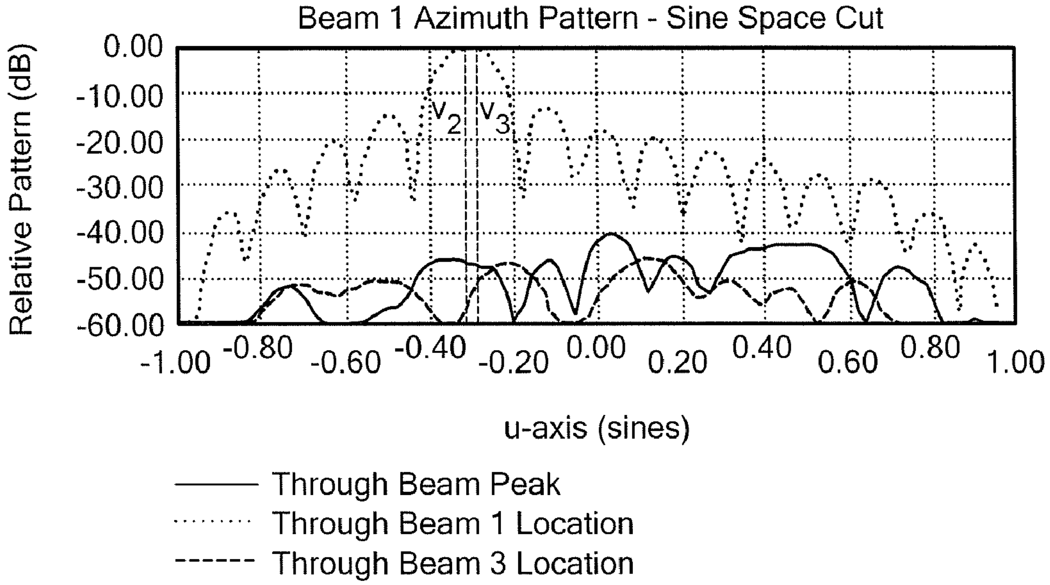
$\mu_1 = -0.284$ $\nu_1 = -0.313$ $f_1 = 20.40$ GHz A = 17.816 in.
$\mu_2 = 0.304$ $\nu_2 = -0.310$ $f_2 = 20.70$ GHz B = 4.454 in.
$\mu_3 = 0.501$ $\nu_3 = -0.289$ $f_3 = 20.25$ GHz $\delta x = 0.178$ in.
$\mu_4 = 0.500$ $\nu_4 = 0.500$ $f_4 = 20.85$ GHz
$D_2 = 32.12$ dB $m^T = (0\ \ 2.4\ \ 2.4\ \ 1.7)$ $m'^T = (0\ \ 2.4\ \ 0\ \ 1.7)$
Unweighted Beam
*FIG. 17B*

Beam 3 Contour Pattern $\mu_1 = -0.284$ $\nu_1 = -0.313$ $f_1 = 20.40$ GHz A = 17.816 in.

$\mu_2 = 0.304$ $\nu_2 = -0.310$ $f_2 = 20.70$ GHz B = 4.454 in.

$\mu_3 = 0.501$ $\nu_3 = -0.289$ $f_3 = 20.25$ GHz $\delta x = 0.178$ in.

$\mu_4 = -0.284$ $\nu_4 = -0.313$ $f_4 = 20.85$ GHz $D_2 = 32.17$ dB $m^T = (0\ 2.4\ 2.4\ 1.7)$ $m'^T = (0\ 2.4\ 0\ 1.7)$

Beam is Heavily Weighted Beam
in One Plane and Unweighted in the Other

Beam 4 Contour Pattern $\mu_1 = -0.284$ $\nu_1 = -0.313$ $f_1 = 20.40$ GHz A = 17.816 in.

$\mu_2 = 0.304$ $\nu_2 = -0.310$ $f_2 = 20.70$ GHz B = 4.454 in.

$\mu_3 = 0.501$ $\nu_3 = -0.289$ $f_3 = 20.25$ GHz $\delta x = 0.178$ in.

$\mu_4 = 0.500$ $\nu_4 = 0.500$ $f_4 = 20.85$ GHz $D_2 = 32.12$ dB $m^T = (0\ \ 2.4\ \ 2.4\ \ 1.7)$ $m'^T = (0\ \ 2.4\ \ 0\ \ 1.7)$

Randomly Positioned 4th Beam with Light Taper in Both Planes

Beam 2 Contour Pattern $\mu_1 = -0.284$ $v_1 = -0.313$ $f_1 = 20.40$ GHz A = 17.816 in.

$\mu_2 = 0.304$ $v_2 = -0.310$ $f_2 = 20.70$ GHz B = 4.454 in.

$\mu_3 = 0.501$ $v_3 = -0.289$ $f_3 = 20.25$ GHz $\delta x = 0.178$ in.

$\mu_4 =$ ▪ $v_4 = 0.313$ $f_4 = 20.85$ GHz $D_2 = 32.22$ dB $m^T = (0\ \ 2.4\ \ 2.4\ \ 2.4)$ $m'^T = (0\ \ 2.4\ \ 0\ \ 2.52)$

Heavily Weighted Beam

Beam 1 Contour Pattern

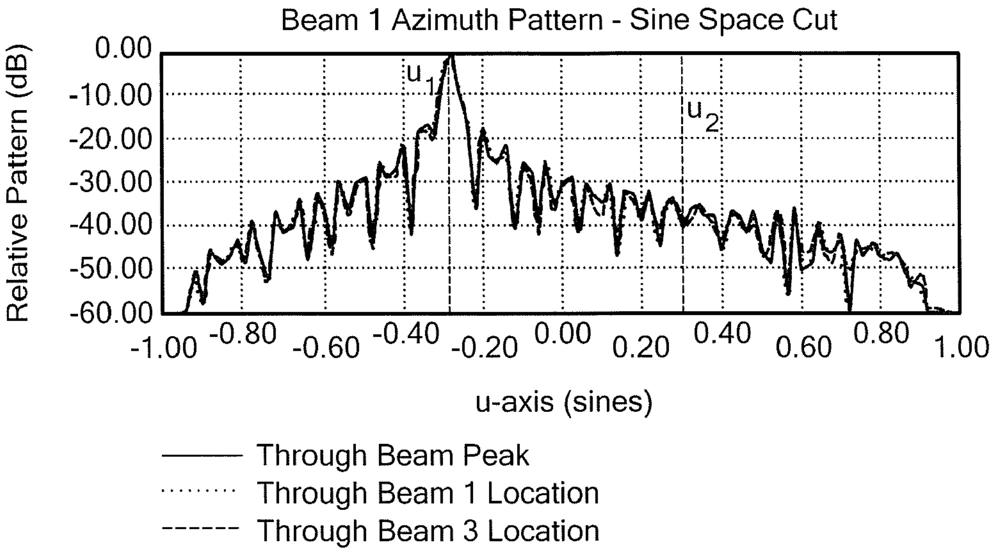
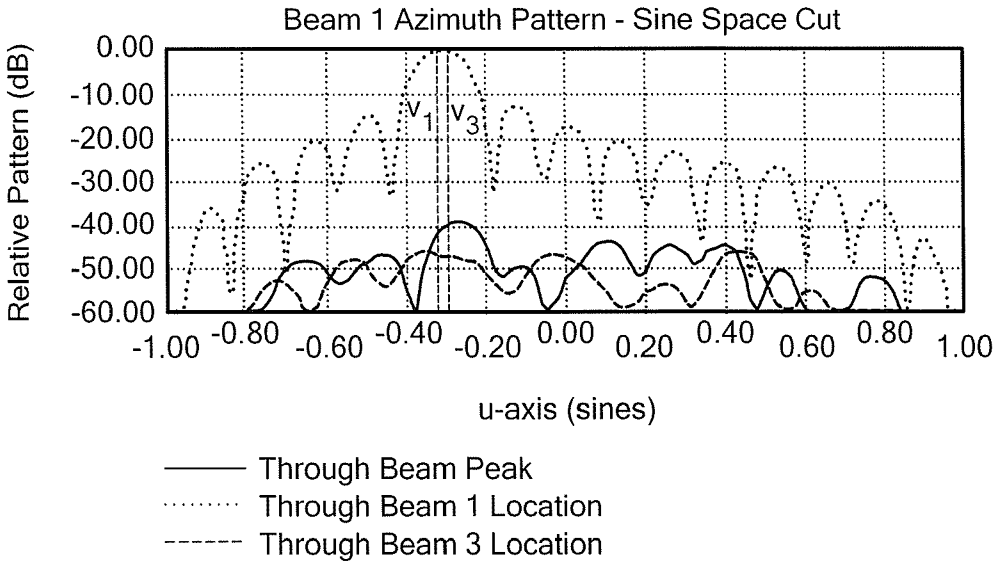
$\mu_1 = -0.284$ $\nu_1 = -0.313$ $f_1 = 20.40$ GHz A = 17.816 in.
$\mu_2 = 0.304$ $\nu_2 = -0.310$ $f_2 = 20.70$ GHz B = 4.454 in.
$\mu_3 = 0.501$ $\nu_3 = -0.289$ $f_3 = 20.25$ GHz $\delta x = 0.178$ in.
$\mu_4 = -0.284$ $\nu_4 = -0.313$ $f_4 = 20.85$ GHz
$D_2 = 32.22$ dB $m^T = (0\ \ 2.4\ \ 2.4\ \ 2.4)$ $m'^T = (0\ \ 2.4\ \ 0\ \ 2.52)$
Beam 1 is Not Effected by the Difference Pattern Developed in Port 4
*FIG. 21B*

Beam 3 Contour Pattern

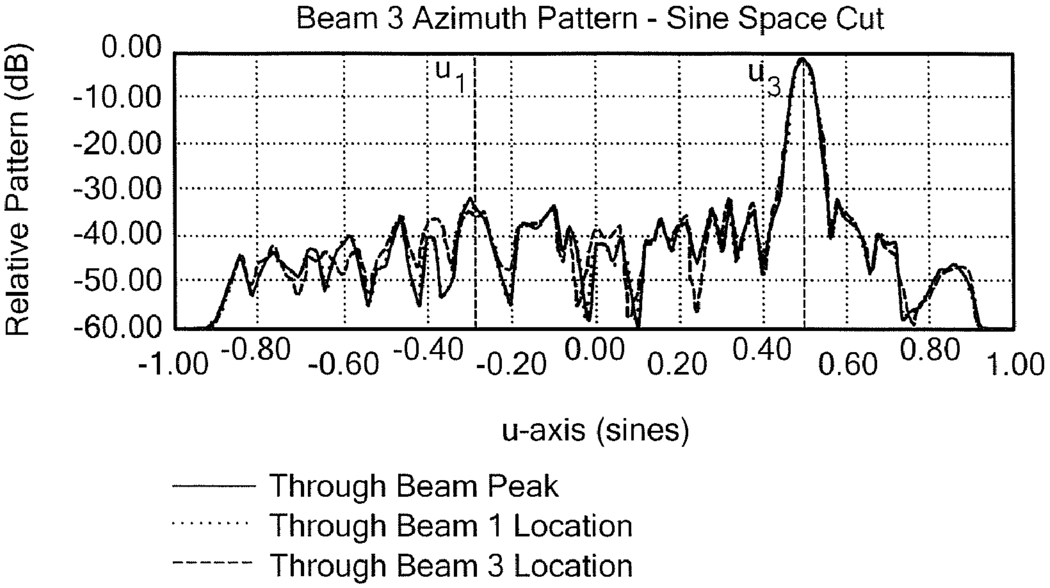
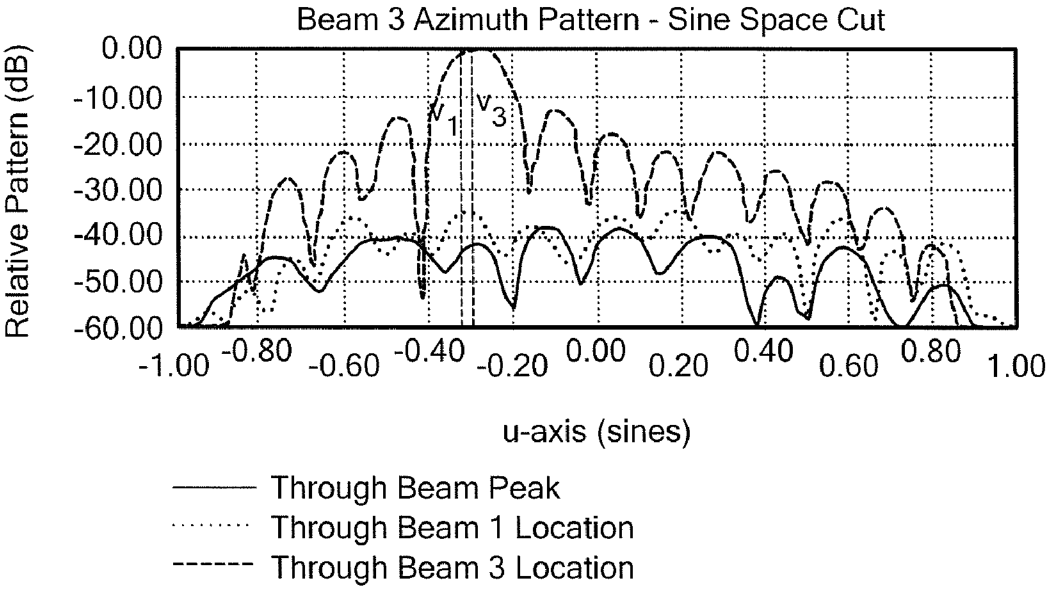
$\mu_1 = -0.284$ $\nu_1 = -0.313$ $f_1 = 20.40$ GHz A = 17.816 in.
$\mu_2 = 0.304$ $\nu_2 = -0.310$ $f_2 = 20.70$ GHz B = 4.454 in.
$\mu_3 = 0.501$ $\nu_3 = -0.289$ $f_3 = 20.25$ GHz $\delta x = 0.178$ in.
$\mu_4 = -0.284$ $\nu_4 = -0.313$ $f_4 = 20.85$ GHz
$D_2 = 32.22$ dB $m^T = (0\ \ 2.4\ \ 2.4\ \ 2.4)$ $m'^T = (0\ \ 2.4\ \ 0\ \ 2.52)$
Beam 3
*FIG. 22B*

Beam 4 Contour Pattern

| | | | |
|---|---|---|---|
| $\mu_1 = -0.284$ | $\nu_1 = -0.313$ | $f_1 = 20.40$ GHz | A = 17.816 in. |
| $\mu_2 = 0.304$ | $\nu_2 = -0.310$ | $f_2 = 20.70$ GHz | B = 4.454 in. |
| $\mu_3 = 0.501$ | $\nu_3 = -0.289$ | $f_3 = 20.25$ GHz | $\delta x = 0.178$ in. |
| $\mu_4 = -0.284$ | $\nu_4 = -0.313$ | $f_4 = 20.85$ GHz | |

$D_2 = 32.22$ dB $\quad m^T = (0\ \ 2.4\ \ 2.4\ \ 2.4) \quad m'^T = (0\ \ 2.4\ \ 0\ \ 2.52)$ Low Sidelobe Difference Pattern is Developed as Beam 4

$\theta_{o1} := 30$ $\theta_{o2} := 25$ $\theta_{o3} := 45$ $\theta_{o4} := 60$ Polar steering angles (deg) for beams $\phi_{o1} := -25$ $\phi_{o2} := 45$ $\phi_{o3} := 135$ $\phi_{o4} := 175$ Azimuth steering angles (deg) for beams $f_1 := 7.4$ $f_2 := 7.7$ $f_3 := 7.25$ $f_h := 7.75$ $f_4 := 7.35$ Operating frequencies (Ghz) for beams and upper frequency for Downlink operaing band $c := 11.8028526$ Velocity of light in vacuum (in/nsec)

$\lambda_1 := c \div f_1$ $\lambda_1 := 1.596$ $k_1 := 2\pi \div \lambda_1$ $\lambda_2 := c \div f_2$ $\lambda_2 := 1.533$ $k_2 := 2\pi \div \lambda_2$ $\lambda_3 := c \div f_3$ $\lambda_3 := 1.628$ $k_3 := 2\pi \div \lambda_3$ $\lambda_4 := c \div f_4$ $\lambda_4 := 1.606$ $k_4 := 2\pi \div \lambda_4$ $A := 12.25$ Rectangular aperture length of side along x (inches)

$B := 12.25$ Rectangular aperture length of side along y (inches)

$\delta x := 0.25 \cdot c \div f_h$ Element spacing along x (inches)

$\delta y := 0.25 \cdot c \div f_h$ Element spacing along y (inches)

*FIG. 26A*

$N_A := \text{floor}(A \div \delta x)$ $N_A = 32$ $A := N_A \cdot \delta x$ Number of columns (rect grid)

$N_B := \text{floor}(B \div \delta x)$ $N_B = 32$ $B := N_B \cdot \delta x$ Number of rows (rect grid)

$i_x := 1, 2..\, N_A$ Column Index $i_y := 1, 2..\, N_B$ Row Index $x_{i_x} := \delta x \cdot \left( i_x - \frac{N_A + 1}{2} \right)$ Column positions (inches)

$y_{i_x} := \delta x \cdot \left( i_y - \frac{N_B + 1}{2} \right)$ Row positions (inches)

$u_1 := \sin\left(\theta_{o1} \cdot \frac{\pi}{180}\right) \cdot \cos\left(\phi_{o1} \cdot \frac{\pi}{180}\right)$ $v_1 := \sin\left(\theta_{o1} \cdot \frac{\pi}{180}\right) \cdot \sin\left(\phi_{o1} \cdot \frac{\pi}{180}\right)$ Sine space coordinates of beams 1, 2 and 3

$u_2 := \sin\left(\theta_{o2} \cdot \frac{\pi}{180}\right) \cdot \cos\left(\phi_{o2} \cdot \frac{\pi}{180}\right)$ $v_2 := \sin\left(\theta_{o2} \cdot \frac{\pi}{180}\right) \cdot \sin\left(\phi_{o2} \cdot \frac{\pi}{180}\right)$ $u_3 := \sin\left(\theta_{o3} \cdot \frac{\pi}{180}\right) \cdot \cos\left(\phi_{o3} \cdot \frac{\pi}{180}\right)$

*FIG. 26B*

$$v_3 := \sin\left(\theta_{o3}\cdot\frac{\pi}{180}\right)\cdot\sin\left(\phi_{o3}\cdot\frac{\pi}{180}\right)$$

$$u_4 := \sin\left(\theta_{o4}\cdot\frac{\pi}{180}\right)\cdot\cos\left(\phi_{o4}\cdot\frac{\pi}{180}\right)$$

$$v_4 := \sin\left(\theta_{o4}\cdot\frac{\pi}{180}\right)\cdot\sin\left(\phi_{o4}\cdot\frac{\pi}{180}\right)$$

$$\varphi_{1_{i_x,i_y}} := \exp\left[j\cdot\left[k_1\cdot\left(u_1\cdot x_{i_x} + v_1\cdot y_{i_y}\right) + \frac{\pi}{2}\cdot(-1)^{i_y}\cdot 1\right]\right]$$

Phase commands for beam 1

$$\varphi_{2_{i_x,i_y}} := \exp\left[j\cdot\left[k_2\cdot\left(u_2\cdot x_{i_x} + v_2\cdot y_{i_y}\right)\right]\right]$$

Phase commands for beam 2

$$\varphi_{3_{i_x,i_y}} := \exp\left[j\cdot\left[k_3\cdot\left(u_3\cdot x_{i_x} + v_3\cdot y_{i_y}\right) + \frac{\pi}{2}\cdot(-1)^{i_x}\cdot 1\right]\right]$$

Phase commands for beam 3

$$\varphi_{4_{i_x,i_y}} := \exp\left[j\cdot\left[k_4\cdot\left(u_4\cdot x_{i_x} + v_4\cdot y_{i_y}\right) + \frac{\pi}{2}\cdot(-1)^{i_x}\cdot 1 + \frac{\pi}{2}\cdot(-1)^{i_y}\cdot 1\right]\right]$$

Phase commands for beam 4

$$\phi_{i_x,i_y} := \varphi_{1_{i_x,i_y}} + \varphi_{2_{i_x,i_y}} + \varphi_{3_{i_x,i_y}} + \varphi_{4_{i_x,i_y}}$$

Linear superposition of phase commands to generate total phase command $$\phi_{i_x,i_y} := \phi_{i_x,i_y} \div \left|\phi_{i_x,i_y}\right|$$

Remove amplitude variation of superposition algorithm

*FIG. 27*

$I_u := 101$ Number of points in u $I_v := 101$ Number of points in v $i_u := 1, 2 \,..\, I_u \qquad du := \frac{2}{I_u - 1}$ $u_{i_u} := du \cdot \left[i_u - \left(I_u + 1\right) \div 2\right]$ $i_v := 1, 2 \,..\, I_v \qquad dv := \frac{2}{I_v - 1}$ Indices and observation points in u and v $v_{i_v} := dv \cdot \left[i_v - \left(I_v + 1\right) \div 2\right]$ $m := 1.7$ Gaussian beam parameter $Ill_{x_{i_x}} := e^{-1.382 \cdot \left[m \cdot x_{i_x} \div (N_A \cdot \delta x)\right]^2}$ Gaussian illumination along x $Ill_{y_{i_y}} := e^{-1.382 \cdot \left[m \cdot y_{i_y} \div (N_A \cdot \delta y)\right]^2}$ Gaussian illumination along y

*FIG. 28*

$$E_{2_{i_u, i_v}} := \left[\sqrt{\sqrt{1 - \left[\left(u_{i_u}\right)^2 + \left(v_{i_v}\right)^2\right]}}\right]^3 \cdot \sum_{i_x}\left[\mathrm{Ill}_{x_{i_x}} \cdot e^{-j \cdot k_2 \cdot \left(x_{i_x} \cdot u_{i_u}\right)} \cdot \sum_{i_y}\left[\phi_{i_x, i_y} \cdot \mathrm{Ill}_{y_{i_y}} \cdot e^{-j \cdot k_2 \cdot \left(y_{i_y} \cdot v_{i_v}\right)}\right]\right]$$

$$P_{2'_{i_u, i_v}} := 20 \cdot \log\left(\left|E_{2_{i_u, i_v}}\right| + 10^{-20}\right)$$

$$\mathrm{maxP}_2 := \max\left(P_{2'}\right)$$

$$P_2 := P_{2'} - \mathrm{maxP}_2$$

Beam 2 pattern $$P_{2_{i_u, i_v}} := \mathrm{if}\left[\left(u_{i_u}\right)^2 + \left(v_{i_v}\right)^2 < 1, P_{2_{i_u, i_v}}, -60\right]$$

$$P_{2_{i_u, i_v}} := \mathrm{if}\left(P_{2_{i_u, i_v}} < -60, -60, P_{2_{i_u, i_v}}\right)$$

$$10 \cdot \log\left[\frac{\left[\sum_{i_x}\left[\mathrm{Ill}_{x_{i_x}} \cdot \left[\sum_{i_y}\left(\left|\phi_{i_x, i_y}\right| \cdot \mathrm{Ill}_{y_{i_y}}\right)\right]\right]\right]^2}{N_A \cdot N_B \cdot \sum_{i_x}\left[\left(\mathrm{Ill}_{x_{i_x}}\right)^2 \cdot \left[\sum_{i_y}\left(\left|\phi_{i_x, i_y}\right| \cdot \mathrm{Ill}_{y_{i_y}}\right)^2\right]\right]}\right] = -1.509$$

Beam 2 efficiency

*FIG. 29*

Beam 2 Pattern $\theta_{o2} = 25$ $\Phi_{o2} = 45$ $\mu_1 = 0.453$ $\mu_2 = 0.299$ $\mu_3 = -0.5$ $\mu_4 = -0.863$ $\nu_1 = -0.211$ $\nu_2 = 0.299$ $\nu_3 = 0.5$ $\nu_4 = 0.075$ $$10\cdot\log\left[\frac{4\pi\cdot 10^{0.1\cdot\max(P_2)}}{du\cdot dv\cdot\sum_{i_u}\left[\sum_{i_v}\text{if}\left[\left(u_{i_u}\right)^2+\left(v_{i_v}\right)^2<1\,,\frac{10^{0.1\cdot P_{2_{i_u,i_v}}}}{\sqrt{1-\left(u_{i_u}\right)^2-\left(v_{i_v}\right)^2}}\,,0\right]\right]}\right]=28.011$$

Beam 2 directivity (dBi)

$$10\cdot\log\left(4\pi\cdot A\cdot\frac{B}{\lambda_2^{\,2}}\right)=28.998 \qquad 10\cdot\log\left(\cos\left(\theta_{o2}\cdot\frac{\pi}{180}\right)\right)=-0.427$$

*FIG. 31*

Discarding amplitude variation of superposition $u_1 = 0.453$ $v_1 = -0.211$ $i_{u1} := \frac{I_u + 1}{2} + \frac{I_u - 1}{2} \cdot u_1 \qquad i_{u1} = 73.658$ $i_{v1} := \frac{I_v + 1}{2} + \frac{I_v - 1}{2} \cdot v_1 \qquad i_{v1} = 40.435$ $u_2 = 0.299$ $v_2 = 0.299$ $i_{u2} := \frac{I_u + 1}{2} + \frac{I_u - 1}{2} \cdot u_2 \qquad i_{u2} = 65.942$ $i_{v2} := \frac{I_v + 1}{2} + \frac{I_v - 1}{2} \cdot v_2 \qquad i_{v2} = 65.942$ $u_3 = -0.5$ $v_3 = 0.5$ $i_{u3} := \frac{I_u + 1}{2} + \frac{I_u - 1}{2} \cdot u_3 \qquad i_{u3} = 26$ $i_{v3} := \frac{I_v + 1}{2} + \frac{I_v - 1}{2} \cdot v_3 \qquad i_{v3} = 76$ $u_4 = -0.863$ $v_4 = 0.075$ $i_{u4} := \frac{I_u + 1}{2} + \frac{I_u - 1}{2} \cdot u_4 \qquad i_{u4} = 7.864$ $i_{v4} := \frac{I_v + 1}{2} + \frac{I_v - 1}{2} \cdot v_4 \qquad i_{v4} = 54.774$

*FIG. 33*

$$\vartheta_{1_{i_x, i_y}} := e^{-j \cdot \left[\frac{\pi}{2} \cdot (-1)^{i_y} \cdot 1\right]}$$

Correction phase term for beam 1

$$E_{1_{i_u, i_v}} := \left[\sqrt{\sqrt{1 - \left[\left(u_{i_u}\right)^2 + \left(v_{i_v}\right)^2\right]}}\right]^3 \cdot \sum_{i_x} \left[ Ill_{x_{i_x}} \cdot e^{-j \cdot k_1 \cdot \left(x_{i_x} \cdot u_{i_u}\right)} \cdot \sum_{i_y} \left[ \phi_{i_x, i_y} \cdot Ill_{y_{i_y}} \cdot e^{-j \cdot k_1 \cdot \left(y_{i_y} \cdot v_{i_v}\right)} \cdot \vartheta_{1_{i_x, i_y}} \right] \right]$$

$$P_{1'_{i_u, i_v}} := 20 \cdot \log\left(\left|E_{1_{i_u, i_v}}\right| + 10^{-20}\right)$$

$$maxP_1 := \max\left(P_{1'}\right)$$

Beam 1 pattern $$P_1 := P_{1'} - maxP_1$$

$$P_{1_{i_u, i_v}} := \mathrm{if}\left[\left(u_{i_u}\right)^2 + \left(v_{i_v}\right)^2 < 1, P_{1_{i_u, i_v}}, -60\right]$$

$$P_{1_{i_u, i_v}} := \mathrm{if}\left(P_{1_{i_u, i_v}} < -60, -60, P_{1_{i_u, i_v}}\right)$$

*FIG. 34*

$\theta_{o1} = 30$ $\Phi_{o1} = -25$ $\mu_1 = 0.453$ $\mu_2 = 0.299$ $\mu_3 = -0.5$ $\mu_4 = -0.863$ $\nu_1 = -0.211$ $\nu_2 = 0.299$ $\nu_3 = 0.5$ $\nu_4 = 0.075$ $$10\cdot\log\left[\frac{4\pi\cdot 10^{0.1\cdot\max(P_1)}}{du\cdot dv\cdot\sum_{i_u}\left[\sum_{i_v}\mathrm{if}\left[\left(u_{i_u}\right)^2+\left(v_{i_v}\right)^2<1\,,\,\frac{10^{0.1\cdot P_{1_{i_u,i_v}}}}{\sqrt{1-\left(u_{i_u}\right)^2-\left(v_{i_v}\right)^2}}\,,\,0\right]\right]}\right]=27.421$$

Beam 1 directivity (dBi)

$$10\cdot\log\left(4\pi\cdot A\cdot\frac{B}{\lambda_1{}^2}\right)=28.652$$

$$10\cdot\log\left(\cos\left(\theta_{o1}\cdot\pi\div 180\right)\right)=-0.625$$

*FIG. 36*

Discarding amplitude variation of superposition $$\vartheta_{3_{i_x,i_y}} := e^{-j\cdot\left[\frac{\pi}{2}\cdot(-1)^{i_x}\cdot 1\right]}$$

Correction phase term for beam 3

$$E_{3_{i_u,i_v}} := \left[\sqrt{\sqrt{1-\left[\left(u_{i_u}\right)^2+\left(v_{i_v}\right)^2\right]}}\right]^3\cdot\sum_{i_x}\left[\mathrm{III}_{x_{i_x}}\cdot e^{-j\cdot k_3\cdot\left(x_{i_x}\cdot u_{i_u}\right)}\cdot\sum_{i_y}\left[\phi_{i_x,i_y}\cdot\mathrm{III}_{y_{i_y}}\cdot e^{-j\cdot k_3\cdot\left(y_{i_y}\cdot v_{i_v}\right)}\cdot\vartheta_{3_{i_x,i_y}}\right]\right]$$

$$P_{3'_{i_u,i_v}} := 20\cdot\log\left(\left|E_{3_{i_u,i_v}}\right|+10^{-20}\right)$$

$$\mathrm{maxP}_3 := \max\left(P_{3'}\right)$$

Beam 3 pattern $$P_3 := P_{3'} - \mathrm{maxP}_3$$

$$P_{3_{i_u,i_v}} := \mathrm{if}\left[\left(u_{i_u}\right)^2+\left(v_{i_v}\right)^2<1, P_{3_{i_u,i_v}}, -60\right]$$

$$P_{3_{i_u,i_v}} := \mathrm{if}\left(P_{3_{i_u,i_v}}<-60, -60, P_{3_{i_u,i_v}}\right)$$

*FIG. 38*

$\theta_{o3} = 45$ $\Phi_{o3} = 135$ $\mu_1 = 0.453$ $\mu_2 = 0.299$ $\mu_3 = -0.5$ $\mu_4 = -0.863$ $\nu_1 = -0.211$ $\nu_2 = 0.299$ $\nu_3 = 0.5$ $\nu_4 = 0.075$ $$10\cdot\log\left[\frac{4\pi\cdot 10^{0.1\cdot\max(P_3)}}{du\cdot dv\cdot\sum_{i_u}\left[\sum_{i_v}\text{if}\left[\left(u_{i_u}\right)^2+\left(v_{i_v}\right)^2<1\,,\frac{10^{0.1\cdot P_{3_{i_u,\,i_v}}}}{\sqrt{1-\left(u_{i_u}\right)^2-\left(v_{i_v}\right)^2}}\,,0\right]\right]}\right]=26.454$$

Beam 3 directivity (dBi)

$$10\cdot\log\left(4\pi\cdot A\cdot\frac{B}{\lambda_3^{\,2}}\right)=28.475$$

$$10\cdot\log\left(\cos\left(\theta_{o3}\cdot\pi\div 180\right)\right)=-1.505$$

*FIG. 40*

Discarding amplitude variation of superposition $$\vartheta_{4_{i_x, i_y}} := e^{-j\cdot\left[\frac{\pi}{2}\cdot(-1)^{i_x}\cdot 1 + \frac{\pi}{2}\cdot(-1)^{i_y}\cdot 1\right]}$$

Correction phase term for beam 4

$$E_{4_{i_u, i_v}} := \left[\sqrt{\sqrt{1 - \left[\left(u_{i_u}\right)^2 + \left(v_{i_v}\right)^2\right]}}\right]^3 \cdot \sum_{i_x}\left[Ill_{x_{i_x}}\cdot e^{-j\cdot k_4\cdot\left(x_{i_x}\cdot u_{i_u}\right)}\cdot\sum_{i_y}\left[\phi_{i_x, i_y}\cdot Ill_{y_{i_y}}\cdot e^{-j\cdot k_4\cdot\left(y_{i_y}\cdot v_{i_v}\right)}\cdot\vartheta_{4_{i_x, i_y}}\right]\right]$$

$$P_{4'_{i_u, i_v}} := 20\cdot\log\left(\left|E_{4_{i_u, i_v}}\right| + 10^{-20}\right)$$

$$maxP_4 := \max\left(P_{4'}\right)$$

Beam 4 pattern $$P_4 := P_{4'} - maxP_4$$

$$P_{4_{i_u, i_v}} := \text{if}\left[\left(u_{i_u}\right)^2 + \left(v_{i_v}\right)^2 < 1, P_{4_{i_u, i_v}}, -60\right]$$

$$P_{4_{i_u, i_v}} := \text{if}\left(P_{4_{i_u, i_v}} < -60, -60, P_{4_{i_u, i_v}}\right)$$

*FIG. 42*

$\theta_{o4} = 60$ $\Phi_{o4} = 175$ $\mu_1 = 0.453$ $\mu_2 = 0.299$ $\mu_3 = -0.5$ $\mu_4 = -0.863$ $\nu_1 = -0.211$ $\nu_2 = 0.299$ $\nu_3 = 0.5$ $\nu_4 = 0.075$ $$10\cdot\log\left[\frac{4\pi\cdot 10^{0.1\cdot\max(P_4)}}{du\cdot dv\cdot\sum_{i_u}\left[\sum_{i_v}\text{if}\left[\left(u_{i_u}\right)^2+\left(v_{i_v}\right)^2<1\,,\frac{10^{0.1\cdot P4_{i_u,i_v}}}{\sqrt{1-\left(u_{i_u}\right)^2-\left(v_{i_v}\right)^2}}\,,0\right]\right]}\right]=25.619$$

Beam 4 directivity (dBi)

$$10\cdot\log\left(4\pi\cdot A\cdot\frac{B}{\lambda_4{}^2}\right)=28.594$$

$$10\cdot\log\left(\cos\left(\theta_{o4}\cdot\pi\div 180\right)\right)=-3.01$$

*FIG. 44*

Discarding amplitude variation of superposition

METHODS AND APPARATUS FOR RADIATOR FOR MULTIPLE CIRCULAR POLARIZATION

CROSS-REFERENCE TO RELATED APPLICATIONS

The present application claims the benefit of U.S. Provisional Patent Application No. 61/085,134, filed on Jul. 31, 2008, and U.S. Provisional Patent Application No. 61/085,142, filed on Jul. 31, 2008, which are incorporated herein by reference.

BACKGROUND

As is known in the art, space is at a premium for electromagnetic sensor applications, such as communications on the move (COTM) and satellite communications on the move (SOTM). For example, small vehicles support relatively small apertures. There have been a variety of attempts to receive multiple beams with independent polarizations. For example, one known approach includes the use of multiple phase shifters per phase center.

SUMMARY

The present invention provides methods and apparatus for an electronically steered array antenna enabling a single phased array aperture to simultaneously produce up to four fully independent full area gain beams within the aperture coverage volume. In exemplary embodiments, a single phase shifter per phase center is used to achieve multiple beam performance using an inventive orthogonality relationship between beams and beamports. Exemplary embodiments of the invention include active and passive aperture architectures.

In one aspect of the invention, an electrically steered array comprises a phased array aperture having a plurality of elements at a selected spacing, the aperture to provide up to four simultaneous, independent beam sets, wherein the elements are controlled by a single complex weight. The array can form a part of a communications on the move system.

In another aspect of the invention, a receive electronically steered array aperture comprises a plurality of radiators each having a single complex phase/amplitude control at a radiating phase center of the radiators to simultaneously receive up to four circularly polarized plane waves, each of the plane waves being arbitrarily of left hand circular polarization or right hand circular polarization, from spatially diverse sources.

BRIEF DESCRIPTION OF THE DRAWINGS

The foregoing features of this invention, as well as the invention itself, may be more fully understood from the following description of the drawings in which:

FIG. 26A includes polar and azimuth steering angles for four beams and exemplary operating frequencies;

FIG. 26B shows an exemplary number of rows and columns and positions. Sine space coordinates for beams 1, 2, and 3 are also shown;

FIG. 27 shows an exemplary representation of phase commands for beams 1-4 and linear superposition of the phase commands to generate complete phase command by controlling the variable phase shifters;

FIG. 28 shows an exemplary Gaussian illumination;

FIG. 29 shows an exemplary representation of the beam 2 pattern and efficiency;

FIG. 31 shows beam 2 directivity;

FIG. 33 shows indices and observations in sine space;

FIG. 34 shows beam 1 pattern and a correction phase term for beam 1;

FIG. 36 shows beam 1 directivity.

FIG. 38 shows a representation of the beam 3 pattern and phase correction;

FIG. 40 shows beam 3 directivity;

FIG. 42 shows a representation of the beam 4 pattern and phase correction term;

FIG. 44 shows beam 4 directivity; and

DETAILED DESCRIPTION

Figure 1:
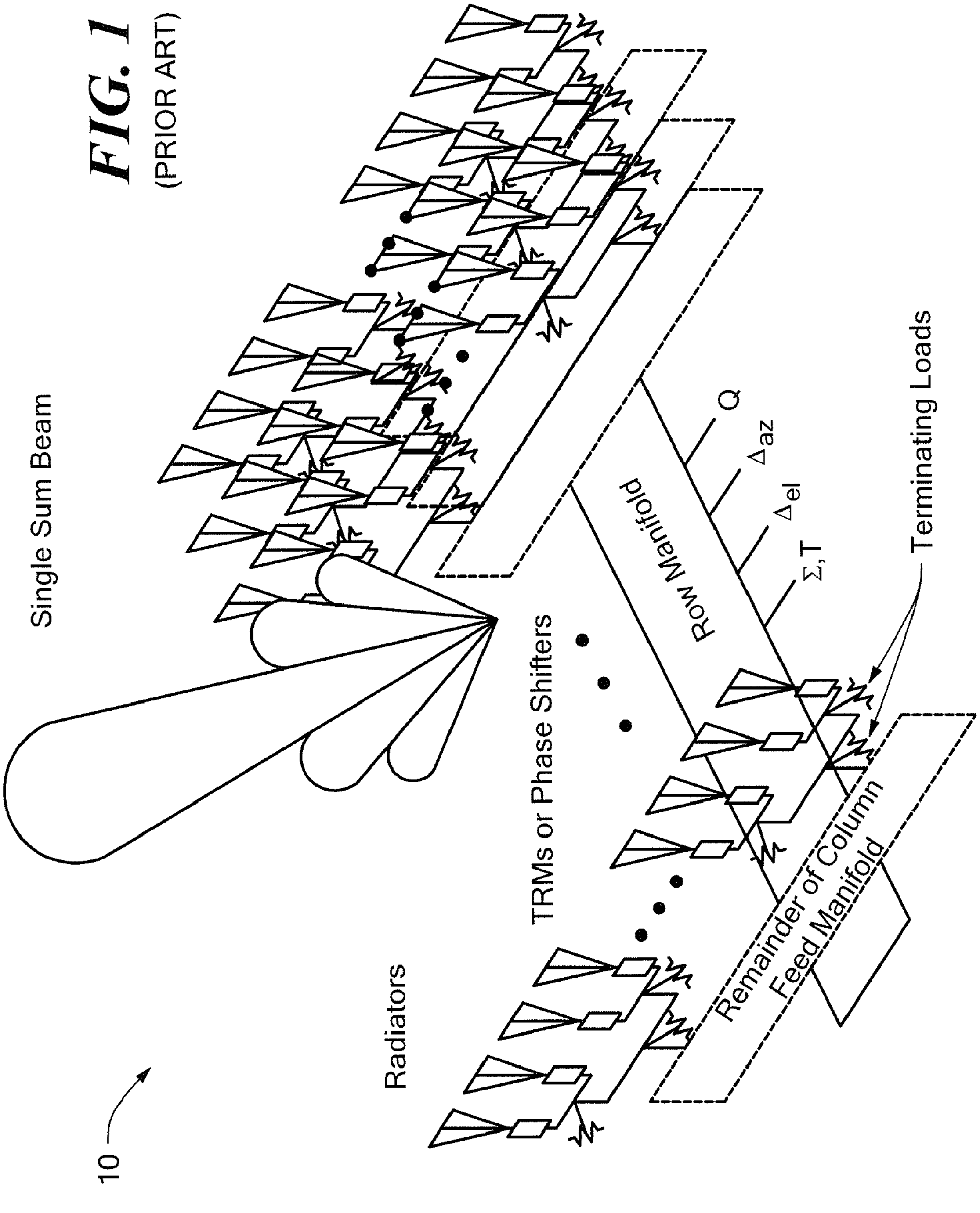
FIG. 1 (PRIOR ART)
FIG. 1 is a schematic representation of a prior art phased array architecture.

The present invention provides methods and apparatus for a multiple beam phased array architecture producing up to four simultaneous, independent beams with a single complex (amplitude and phase) control per phased array element. The inventive architecture is applicable for Active Electronically Steered Arrays (AESAs), passive Electronically Steered Arrays (ESAs), and any other suitable system. Multiple beams may be developed at the same frequency or at different frequencies.

In exemplary embodiments of the invention, a constrained orthogonal space is created in the RF backplane of the array producing a functional realization of beam space orthogonality. The intrinsic characteristics of matched four port junctions are invoked to achieve this orthogonality, first, at the backplane junction with the radiating aperture, then at the subsequent combining level. The inventive architecture is applicable to simultaneous realization of conventional array functions (e.g., sum, difference, difference of differences, shaped beams) and modes (e.g., transmission and reception).

Before discussing exemplary embodiments of the invention, some information is provided. An antenna is a spatial filter. In this sense, as a sensor receiving RF energy, an antenna has properties that maximize the response to signals that are incident on the antenna from certain directions relative to signals that are incident from other directions. Consequently, when two or more signals are incident on the antenna from different directions, the antenna will provide a degree of signal selectivity based on direction of arrival. This selectivity improves sensor performance for the desired system objectives. When the directional selectivity is maximized over a small angular region of the space surrounding the antenna, then we refer to region of maximum response as a beam. When the selectivity is controllably and simultaneously maximized over several small regions which may be contiguous or widely separated, we refer to the antenna as a multibeam antenna.

A phased array antenna produces inertialess beam steering by modifying the phase distribution between a fixed distribution (in transmission mode) or combining (in reception mode) RF backplane and aperture elements that, respectively, radiate the desired waveform or collect samples of incident electromagnetic energy, in either case with little individual spatial filtering. Without loss of generality, distribution and combining systems will be referred to as feed manifolds.

The objectives of the phase modification are two-fold. One objective is to modify the phase distribution intrinsic to the feed manifold: the formal representation of this phase modification is often referred to as a collimation function. A second objective is to match the phase distribution on the aperture of elements to a desired plane wave propagation characteristic, generally to optimize antenna performance (usually antenna gain) for a particular direction in space relative to a physical attribute of the aperture: this is commonly termed beam steering.

Figure 2:
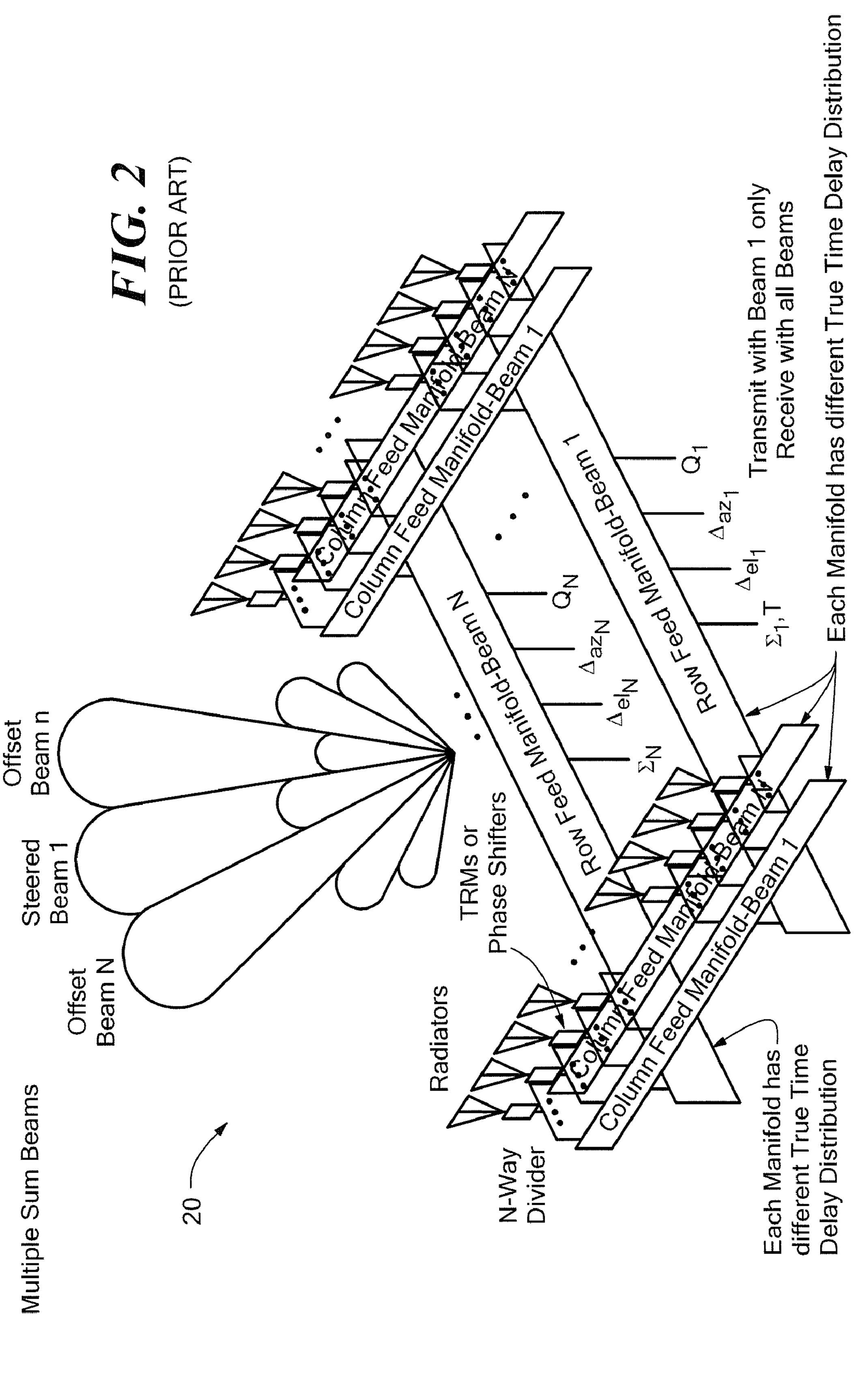
FIG. 2 (PRIOR ART)
FIG. 2 is a schematic representation of a prior art phased array architecture supporting dependent multiple beams.

FIG. 1 shows one conventional phased array architecture 10 including a single beam, or monopulse beam set, steered to a single point in space at any instance in time, to meet the performance objectives of the system. With other conventional architectures, multiple beams are simultaneously created to achieve improved radar search performance, usually by linking the steering directions of all beams to a particular position in space, then offsetting certain of those beams to provide a beam cluster that has broader instantaneous angular coverage around the central point, as shown in the system 20 of FIG. 2.

Figure 3:
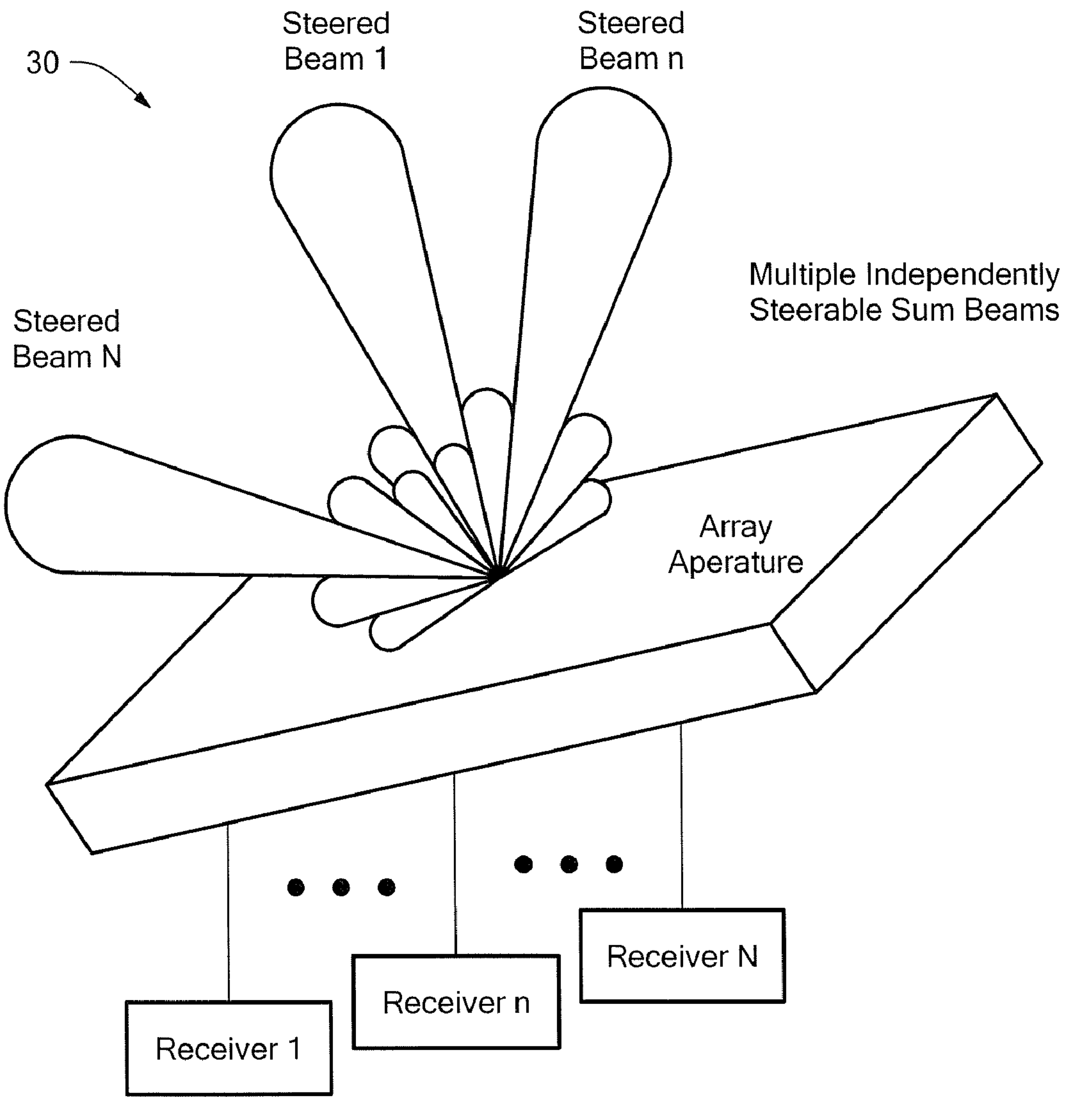
FIG. 3 is a representation of a phased array architecture capable of independently steering multiple beams.

In some instances, it is desirable, for various reasons, to simultaneously create multiple beams that can be independently steered to different points in space, as shown in the system 30 of FIG. 3.

Figure 4:
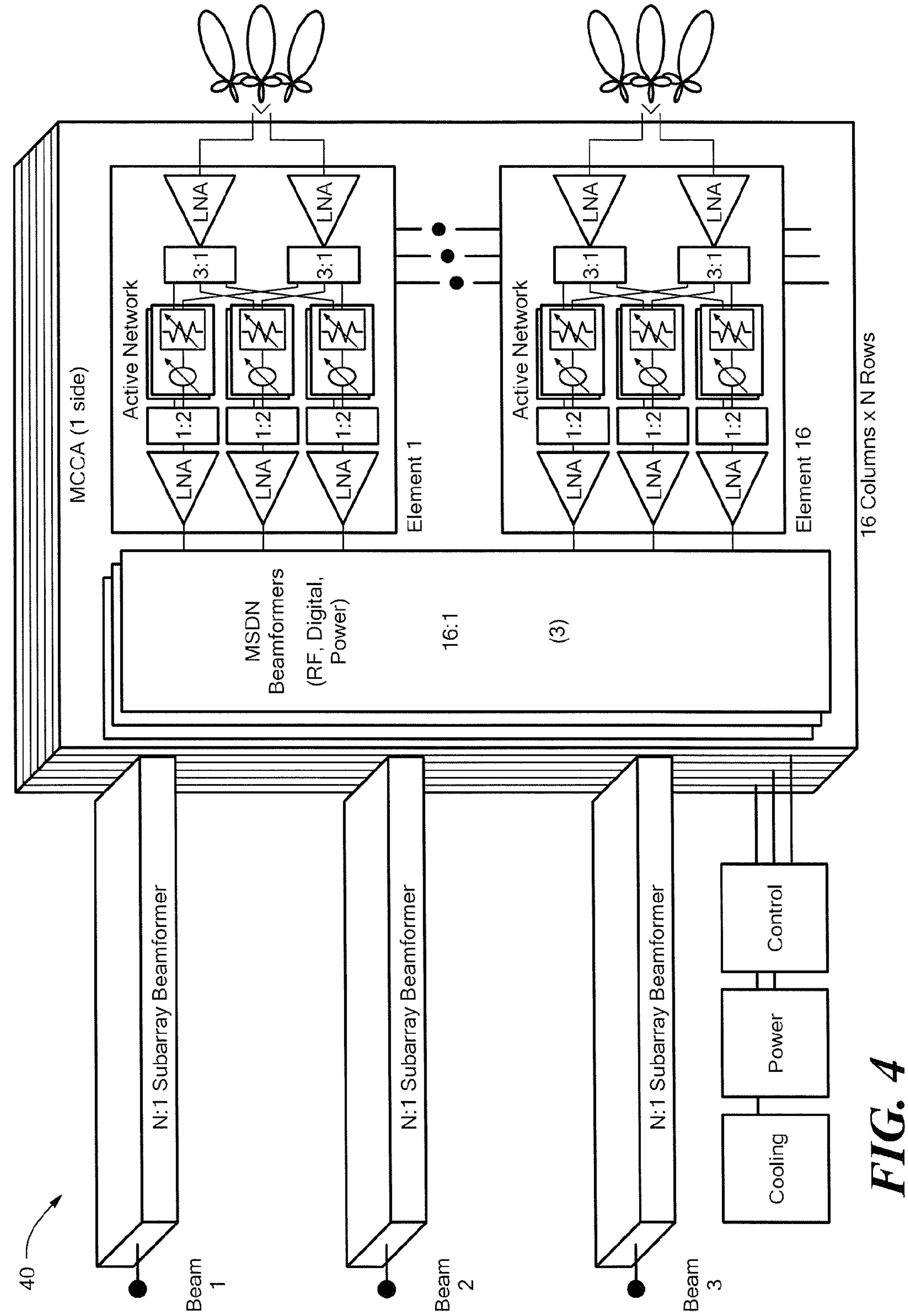
FIG. 4 (PRIOR ART)
FIG. 4 is a schematic representation of a prior art AESA system with an N-way architecture.

FIG. 4 shows a known AESA architecture 40 referred to as the N-way architecture that provides the capability to independently steer multiple beams with polarization versatility. In the illustrated architecture, three independent beams are created in a receive-only configuration, but can be extended to create N beams and to operate, with certain constraints, in transmit mode or mixed transmit and receive mode. As shown in the illustrated architecture 40, each aperture element is connected by suitable transmission medium to an amplifier. The received signal is amplified with sufficient gain to maintain system noise figure when equally divided N ways. Following power division to create independent channels, divider outputs are phase shifted, attenuated and combined in N feed manifolds to meet independent beam steering and sidelobe requirements. Clearly, the amplifier and power divider operational requirements may differ from the operation requirements of components following power division—for example, the N sets of phase shifters, attenuators and feed manifold media may be optimized for different frequency bands.

The N-Way architecture 40 can provide very high quality beams provided the amplifier operates linearly. Beams are created in physically and electrically isolated feed manifolds and are therefore truly non-interacting. Each beam can be filtered at any point in the feed manifold to remove unwanted frequency components.

A so-called aperture-level digital beam forming architecture can produce an unlimited set of independent receive beams. In this architecture, the output of the amplifier is fed directly to a high speed analog to digital converter (ADC). A numeric representation of the signal is then sent from each element to a numeric combiner (computer, distributed or central). By clever application of processing algorithms, any number of beams can be extracted.

The major distinction between the N-Way and aperture-level digital beam forming architecture is that the N-Way architecture requires a feed manifold and complete set of controls per element for each desired beam, whereas, the aperture-level digital beam former requires a single ADC per element and a single digital beam former.

In accordance with exemplary embodiments of the invention, a phased array architecture provides excellent spatial filtering for up to four simultaneous beams, using two manifolds and a single complex phase and amplitude control for each radiating element.

Figure 5:
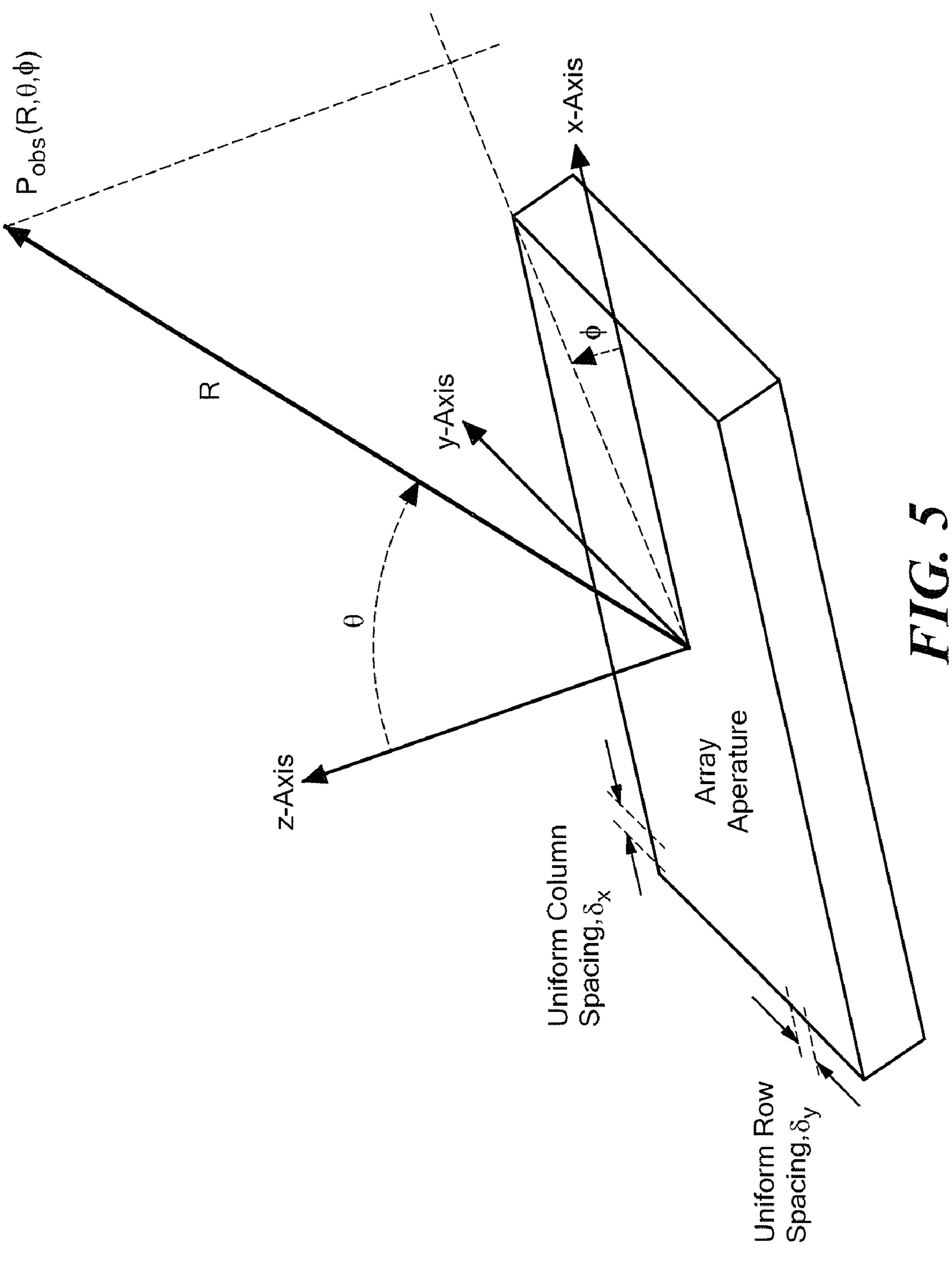
FIG. 5 is a schematic representation of a physical set of details to describe exemplary embodiments of the invention.

FIG. 5 provides a physical set of details that is useful in describing exemplary embodiments of the invention.

Descriptions of exemplary embodiments may refer to specialization to the case of a planar aperture operating in receive mode. It is readily understood, however, that the concepts and exemplary embodiments described herein are readily extendible to arrays of radiating elements distributed on multiply-curved surfaces and operating linearly in either transmit or receive mode.

The figure shows a two-dimensional phased array aperture (x, y dimensions) having radiators connected to an amplifier distributed in the xy-plane of a regular Cartesian system. The spacing between radiators is constant in x and in y, forming a regular grid by which the location of any element can be stated to be ($p\delta_x$+offset$_x$, $q\delta_y$+offset$_y$, 0), where p and q are signed integer indices and the offset terms account for the possibility that the radiating elements may or may not be positioned on the x- and y-axes. The normal to the surface is the z-axis. For simplicity of presentation and discussion, a perfectly conducting plane is assumed to surround the array of radiators creating a radiating half-space above z=0, and a constrained half-space below: it is understood that such a surrounding plane is an artifice which is not achievable in practice. A point in space in the radiating half-space can be defined by the distance from the center of the coordinate system (0, 0, 0), R; the angle between the z-axis and the vector from (0, 0, 0) to the point, $\theta$; and the angle between the x-axis and the projection of the vector onto the xy-plane, $\phi$.

The total signal incident on an antenna includes desired and undesired components. These may be at different frequencies, produced by different sources, carry differing waveforms and be noise-like or signal-like. One or more of these signals can be signals of interest from a radar or communications point of view. For N incident signals, the time dependent output, $\Xi_{p,q}$, of each radiating element is given by $$\Xi_{p,q} = \sum_{n=1}^{N} \Omega_n \exp(jk_n \underline{u}_n \cdot \underline{x}_{p,q}) \exp(j\omega_n t) \quad \text{Eq. 1}$$

where, $\Omega_n$ is a complex, time dependent voltage amplitude for the $n^{th}$ signal, $k_n$ is the wavenumber associated with the $n^{th}$ incident signal, $\underline{u}_n$ is a unit length vector from (0, 0, 0) to the $n^{th}$ signal source, $\underline{x}_{p,q}$ is vector from (0, 0, 0) to the element with indices (p,q), $\omega_n$ is the radian frequency of the $n^{th}$ signal carrier and t is time. Without loss of generality, we can specialize to the case of unmodulated CW carriers and ignore the time reference, producing radiator output, $$X_{p,q} = \sum_{n=1}^{N} A_n \exp(jk_n \underline{u}_n \cdot \underline{x}_{p,q}) \quad \text{Eq. 2}$$

where X and A mean time independent values.

Once collected in the feed manifold, the output of the antenna is $$E = \sum_{p,q}^{P,Q} X_{p,q} \Lambda_{p,q} \exp(j\varphi_{p,q}) = \sum_{n}^{N} A_n \sum_{p,q}^{P,Q} \Lambda_{p,q} \exp(j(k_n \underline{u}_n \cdot \underline{x}_{p,q} + \varphi_{p,q})) \quad \text{Eq. 3}$$

where, $\Lambda_{p,q}$ is a real amplitude weight applied to each radiator output by a variable attenuator and the RF properties of the feed manifold, and $\phi_{p,q}$ is a phase shift (possibly modulo $2\pi$) that performs the phase modulation discussed above for one of the incident signals, say signal n'. Equation (3) is recognized to be the linear superposition of the signals after linear amplification, phase modulation and spatial filtering. When $k_n \underline{u}_n \cdot \underline{x}_{p,q} = -\phi_{p,q}$ for all (p,q), the antenna is optimized for signal n' and the other signals, if well removed in frequency, can be readily frequency filtered, or, if close in frequency, become interference at a level determined by the spatial filtering properties of the aperture and the relative strengths of the incoming signals.

Suppose that we now place a more complex phase and amplitude distribution on the array by virtue of the variable attenuators and phase shifters. Specifically, let $$E = \sum_{n}^{N} A_n \sum_{p,q}^{P,Q} \exp(jk_n \underline{u}_n \cdot x_{p,q}) \sum_{m=1}^{N} \Lambda_{p,q}^{m} \exp(-jk_m \underline{u}_m \cdot \underline{x}_{p,q}) \quad \text{Eq 4}$$

where, the superscript on $\Lambda$ recognizes that the desired illumination tapering for a particular direction of incidence might be different than for another direction. Again, we immediately recognize that a properly weighted beam is obtained for each term n=m, but we also see a bunch of cross terms. The cross terms are essentially leakage from one beams into the desired space of another and represent sidelobe interference. For widely spaced frequencies, frequency filtering can separate the signals of interest. However, the commands will cause the angular response of the phased array to form multiple beams at each of the desired frequencies, reducing antenna gain proportionally at each frequency.

Figure 6:
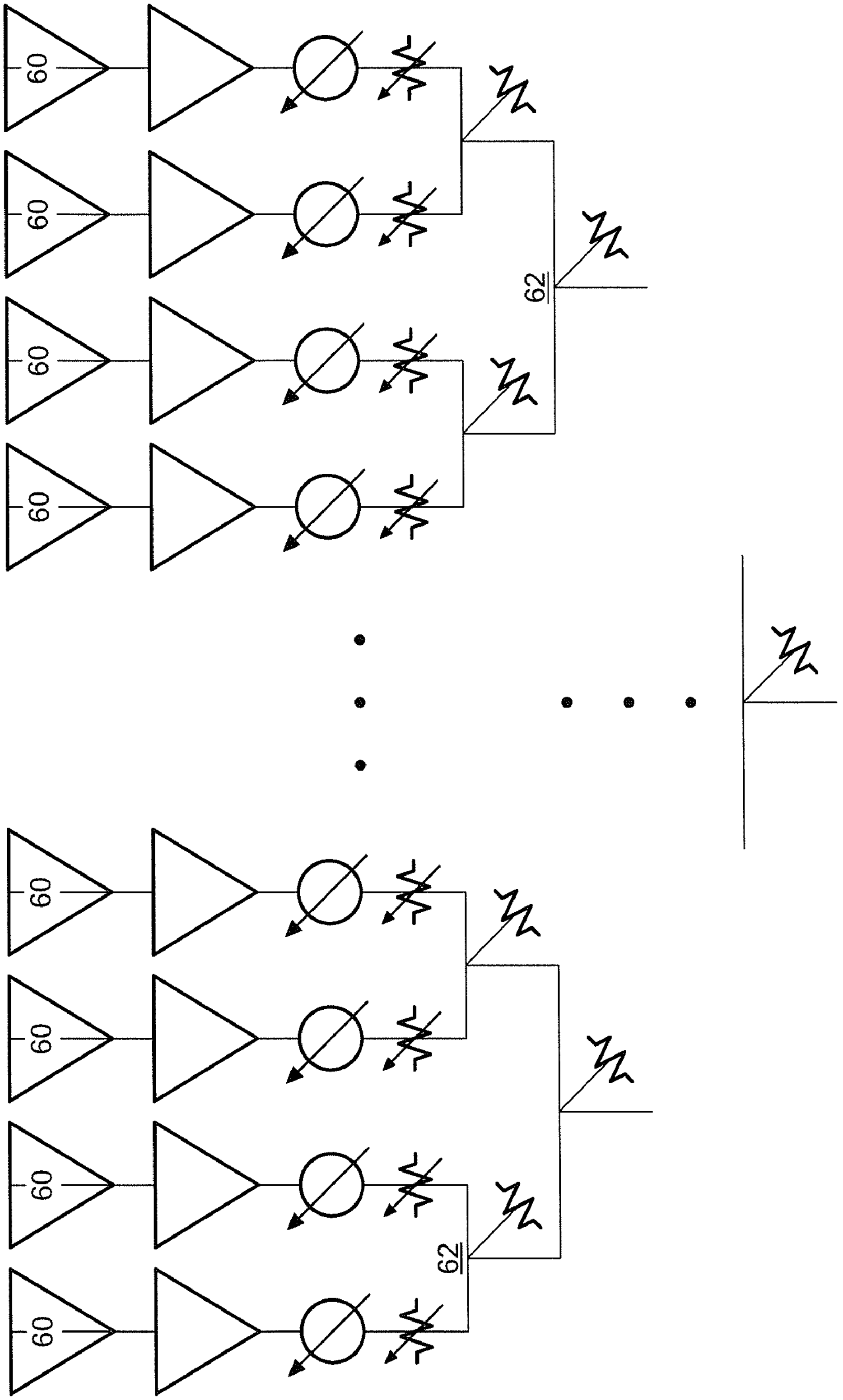
FIG. 6 is a schematic representation of a corporate fed linear array of radiators showing active amplification, phase shifting and RF attenuation components at the element level.

As an example of the application of Equation (4), consider using a conventional corporate fed linear array of $\cos(\theta)^{3/2}$ radiators 60 spaced at $0.5\lambda_{high}$ to simultaneously create two beams, as shown in FIG. 6. Note that good design practice is employed and that matched four-port combiners 62 are used throughout the feed manifold. In one embodiment, the matched four port devices are provided as magic tees.

Figure 7:
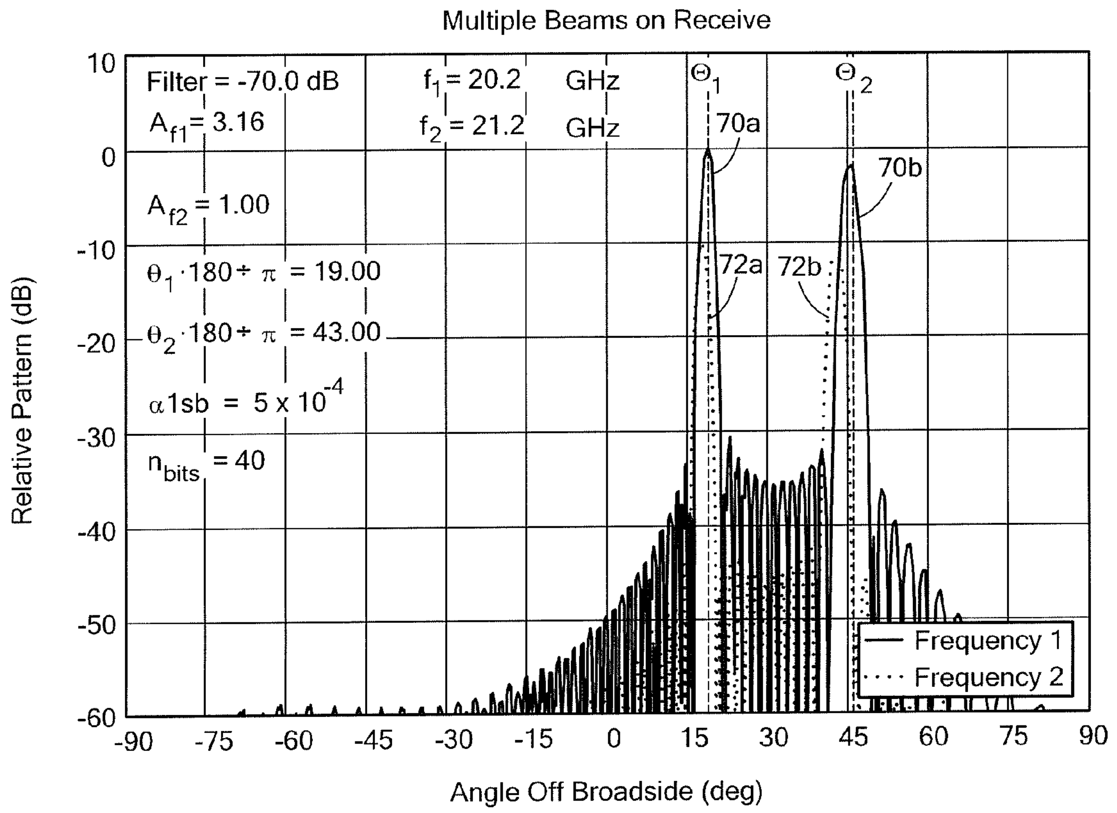
FIG. 7 is a graphical representation of multiple beams on receive.

FIG. 7 shows the results where relatively large numbers of phase and amplitude bits are used to remove phase and amplitude error effects. Here two beams 70*a, b*, 72*a,b* are formed at each frequency. In this example, the phase and amplitude distribution for the multibeam excitation are employed, while one source is passed across the array field of view to create a conventional antenna pattern. The second source is present at either $\Theta_1$ or $\Theta_2$ as appropriate, but because of the wide separation between sources, and because of 70 dB of frequency filtering, does not appear as a pattern artifact or as a general increase in sidelobe level. The difference in response is due to a 10 dB difference in assumed incident signal strength. Well formed patterns are obtained at the desired frequencies with the desired main beams pointed without significant error. The grating lobes that are formed are due to the response of the desired beam to the command for the other beam. In the illustrated case, the grating lobes are far enough off the direction of the undesired beam to obtain significant spatial filtering, but for closer channel spacing, the filtering is much weaker. The directivity of the array has been reduced on the order of 3 dB. Note that the main beam and grating lobe are well formed.

Figure 8:
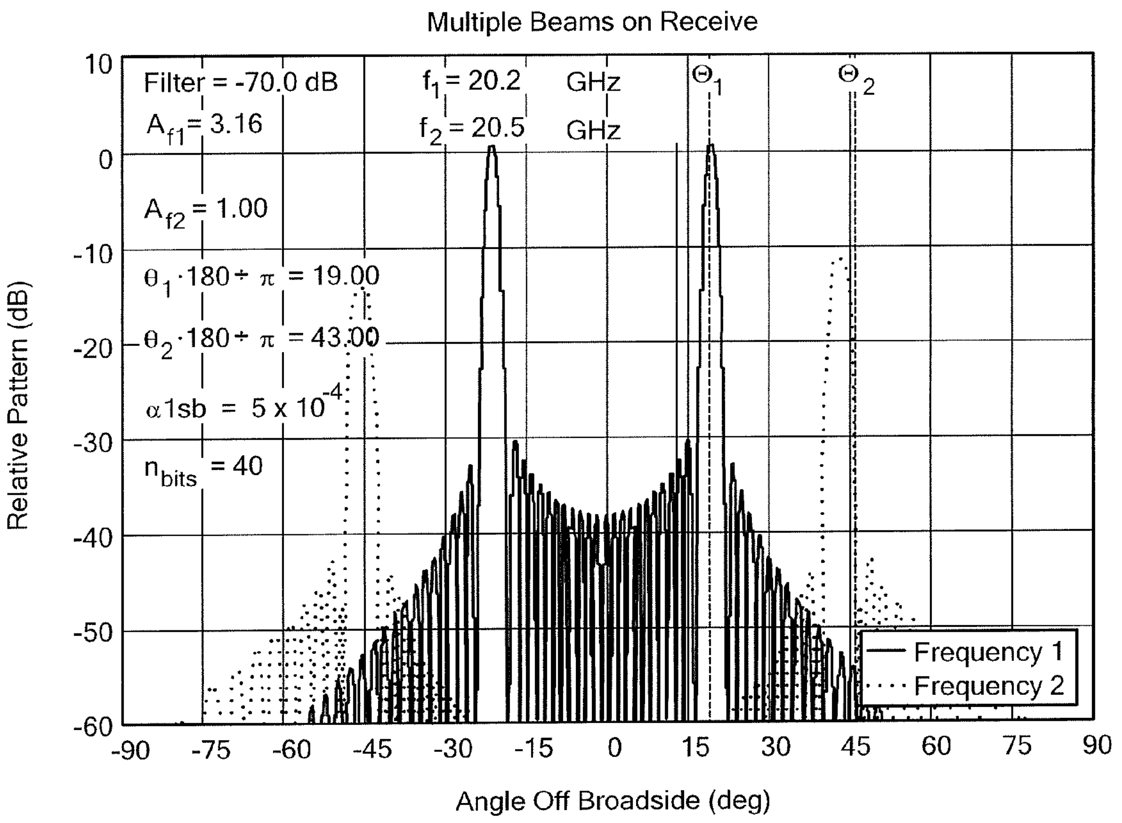
FIG. 8 is a graphical representation of multiple beams with grating lobes transformed to array difference patterns.

Equation (4) represents an architecture in which beam collimations are functionally and physically the same. Were the architecture reconfigured such that the two beam collimations were functionally orthogonal, then grating lobe excitation would be reduced. The simplest orthogonal configuration would be to collimate the first beam at the sum port of an equal length monopulse feed manifold, and the second at the difference port. In this case, the grating lobes are transformed to array difference patterns, producing some spatial filtering, as shown in FIG. 8. Here, the strong excitation of the grating lobe is due to the coherent integration of samples across half the aperture. Were the coherence size reduced, the grating lobe excitation level would be similarly reduced.

Figure 9:
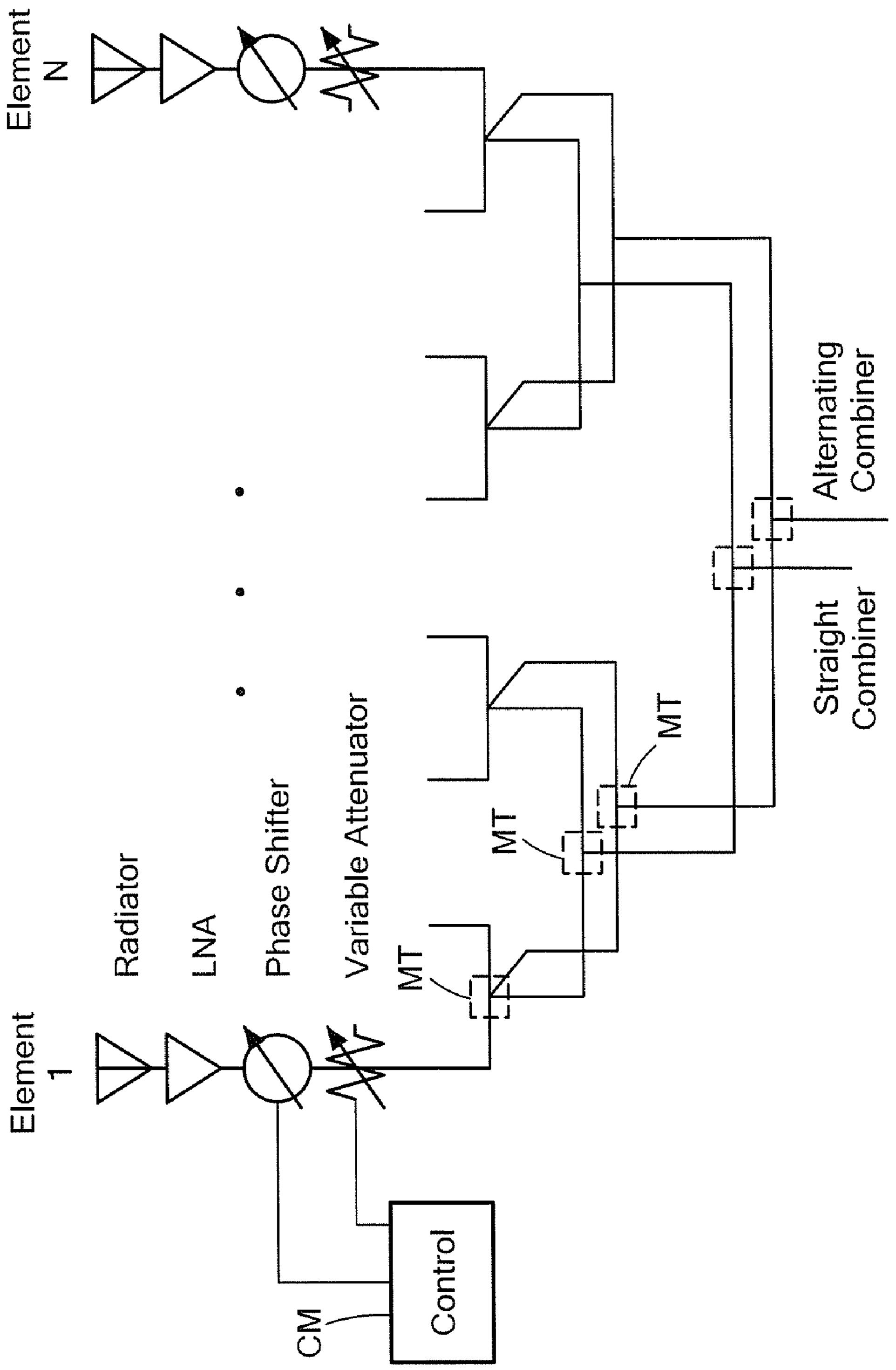
FIG. 9 is a schematic representation of a linear array in which orthogonal collimation is realized at interelement spacing.

FIG. 9 shows a linear array architecture in which the orthogonal collimation is realized at the interelement spacing. A radiator is coupled to a LNA coupled to a phase shifter coupled to a variable attenuator. A control module CM controls the phase shift and amplitude attenuation by the phase shifter and attenuator, as described below in the example. Each pair of radiators in the array is summed or differenced at the first level of the feed manifold using magic tees MT, for example. The sums and differences are then summed.

Were all inputs to an N-element feed manifold equal in amplitude and phase, then the output at the sum of sums would be $N/\sqrt{2}$ times the single element excitation level and the output of the sum of differences would be 0. Were all inputs to the manifold equal in amplitude and alternating ±j, then the sum of sums output would be 0 and the sum of differences would be $N/\sqrt{2}$.

In a spatial sense, the pairing of adjacent elements creates subarrays with wide sum patterns and wide difference patterns. These are also functionally orthogonal, but over a very wide range of angles. Furthermore, the subarray patterns are steered by linear phase tilt imposed for each beam. Hence, the array grating lobes seen in FIG. 6 are cancelled in the orthogonal ports.

Figure 10:
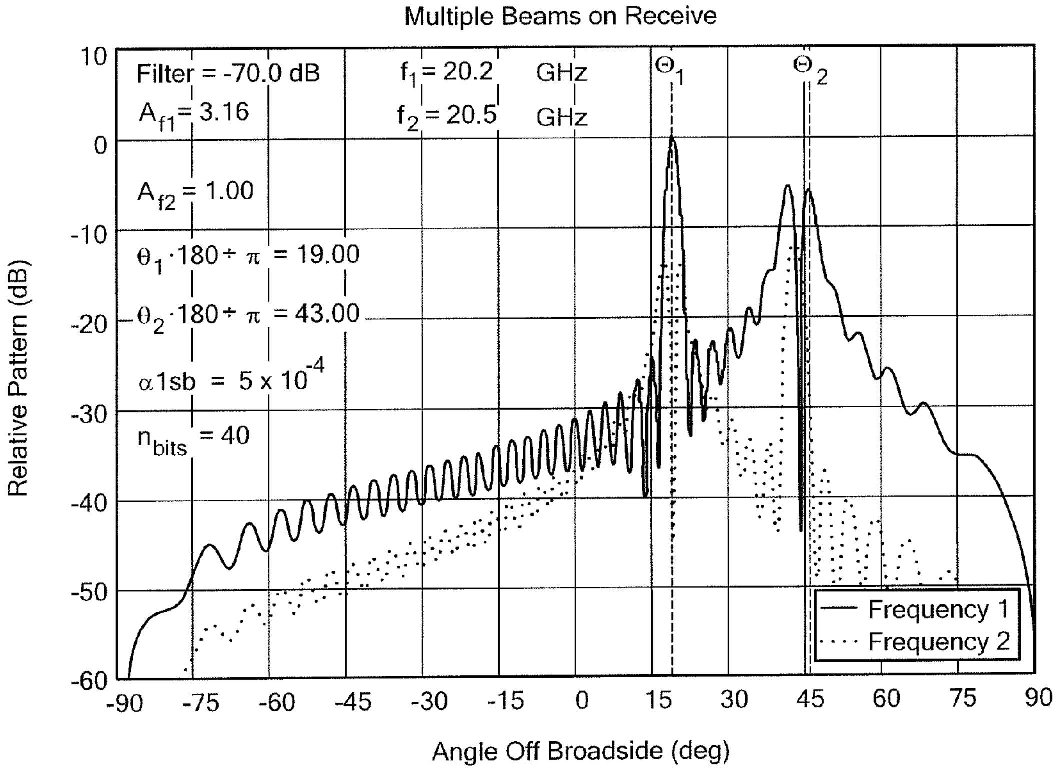
FIG. 10 is a graphical representation of patterns at the sum of sums and sum of differences ports for two independently steered beams.
Figure 11:
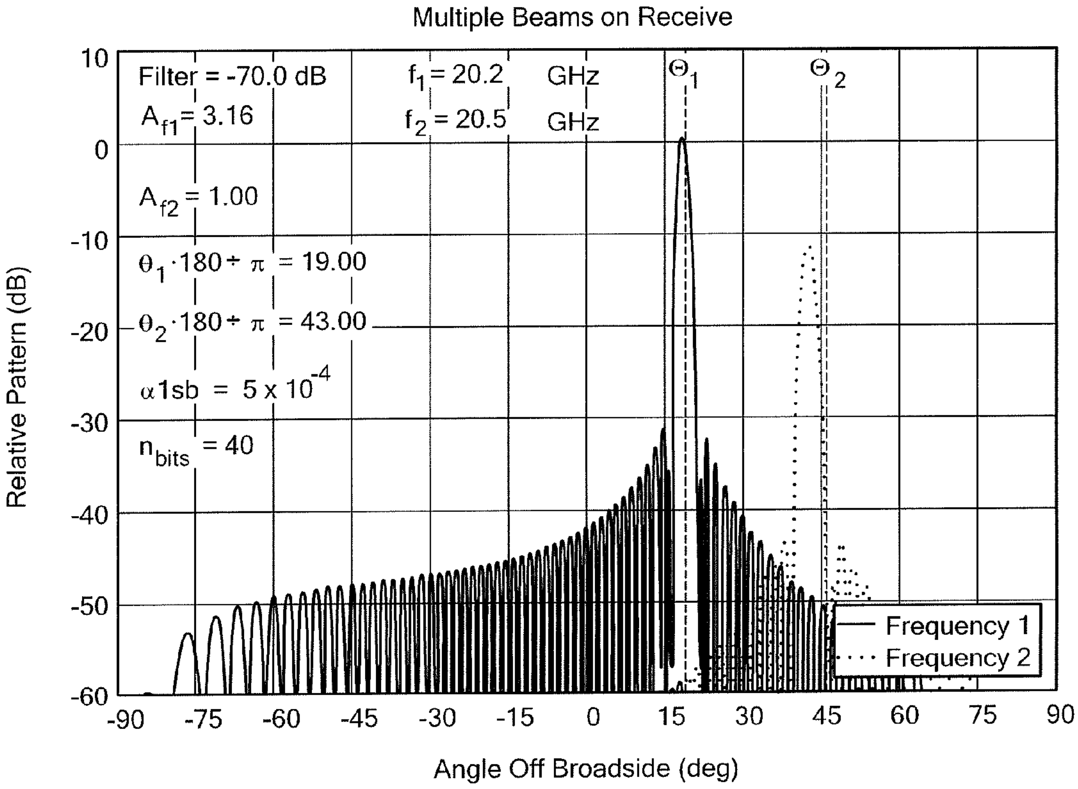
FIG. 11 is a graphical representation of patterns after reduced element spacing.

As an example, FIG. 10 shows patterns at the sum of sums and sum of differences ports for two independently steered beams. Grating lobes are again present, but these are artifacts of the interelement spacing, not the coherence of large aperture segments. The resolution of these lobes is to reduce element spacing. Since the subarray is two elements wide, it is reasonable to reduce the spacing by a factor of two producing the results shown in FIG. 11. Note that grating lobes have been entirely removed and isolation between ports is now diffraction limited—i.e., isolation monotonically increases with array size in the absence of errors.

Figure 12:
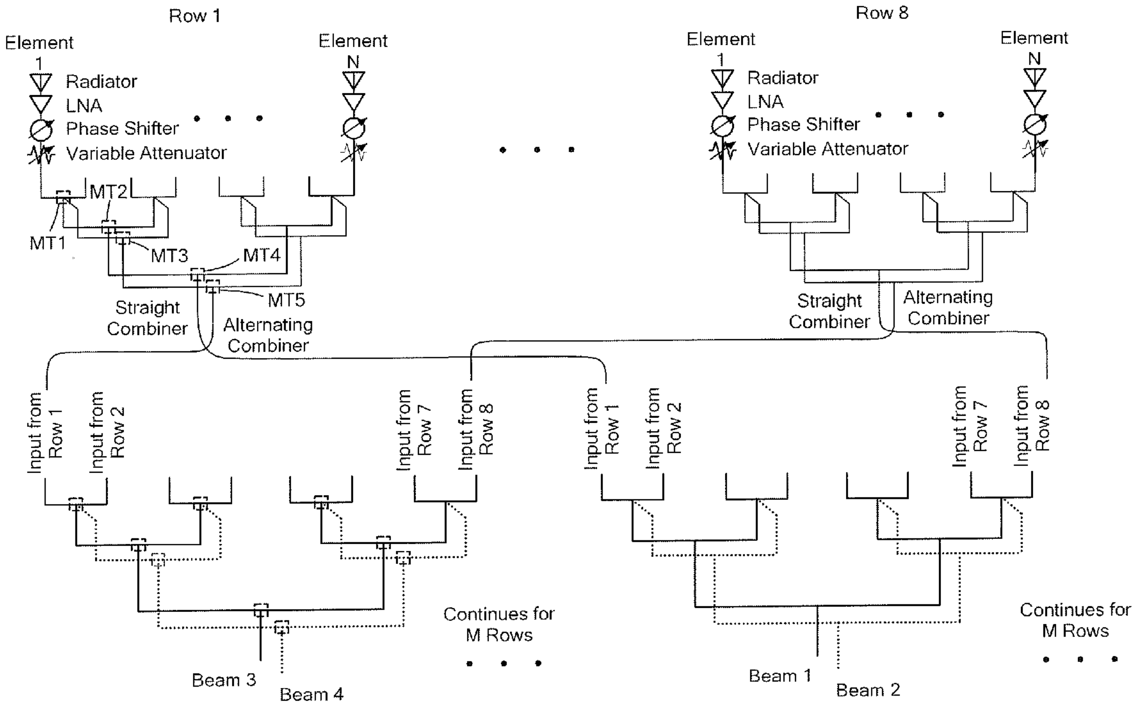
FIG. 12 is a schematic representation of a two dimensional active electronically steered array.

The special case of the linear array can be readily generalized for a 2-D aperture as shown in FIG. 12. Rows include pairs of radiators where each radiator is coupled to a LNA, variable phase shifter, variable attenuator path, as described in FIG. 9. The variable phase shifter and variable attenuator are controlled as described herein.

Outputs from the first pair of attenuators are combined in a magic tee MT1 with sum and difference outputs. The sum outputs are combined in a second magic tee MT2 and the difference outputs are combined in a third magic tee MT3 and so on to provide a straight combiner and an alternating combiner for each row. The illustrated embodiment is shown having eight rows.

The outputs from the rows are then combined to generate beam 1, beam 2, beam 3, and beam 4. As shown in the illustrated embodiment, the straight combiner outputs from the rows are combined to generate beam 1. Beam 2 is generated from the alternating combiner of the straight combiner row outputs. Beam 3 is generated from the straight combiner of the alternating combiner row outputs. Beam 4 is generated from the alternating combiner of the alternating combiner row outputs.

Figure 13A:
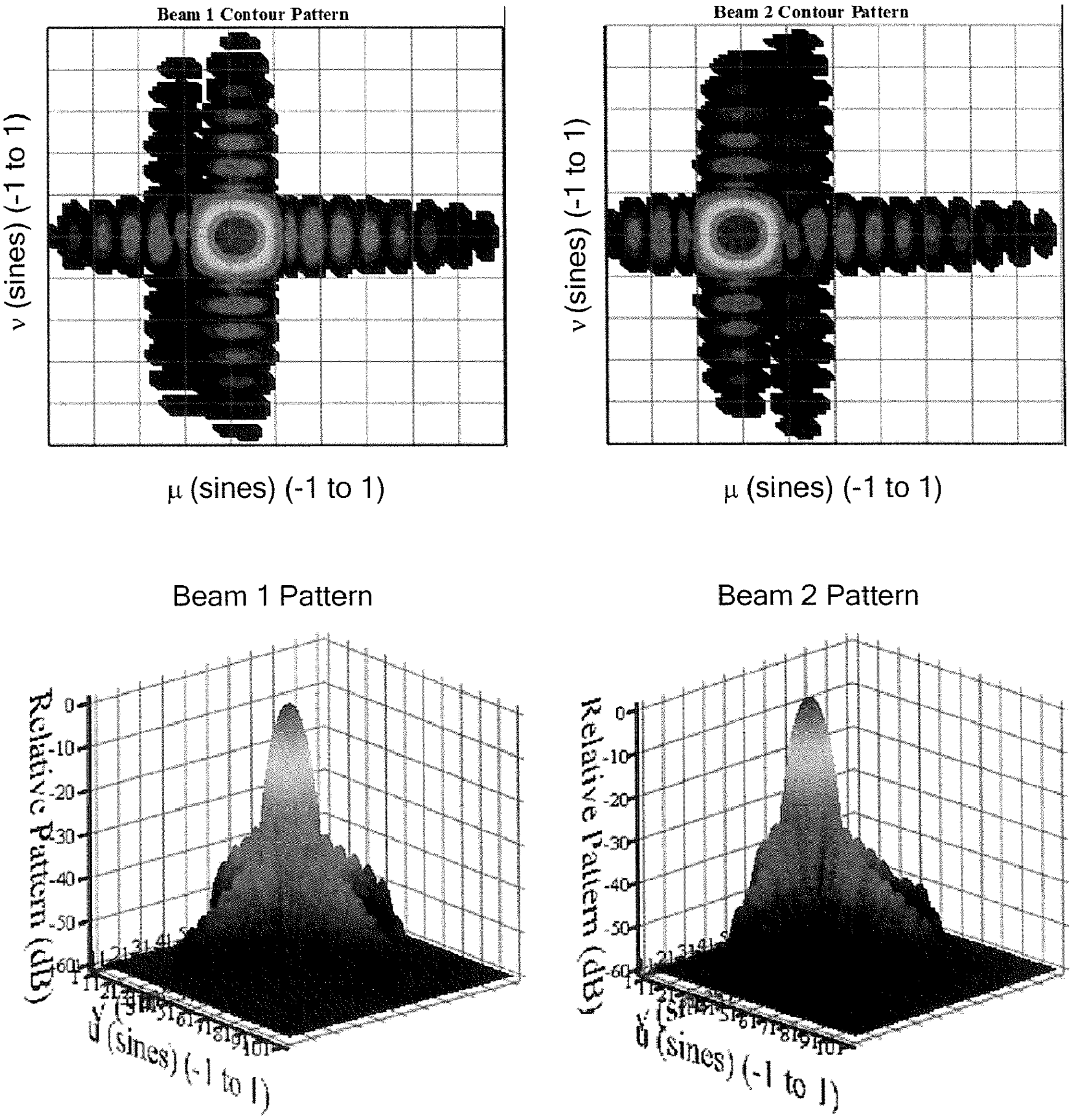
FIG. 13 is a graphical representation of multiple beams.

In this architecture, rows are combined as if they were individual linear arrays of two element subarrays. Then the process is repeated in the orthogonal plane, taking pairs of rows and combining them as two row subarrays. The net result is four orthogonal feed manifold ports, each sustaining a single beam. For entirely arbitrary positioning of the multiple beams, the aperture unit cell is $0.25\lambda_{high}\times0.25\lambda_{high}$. An example of multiple beams produced by this architecture is shown in FIG. 13.

Figure 14:
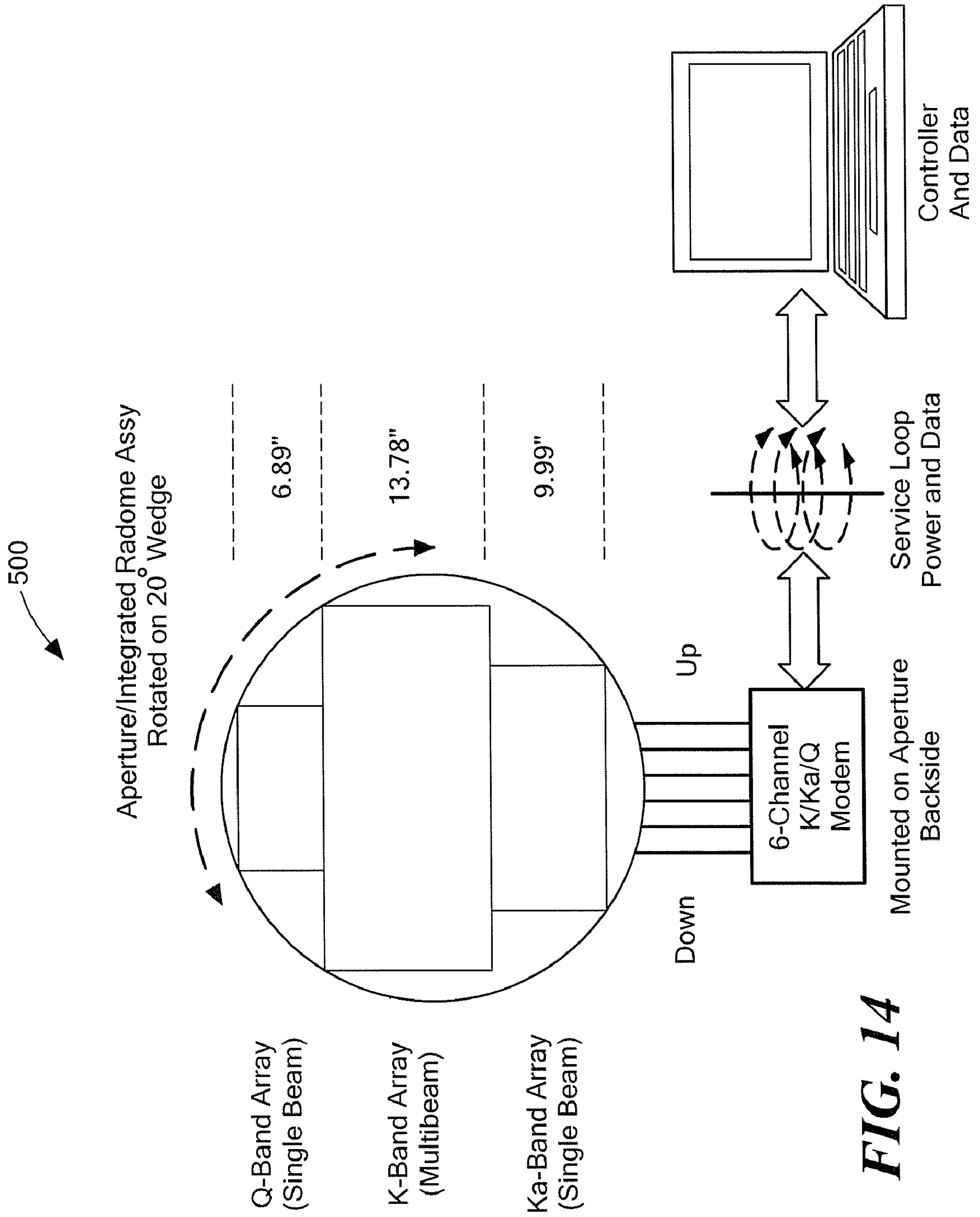
FIG. 14 is a schematic representation of an exemplary communications on the move system.
Figure 15A:
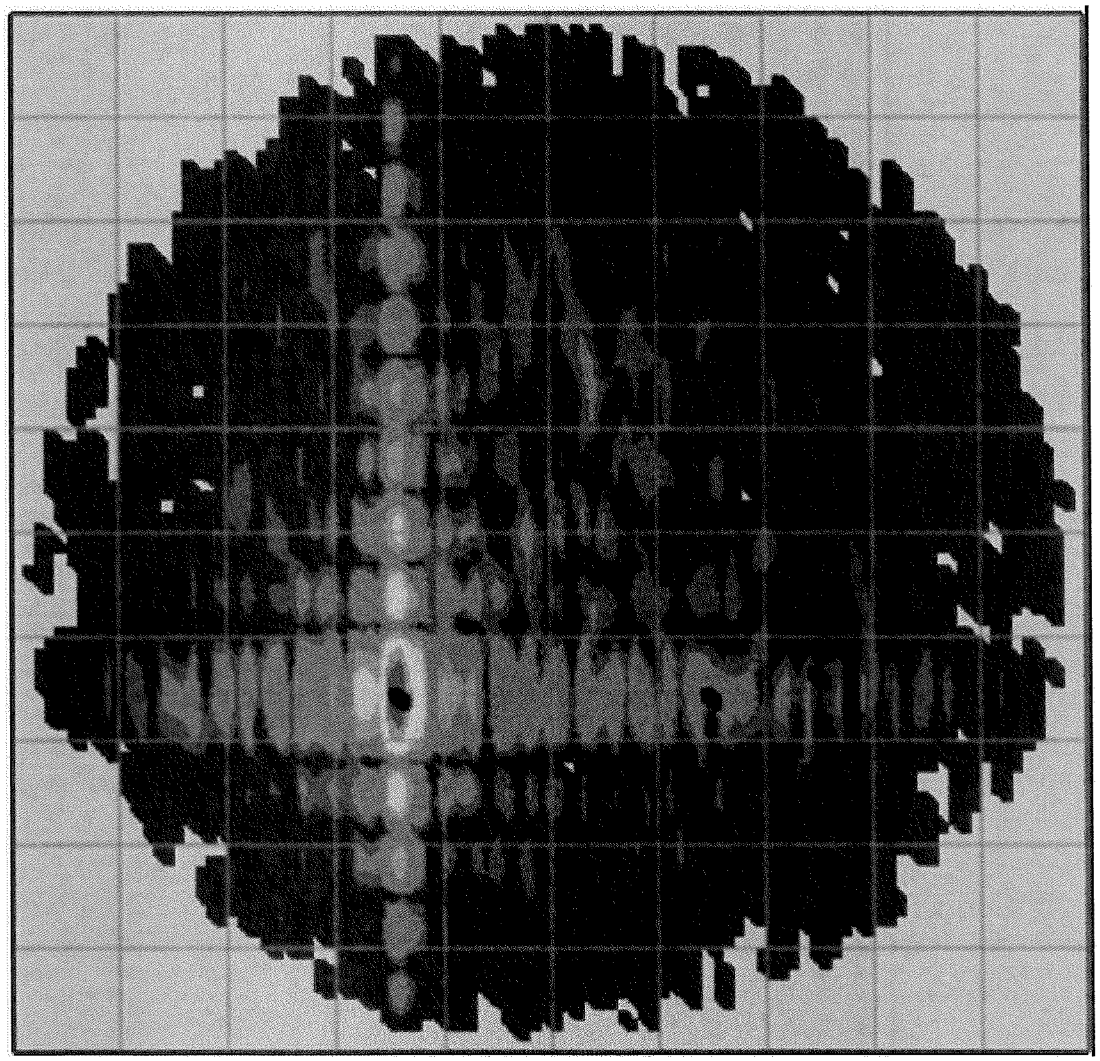
FIG. 15A is a graphical representation of an exemplary beam 1.
Figure 15A:
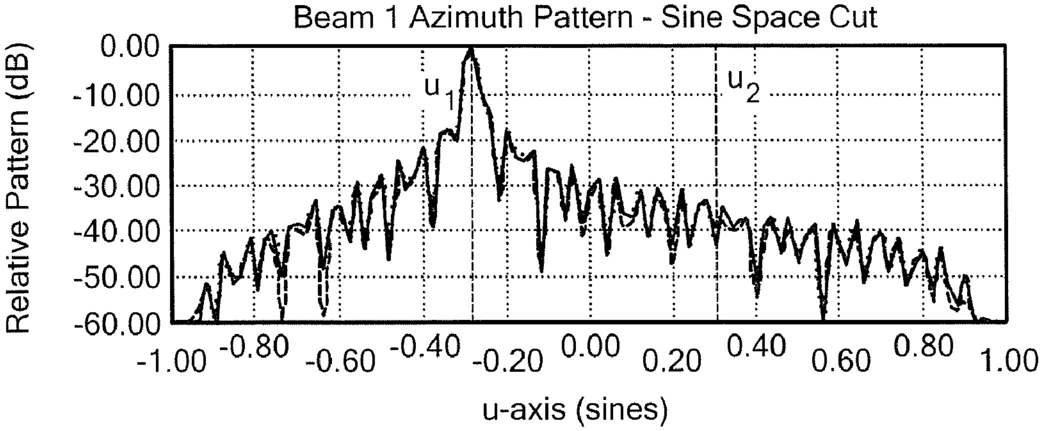
Figure 1:
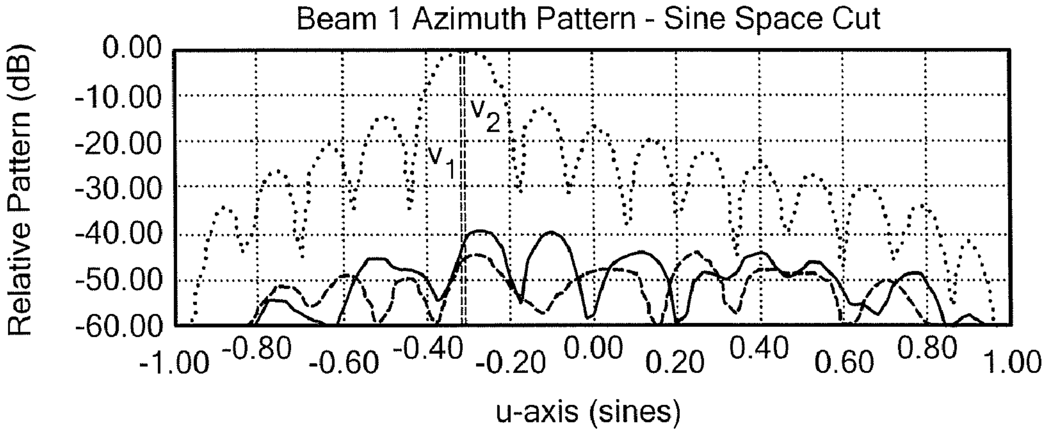
Figure 15B:
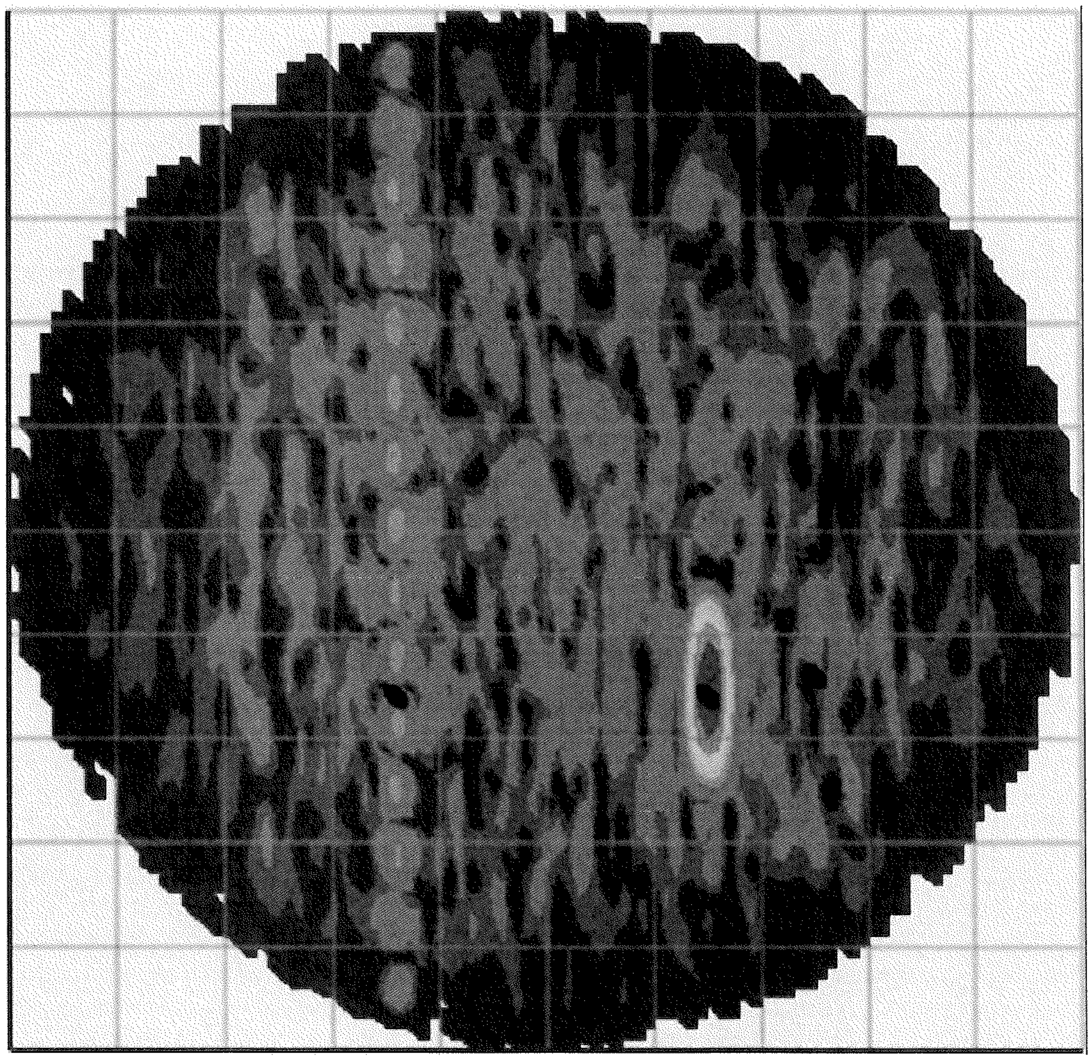
FIG. 15B is a graphical representation of an exemplary beam 2.
Figure 15B:
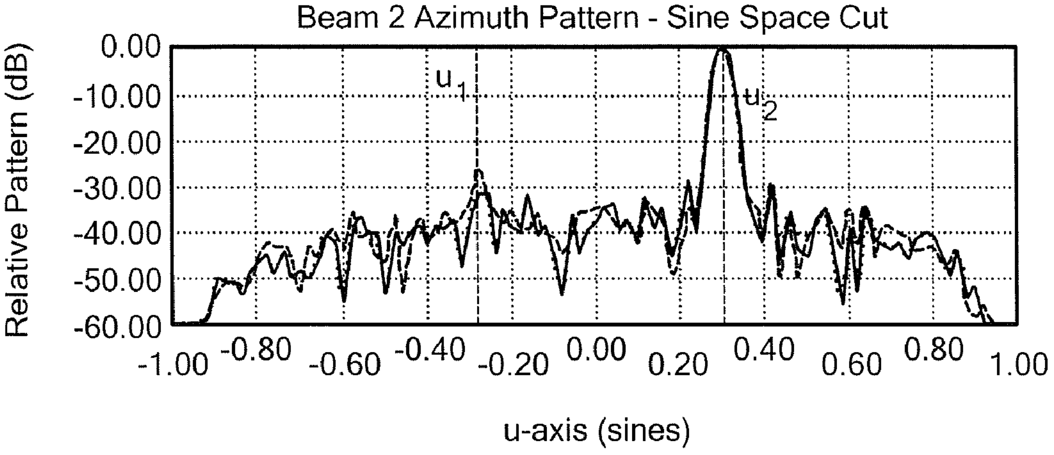
Figure 1:
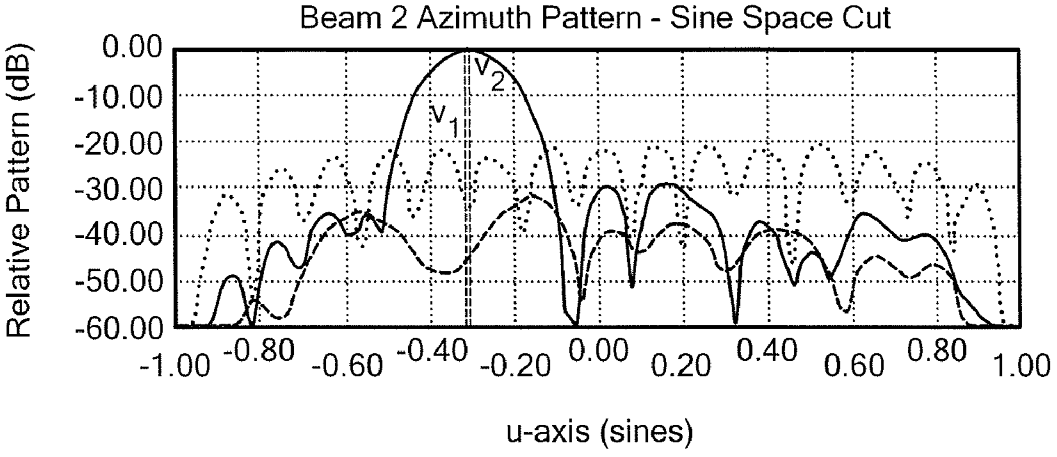
Figure 16A:
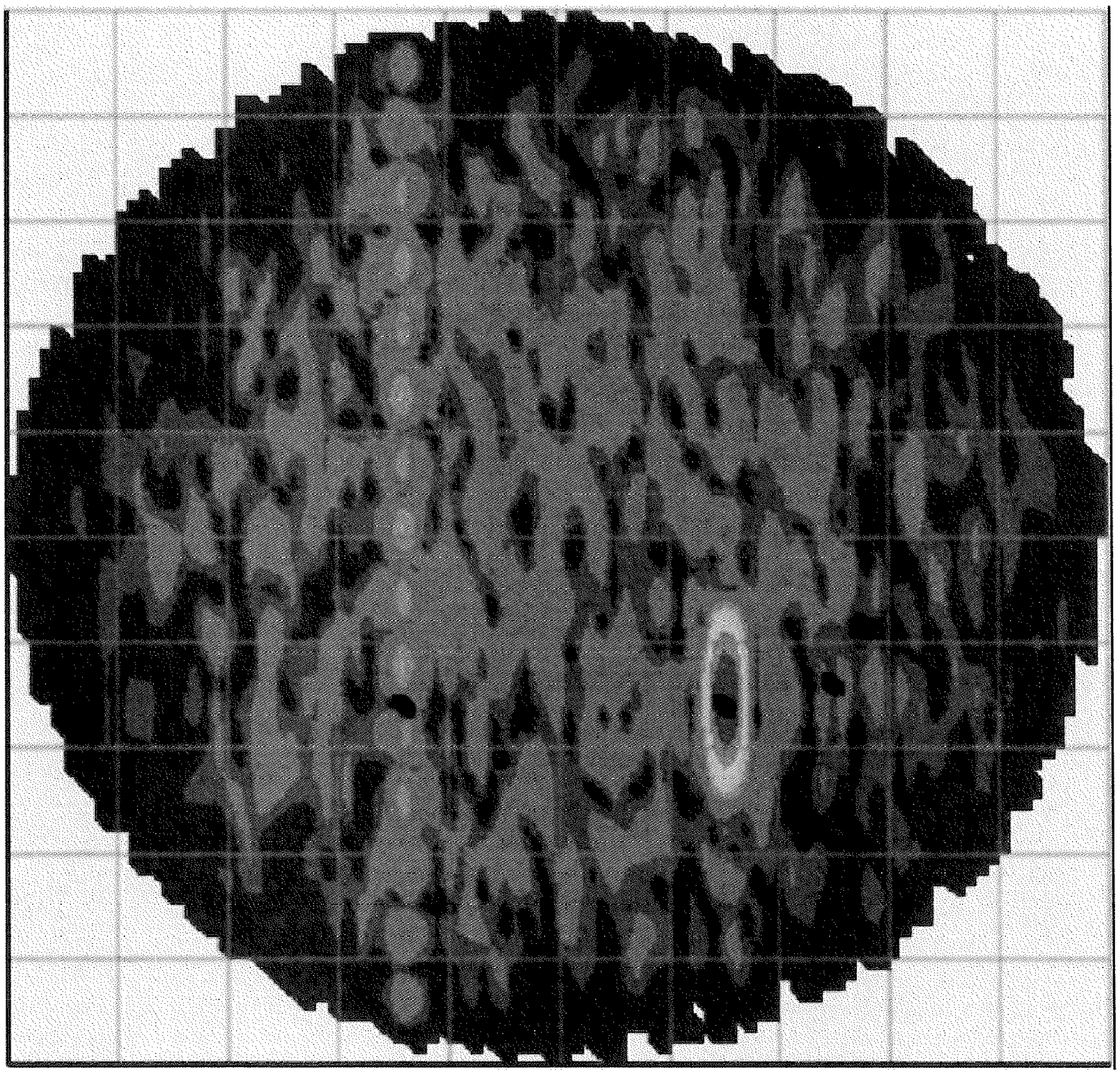
FIG. 16 is a graphical representation of a heavily weighted beam.
Figure 16B:
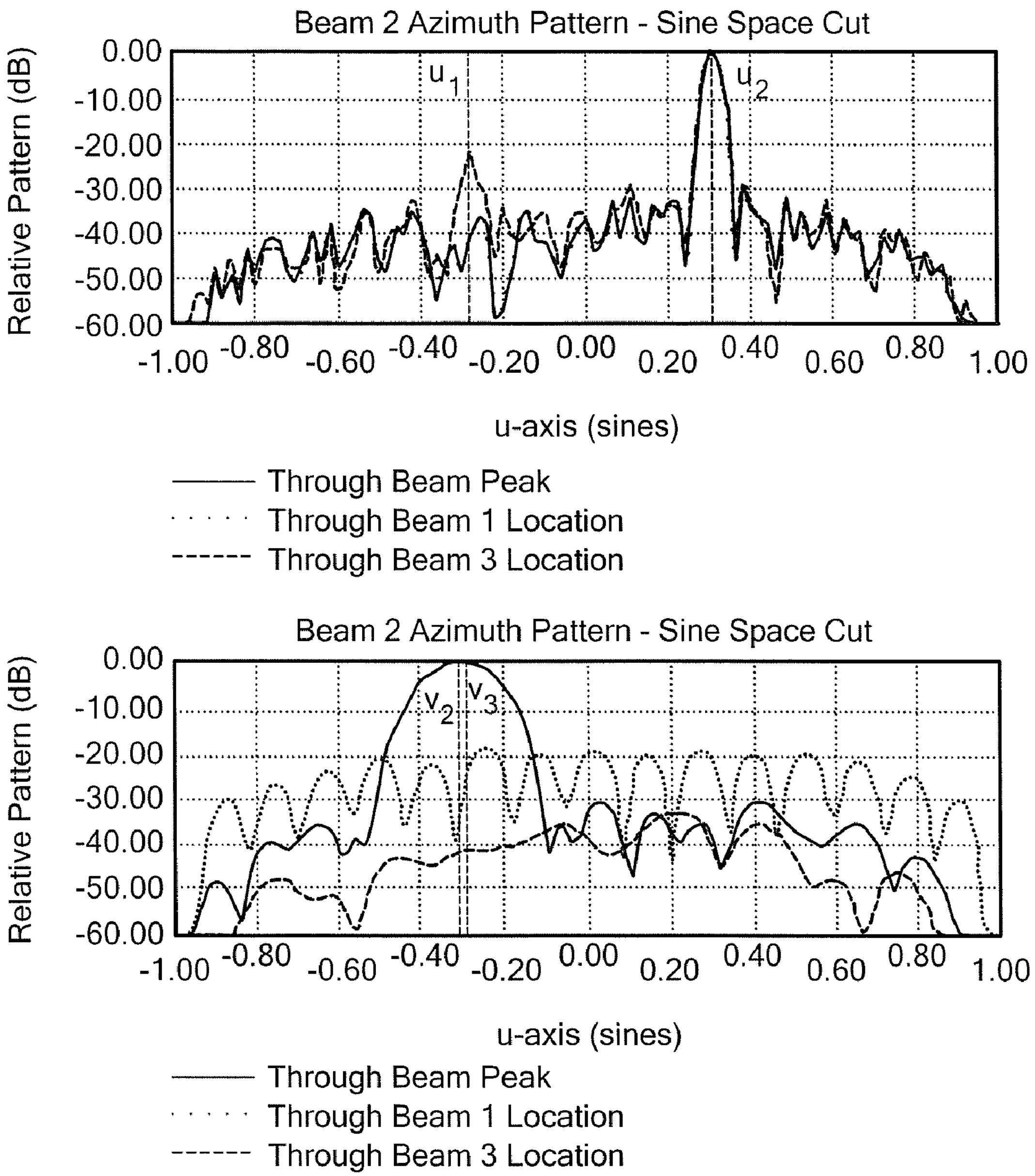
Figure 17A:
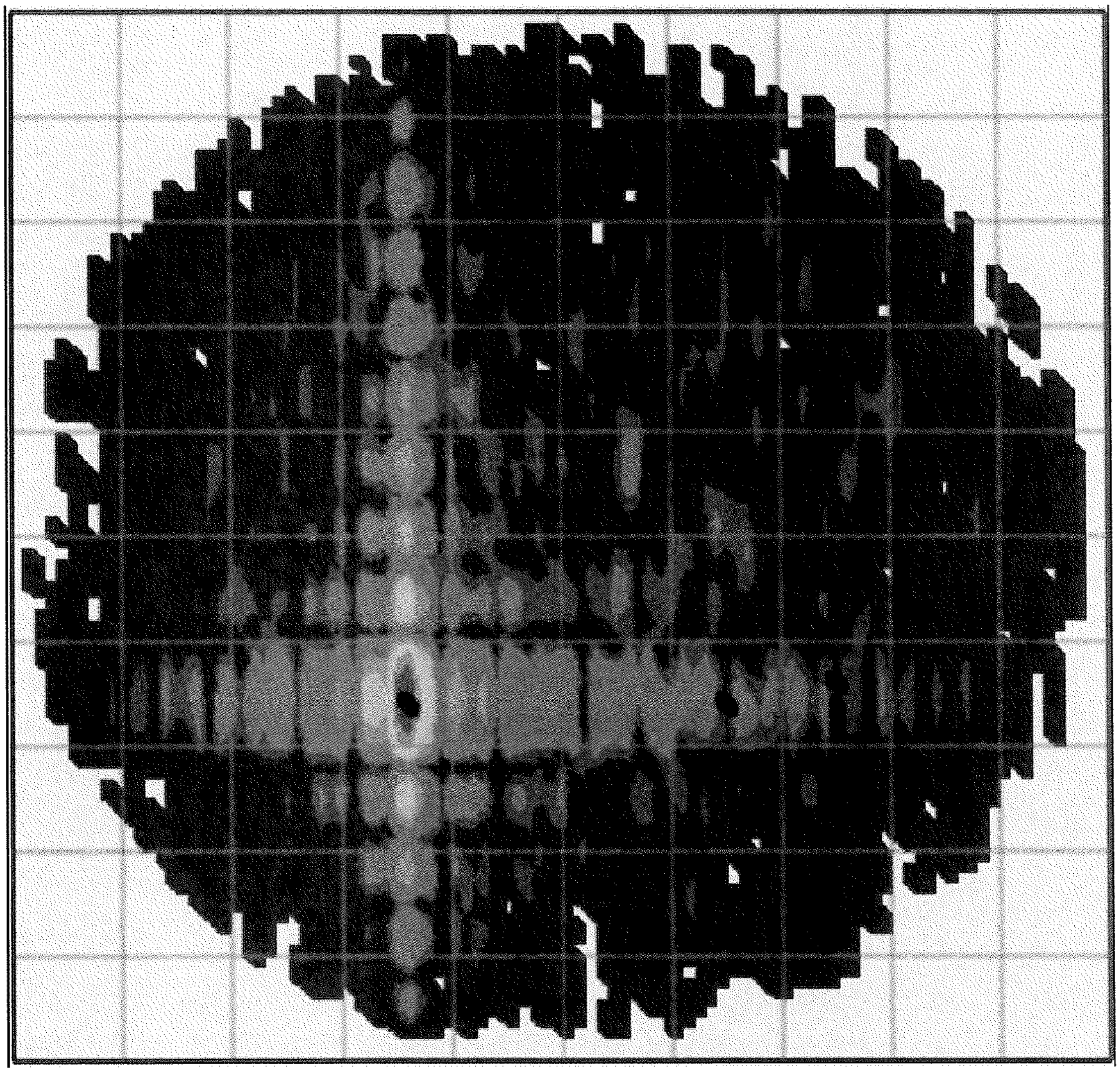
FIG. 17 is a graphical representation of an unweighted beam.
Figure 18A:
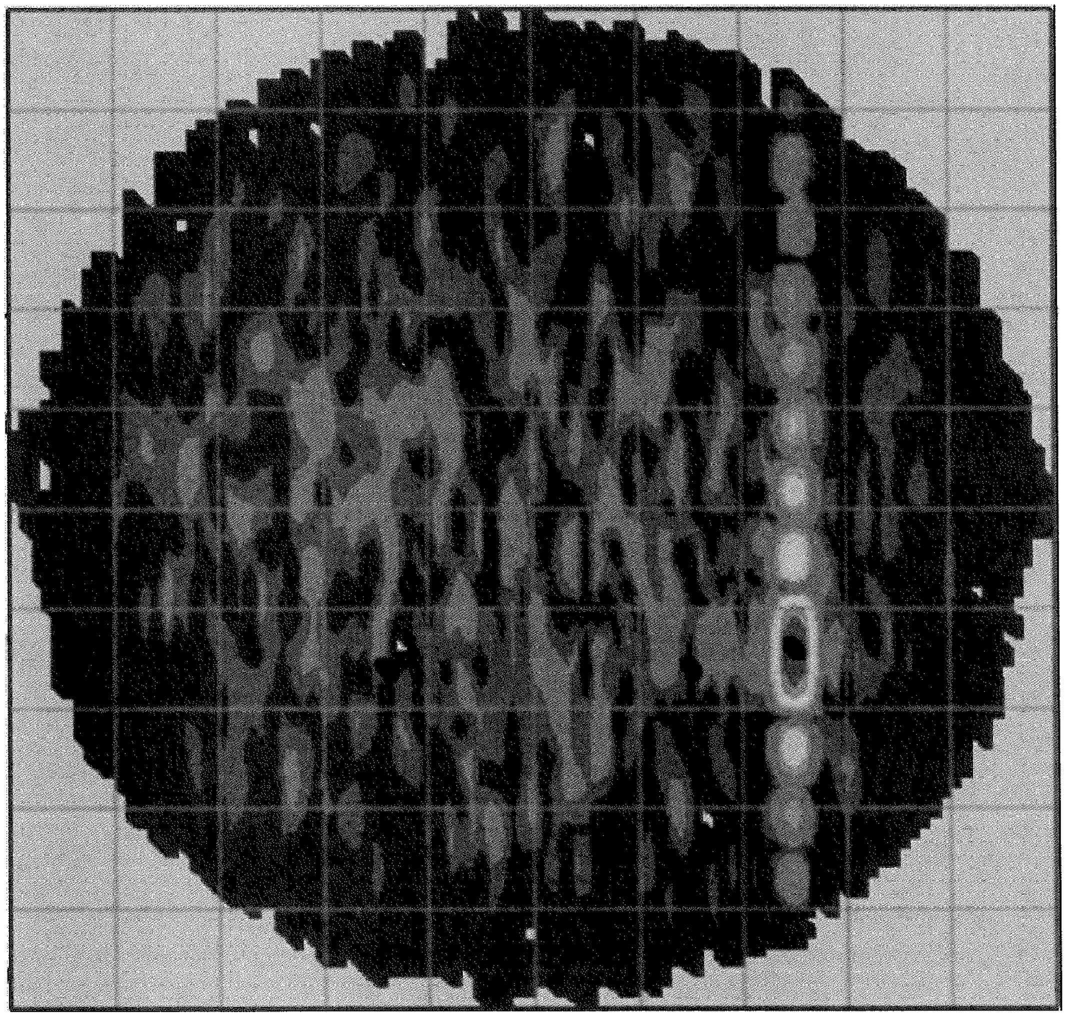
FIG. 18 is a graphical representation of a beam heavily weighted in one plane and unweighted in the other.
Figure 18B:
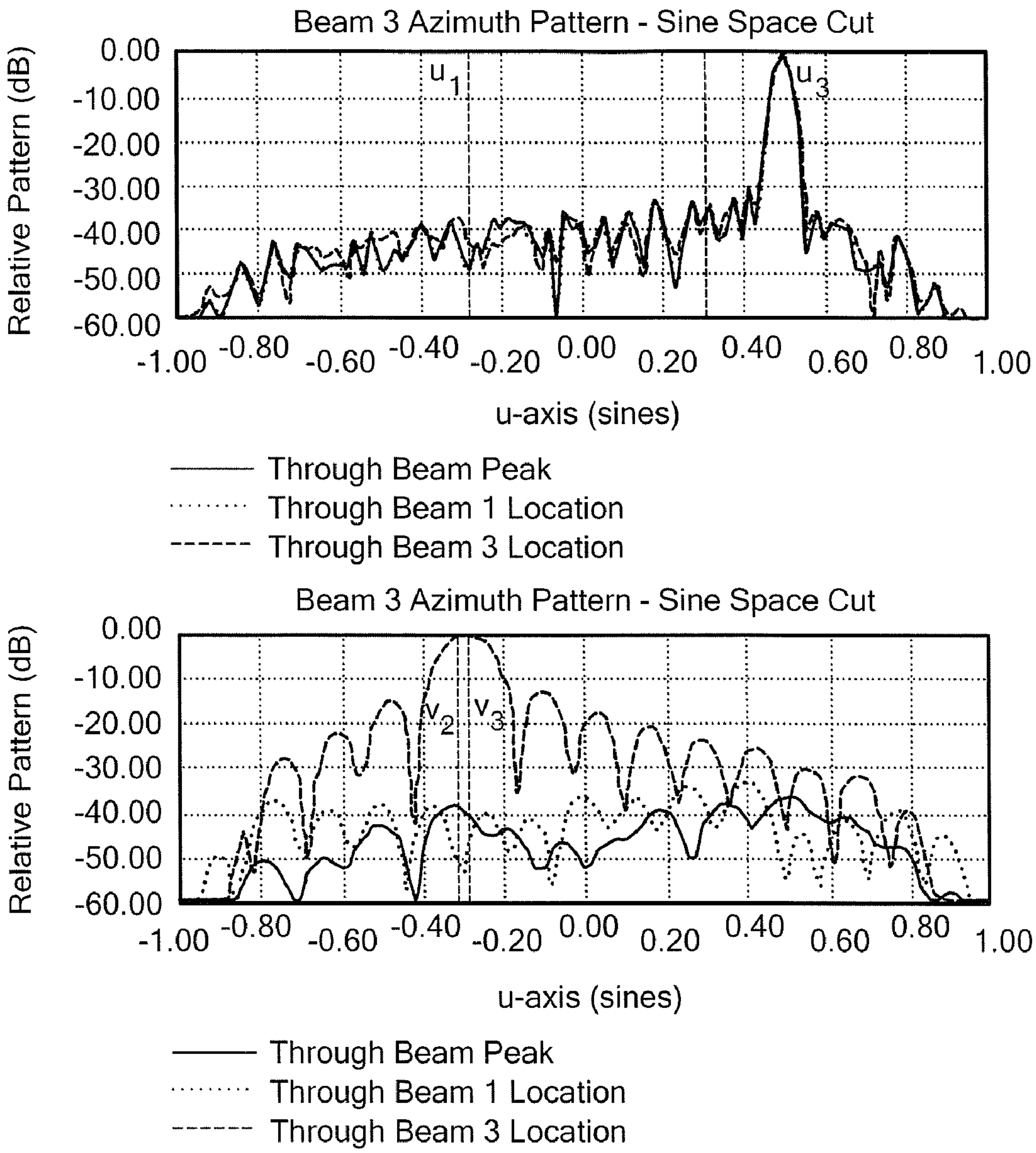
Figure 19A:
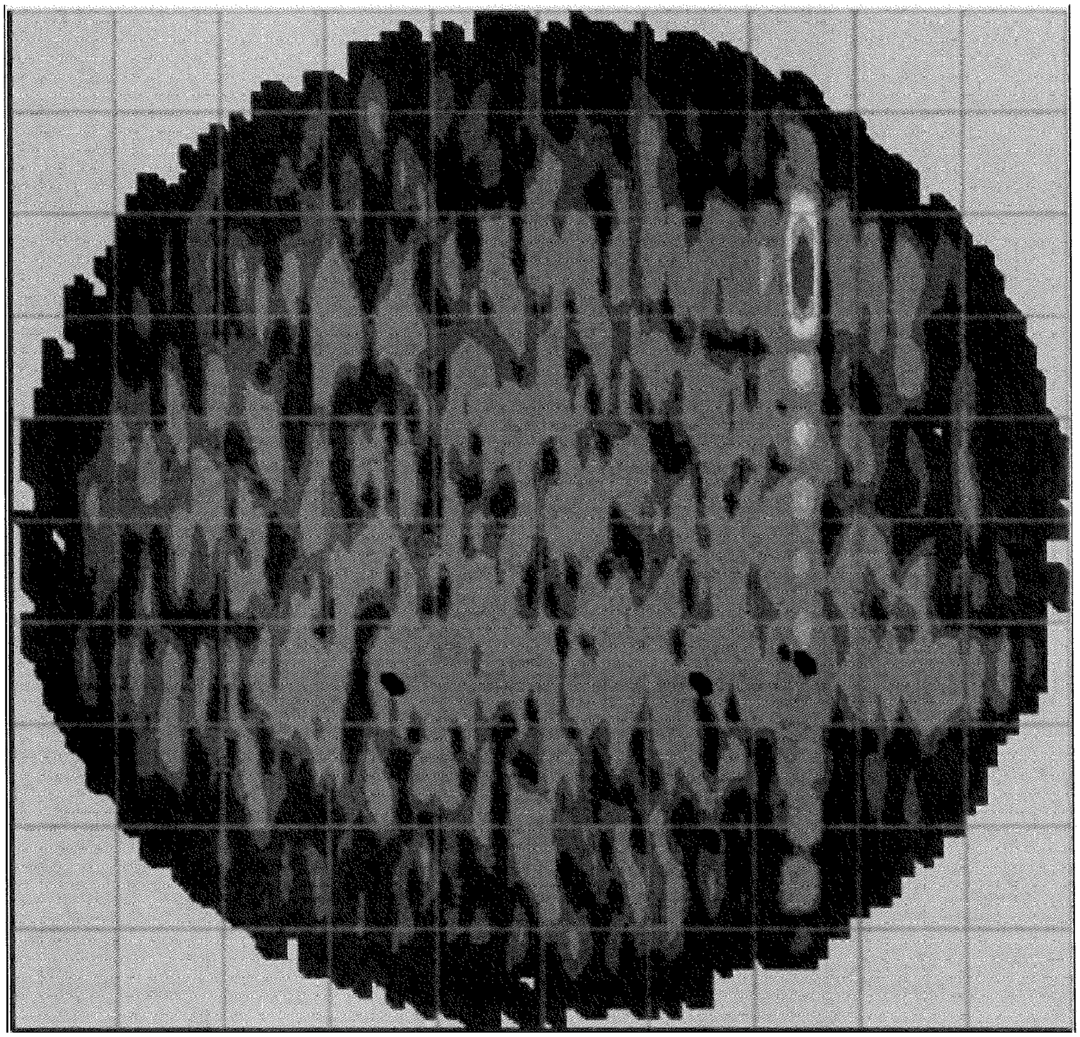
FIG. 19 is a graphical representation of a randomly positioned $4^{th}$ beam with light taper.
Figure 19B:
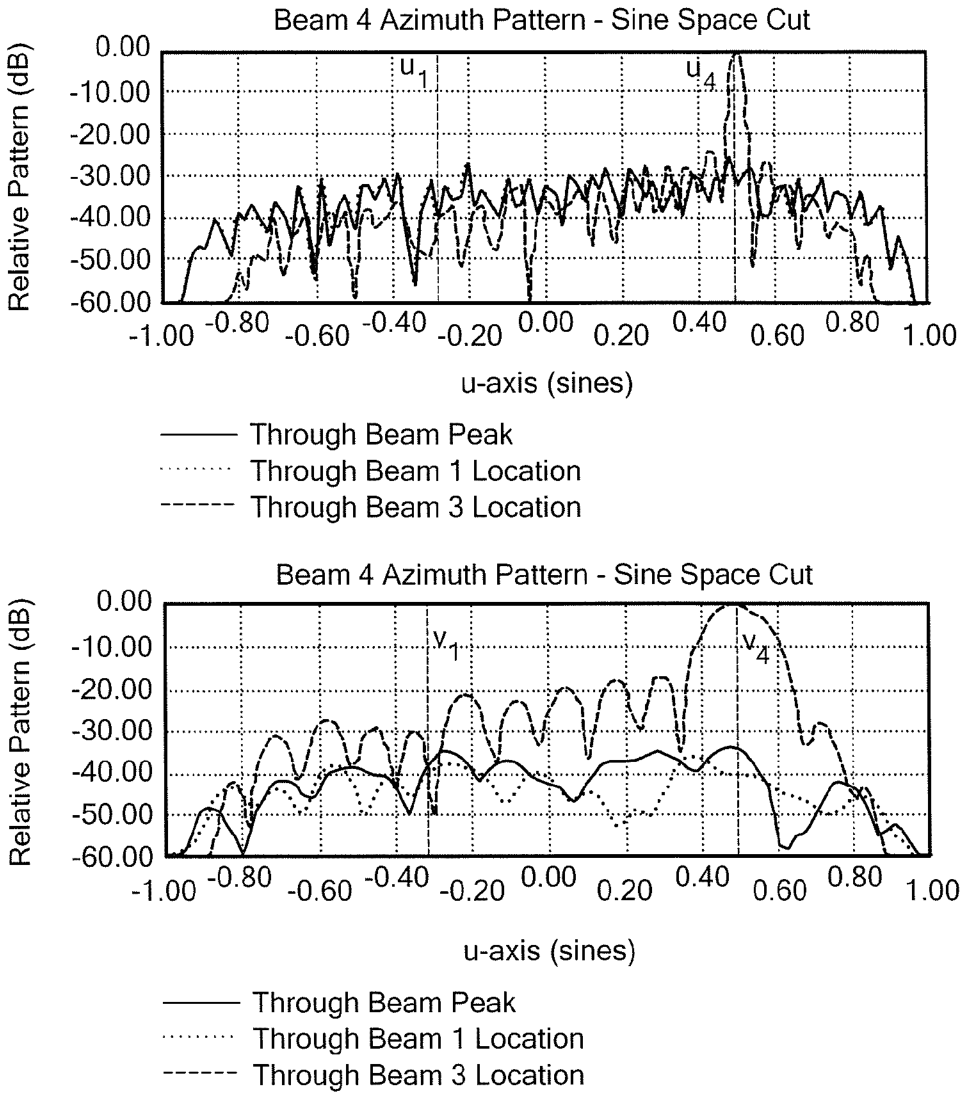
Figure 20A:
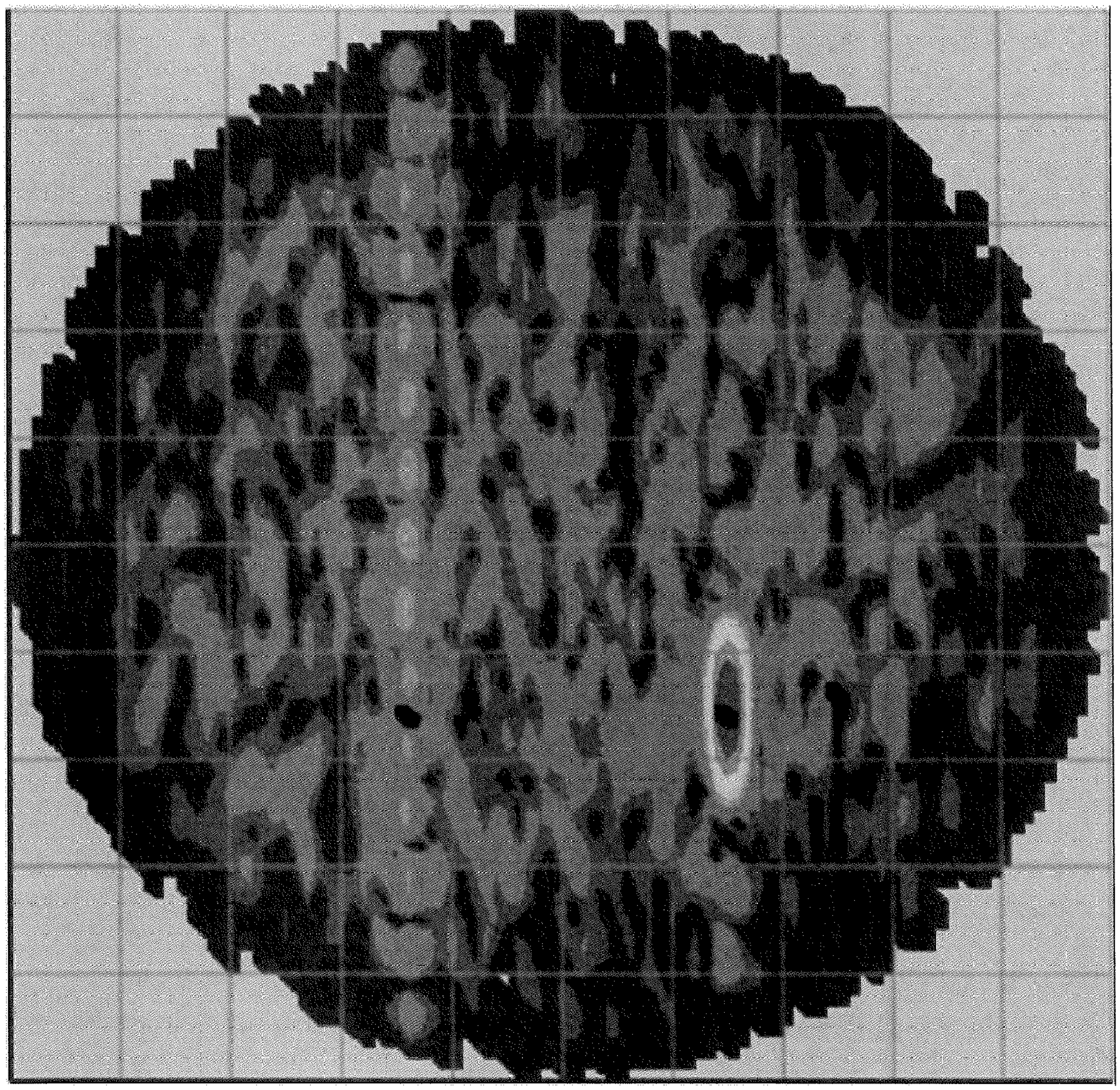
FIG. 20 is a graphical representation of a heavily weighted beam.
Figure 20B:
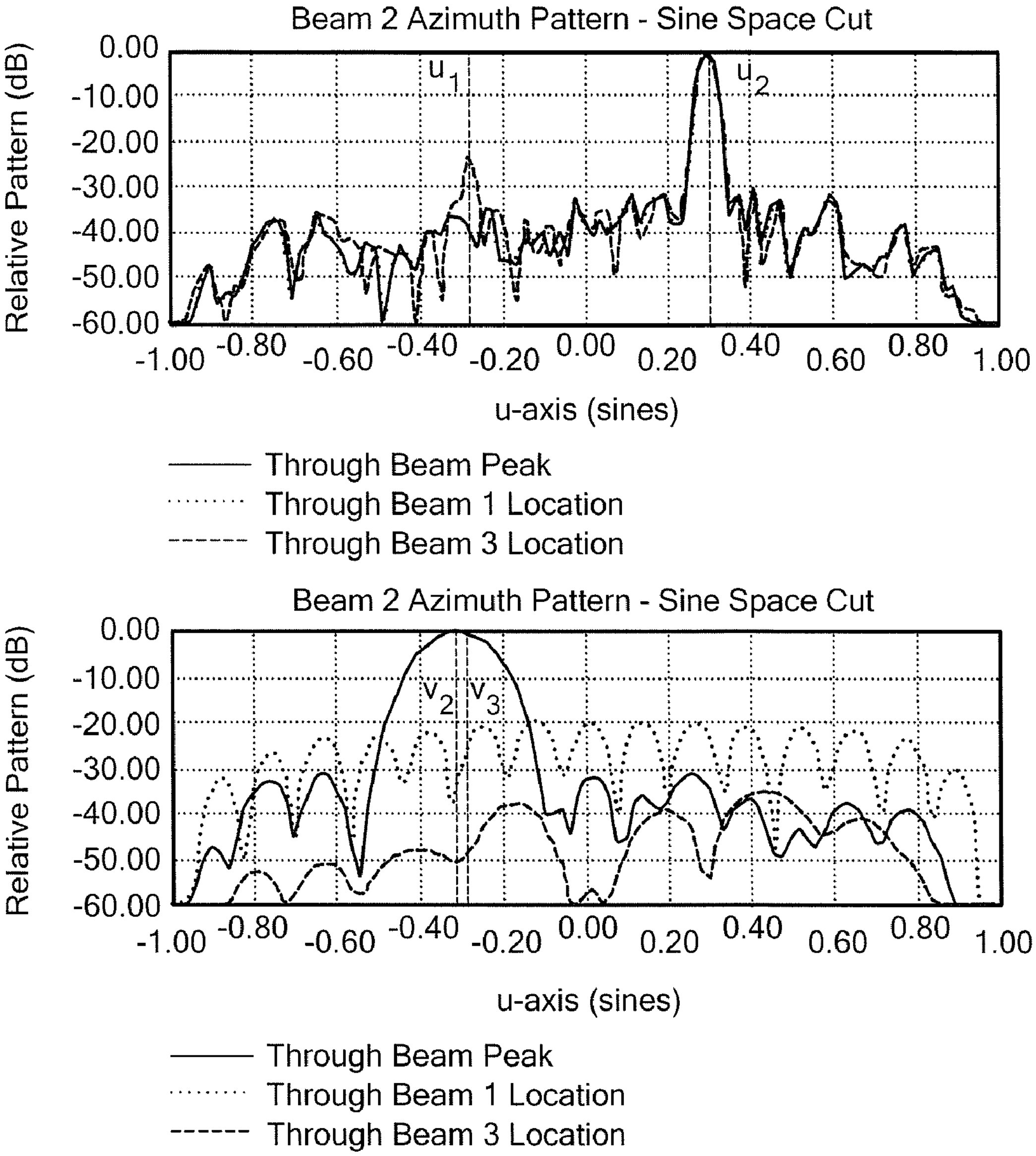
Figure 21A:
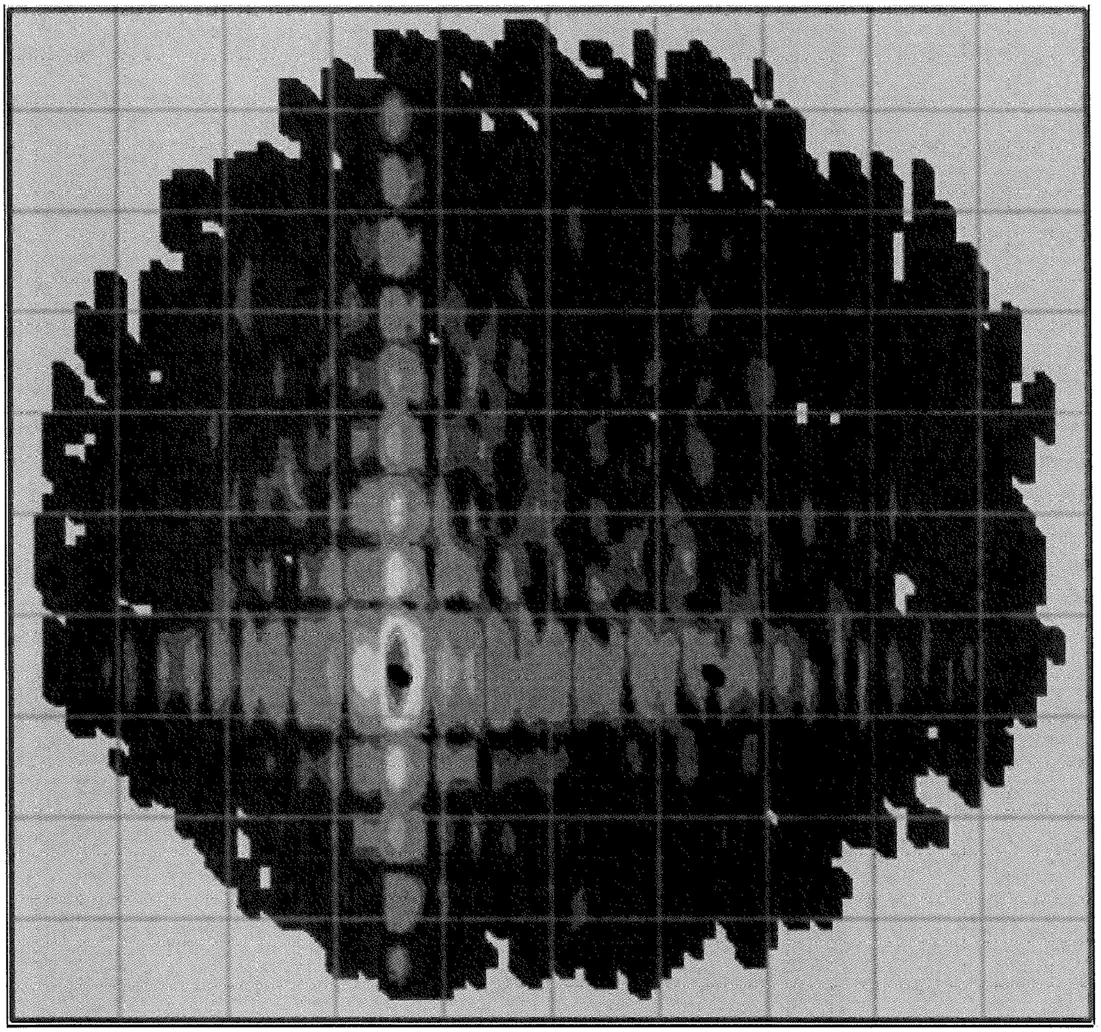
FIG. 21 is a graphical representation of a beam 1 not affected by the difference pattern developed in port 4.
Figure 22A:
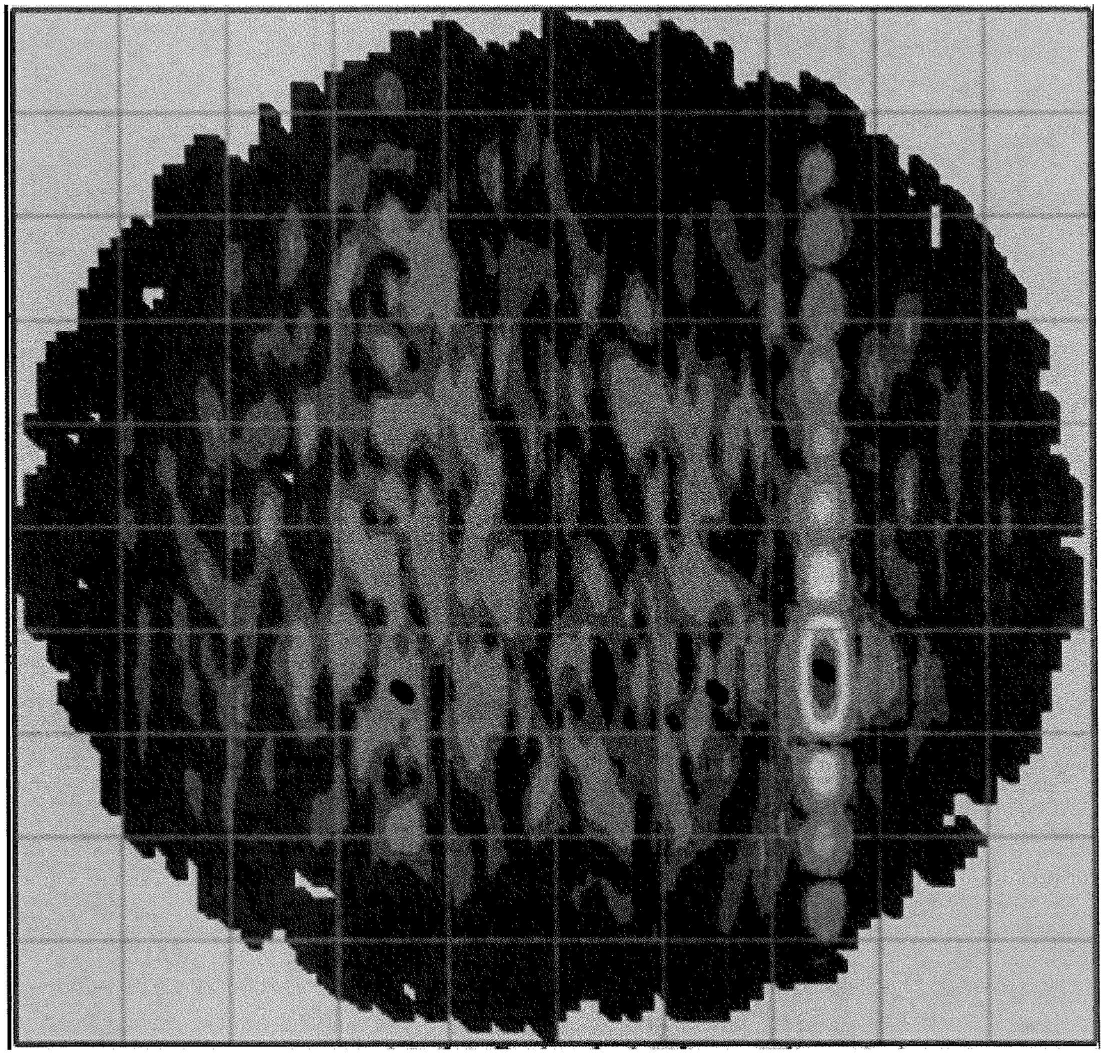
FIG. 22 is a graphical representation of beam 3.
Figure 23A:
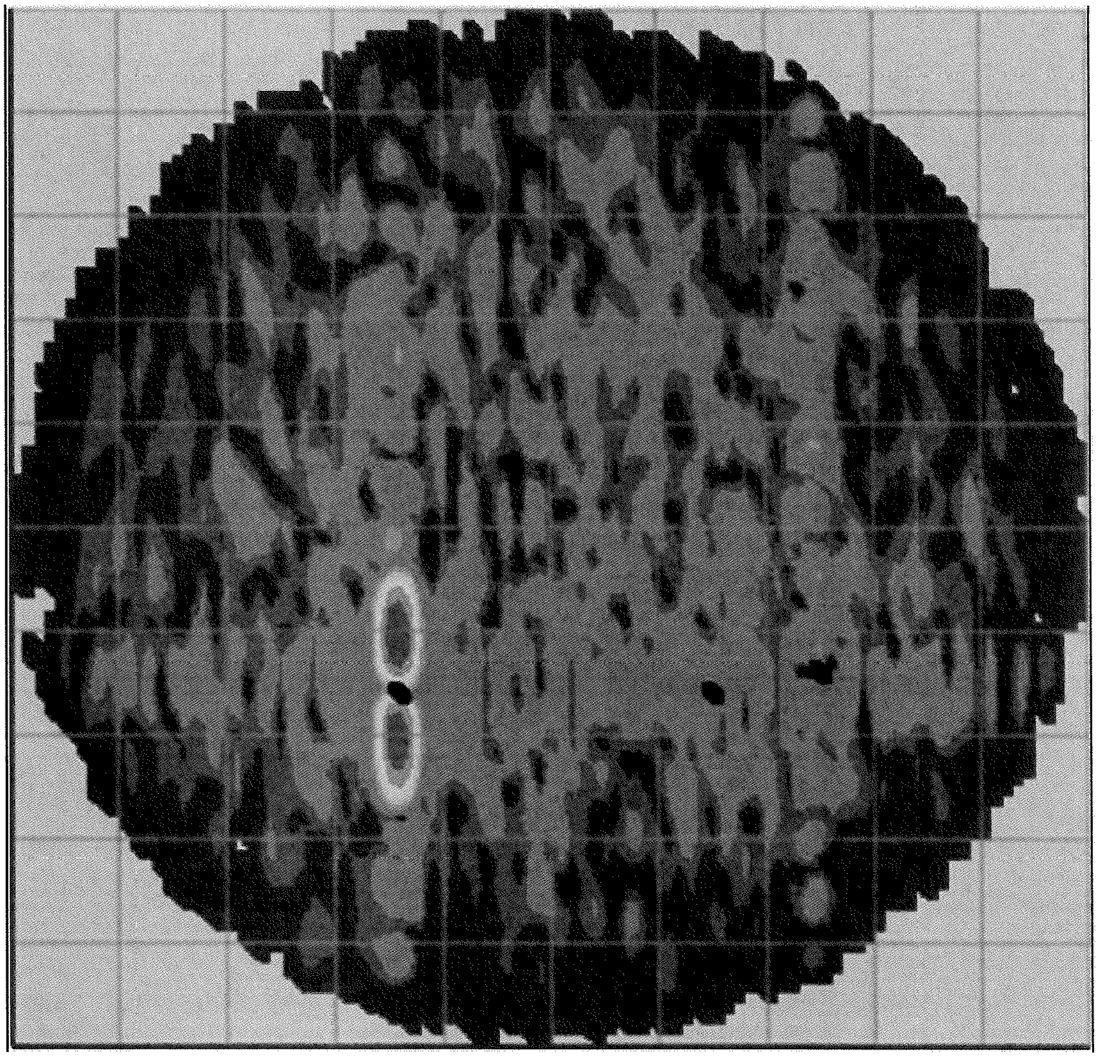
FIG. 23 is a graphical representation of a low sidelobe difference pattern for beam 4.
Figure 23B:
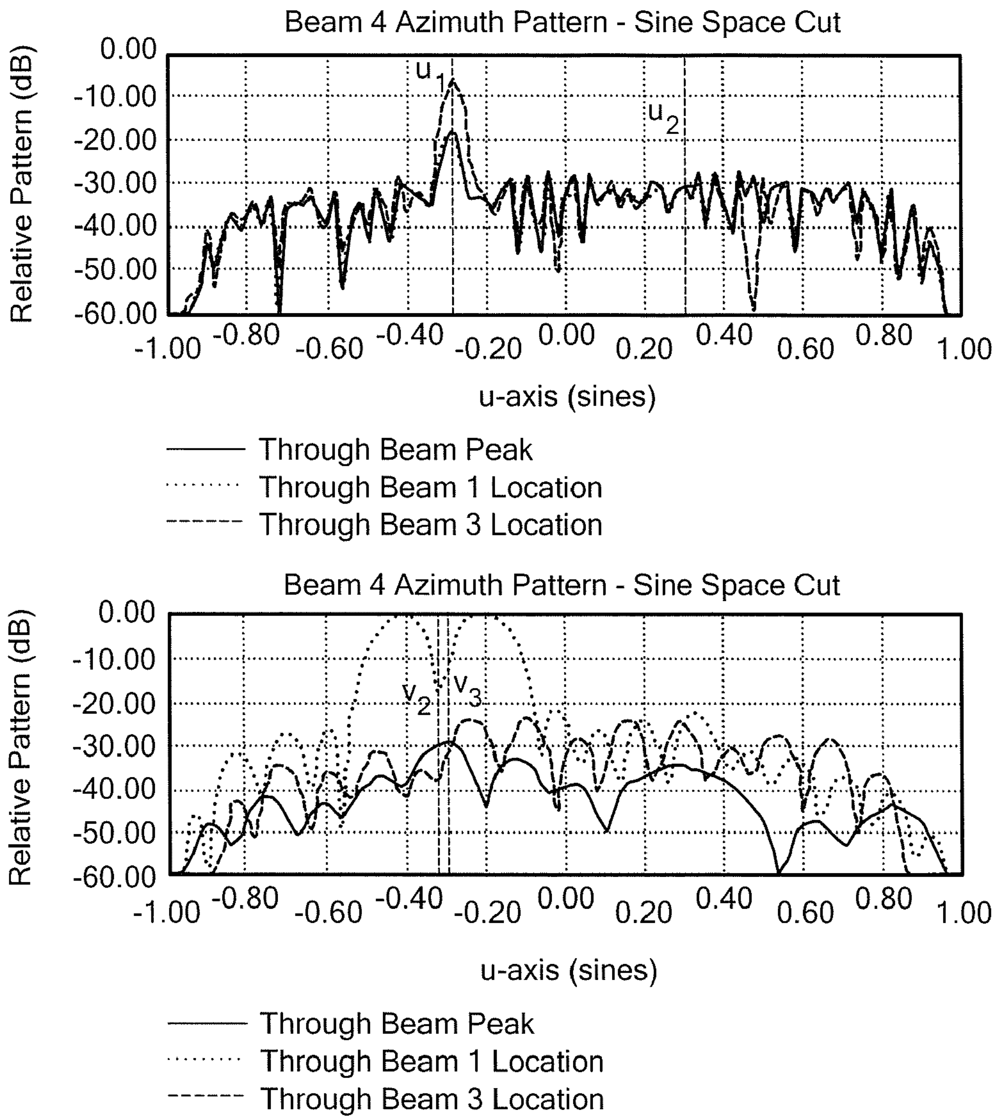

To sustain two simultaneous beams which are steered in a single plane that is parallel to a cardinal axis of the array, the aperture unit cell can be increased to $0.5\lambda_{high}\times0.25\lambda_{high}$. This is accomplished by forming the sum of differences in the plane orthogonal to the plane of scan. Such a configuration is useful for a rectangular aperture mounted on a turntable with elevation gimbal and tracking the plane of geosynchronous satellites, as might be desired for a Communications-on-the-Move (COTM) SATCOM terminal system, 500, as shown in FIG. 14. The system 500 includes an integrated radome assembly rotatable, for example, on a 20 degree wedge. The aperture includes a single beam Q-band array, a multibeam K-band array, and a single beam Ka-band array in the illustrative embodiment. A multi-channel modem includes up and down links that can be mounted on backside of the aperture. Examples of multiple beams produced with this system architecture are shown in FIGS. 15*a* and 15*b*.

Because of port orthogonality, each independent beam that is created by the architecture is definable in its own right. It is common in AESA design to amplitude weight the aperture illumination such that pattern sidelobes, the artifacts of diffraction limited optics, are reduced at the expense of antenna directive gain. With the exemplary architecture embodiments, this weighting can be independently assigned to each beam, producing beams with differing sidelobe levels and directivities. An example of this capability is illustrated in FIGS. 16 through 19. In this example, beam 1 is unweighted, beam 2 is heavily weighted with a truncated Gaussian distribution for −32.1 dB peak sidelobes in two planes, beam 3 is heavily weighted in one plane and unweighted in the orthogonal plane, and beam 4 is lightly weighted with a truncated Gaussian distribution for −20.8 dB peak sidelobes in two planes. In this rectangular aperture example, three beams are aligned to provide simultaneous downlink capability to three satellites with the aperture long dimension parallel to the plane of satellites. The fourth beam is positioned at random.

It is understood that not all beams need be sum beams. In certain COTM systems, it would be advantageous to form an independently weighted and steerable difference pattern for beacon tracking. An example is shown in FIGS. 20 through 23 for the same set of beams illustrated in FIGS. 16 through 19. Beam 4 is a difference pattern steered to the position of beam 1, and weighted with a truncated Rayleigh distribution in the plane orthogonal to the null, and with a −32.1 dB sidelobe truncated Gaussian distribution in the plane of the null. The difference pattern is obtained from the normally terminated port at feed manifold output for beam 4.

It should be noted that the four orthogonal ports can be available at the antenna quadrant level, as implied in FIG. 12. This being the case, monopulse networks can be introduced to independently combine each set of quadrant level orthogonal ports, thus providing up to 16 channels with four independently steered monopulse beam sets.

Exemplary embodiments of the inventive multibeam array architecture can provide up to four simultaneous, independent monopulse beam sets using a single array aperture, each element of the aperture being controlled by a single complex weight. When implemented, the array achieves nearly full aperture directivity (typical directivity losses are on the order of 0.2 dB) for each beam. Port isolation is controlled as in any antenna by the spatial filtering of the realized patterns. Depending on the application of multiple beam technology, the penalty of decreased unit cell size may be significantly mitigated. It is understood that a suitable radiating element can provide multiple beams with at least some degree of polarization selectivity.

In another aspect of exemplary embodiments of the invention, an exemplary active array radiator is provided for dual circular polarized AESA antennas. The inventive radiator embodiments permit simultaneous reception of Left Hand Circularly Polarized (LHCP) and Right Hand Circularly Polarized (RHCP) plane waves in the exemplary AESA/ESA architectures described above, for example.

In an exemplary embodiment, an exemplary AESA system, such as those described above, includes an inventive radiator enabling the simultaneous reception of up to four circularly polarized (CP) plane waves having any combination of LHCP and RHCP from spatially diverse sources using a single complex phase/amplitude control at each radiating phase center. Inventive active radiator embodiments support the reception of multiple co-frequency signals provided the directions of incidence are separated by at least one beamwidth.

In general, exemplary embodiments of the radiator are based on the principle that the noise figure of an AESA is primarily determined by the noise figure of the first Low Noise Amplifier (LNA) and the ohmic loss preceding the LNA provided the LNA electronic gain is sufficiently high to overcome subsequent ohmic losses in the RF architecture.

Figure 24:
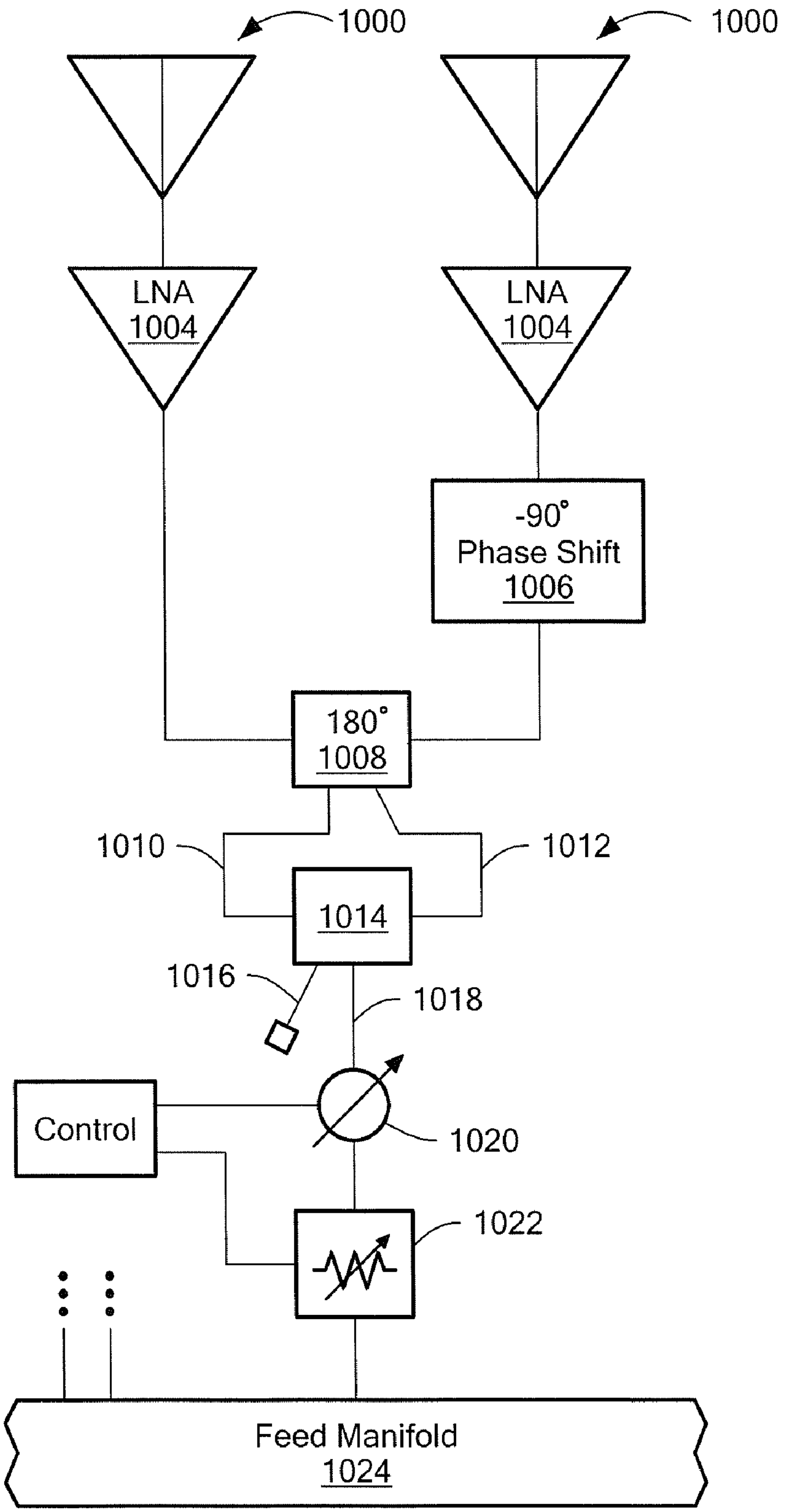
FIG. 24 is a schematic representation of exemplary active radiators having accessible ports connected to low noise amplifiers.

FIG. 24 shows exemplary active radiators 1000 having accessible ports connected to LNAs (low noise amplifiers) 1004. In one embodiment, the radiators 1000 are provided as a cophasal, dual linear passive array radiator, such as a quad notch radiator. Other passive array radiators that can support dual orthogonal linear polarizations can be used.

The output of one of the LNAs 1004 is phase shifted 90 degrees by a phase shifter 1006. In one embodiment, the phase shifter 1006 is provided by insertion of a line length for narrow band applications (e.g., less than about 5% operational bandwidth). In another embodiment, the phase shift 1006 is provided by introduction of a wideband fixed phase shifter for wider bandwidth applications.

The responses from the LNA 1004 and phase shifter 1006 are summed in a magic tee 1008 or other matched 4-port 180 degree hybrid RF structure. The sum 1010 and difference 1012 outputs of the magic tee 1008 are connected to the through arms of a second magic tee 1014. One of the magic tee shunt arms 1016 is load terminated. The combined signal at the output 1018 of the other arm is followed by a variable phase shifter 1020 and variable attenuator 1022, which is coupled to a feed manifold 1024, such as the feed manifold described above. That is, the radiator output is coupled to the variable phase shifter.

It is understood that linearly polarized electric field components of CP plane waves are temporally out of phase by 90 degrees—one linear component either leads or lags the other by 90 electrical degrees. For a purely CP wave, the components have equal strength. Consequently, if one component is further delayed by 90 degrees, then the delayed component will be either in phase or out of phase, depending on CP handedness, and analog addition and subtraction of the signals is complete when introduced into a 180 degree hybrid combiner such as a magic tee. For example, if LHCP and RHCP signals are incident on the structure of FIG. 24, they are separated by addition and subtract such that the entire RHCP appears at the magic tee sum port and the entire LHCP signal appears at the magic tee difference port. When these are again summed in a magic tee, the transfer function of the component sends half (in power) of each signal into the sum and difference anus.

It is understood that it is known to sum coherent signals in magic tees to increase the power by field addition. When summing equiphase, equiamplitude signals in this type of device, the fields cancel in the difference port and add in the sum port. Cancellation of the field results in no power transfer, so all power is transferred to the sum arm. If now, the equiamplitude signals are antiphased, the converse is true.

In addition, if the signals do not share a carrier frequency, then half the power from each input is transferred to each output, and cancellation does not occur. Consequently, if two signals that do not share a carrier are combined in a magic tee, there is a loss of 3 dB for load terminating either the tee series or shunt port, but the combined signal at the available port remains representative of the total signal incident on the array aperture. Furthermore, since the magic tee operates on in-band thermal noise the same way that it operates on coherent signals, the inventive active radiator embodiments do not increase significantly system thermal noise. The inventive active radiator embodiments allow signals to be spatially filtered with their proper polarization response. If the incident signals share a carrier, but not a modulation, the responses can also be spatially filtered. If the signals share a carrier and arrive from the same point in space, they may separate by their modulation. Consequently, except where incident signals of mixed polarization share a carrier and arrive at the phased array aperture from the same point in space, the exemplary embodiments of the active radiator provide polarization filtering, such that multiple beams of one or two circular polarizations can be independently received though they arrive from different spatial angles. It is understood that this not reciprocal for the transmit function.

Figure 25A:
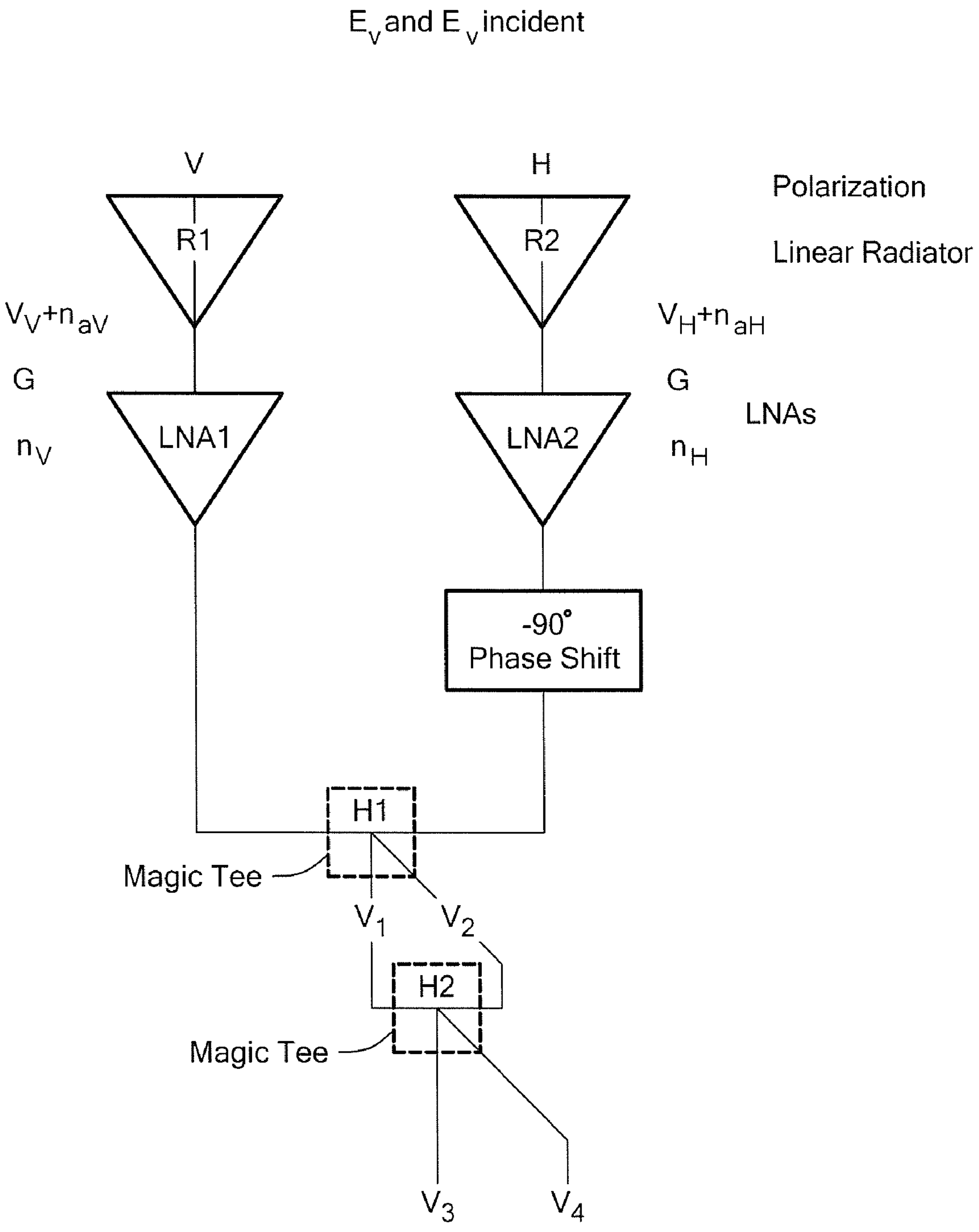
FIG. 25A is a schematic representation of an exemplary radiator.

As described above, exemplary embodiments of the radiator include a single port device that senses both left and right hand circularly polarized incident signals and sustains both when incorporated in a multibeam architecture, exemplary embodiments of which are described above. As shown in FIG. 25A, the radiator includes a pair of orthogonal linearly polarized radiators R1, R2, parallel low noise amplifiers LNA1, LNA2, a 90 degree fixed phase shifter PS, and first and second 180 degree hybrids H1, H2. As demonstrated below, the inventive radiator does not degrade system noise figure or temperature, though half the amplified incident signal is terminated in a loaded port.

At the aperture, cophasal orthogonal linearly polarized radiators R1, R2 are connected to a pair of low noise amplifiers (LNAs). Following one of the LNAs, the 90 degree phase shifter PS is inserted. The independent paths are combined in the collinear arms of a magic tee H1. The magic tee shunt and series arms are connected to collinear arms of a second magic tee H2. The output of either the shunt or series magic tee arms is selected as the radiator output and the unused port is terminated in a matched load.

It will be shown below that the single output receives either sense of circular polarization and that the noise figure of an Active Electronically Steered Array (AESA) incorporating the radiator is not degraded by the post amplification termination of half the signal.

Analysis of the Radiator

Referring again to FIG. 25A, incoming signals from a distant source having $E_V$ and $E_H$ components are incident on cophasal lossless linear radiators R1, R2. Signals incident on the LNAs LHA1, LNA2 include internal noise associated with the antenna at thermal equilibrium: the noise volt ages at the linear radiator, $n_{aV}$ and $n_{aH}$, are random in-band signals having rms values $kT_0B$, where k is Boltzmann's constant, $T_0$ is the ambient temperature of the antenna and B is the system instantaneous bandwidth. The composite signals and noises are amplified in LNAs having gain G and noise voltage outputs $n_V$ and $n_H$ [the assumption of equal amplifier gain does not alter the basic performance characteristics of the active radiator—the assumption merely simplifies the analysis]. For this analysis, all noise voltages are assumed to be uniformly distributed in amplitude and phase around zero means. A 90 degree phase shifter PS is associated with one of the inputs—in this case the horizontally polarized radiator. The amplified and phase shifted outputs are now combined in the magic tees H1, H2, as described above.

In this analysis, it is assumed that passive components (phase shifter, tees and lines) are lossless as such detail does not effect the primary characterizations of signal and noise performance.

Using the RF voltage definitions in FIG. 25A, the voltages at ports 1 and 2 are given by $$V_1 = \frac{\sqrt{G}}{\sqrt{2}}(V_V + n_{aV}) - j\frac{\sqrt{G}}{\sqrt{2}}(V_H + n_{aH}) + \frac{n_V - jn_V}{\sqrt{2}}$$

and $$V_2 = j\frac{\sqrt{G}}{\sqrt{2}}(V_V + n_{aV}) - \frac{\sqrt{G}}{\sqrt{2}}(V_H + n_{aH}) + \frac{n_V + jn_V}{\sqrt{2}}$$

The voltage at port 3 is then, $$V_3 = (1+j)\frac{\sqrt{G}}{2}\left[V_V - V_H + n_{aV} - n_{aH} + \frac{n_{aV} - n_{aH}}{\sqrt{G}}\right]$$

The relationship between coherent signals $V_V$ and $V_H$ should be noted at this point. For incident CP signals, $V_V$ and $V_H$ are in phase quadrature regardless of handedness, while for incident linearly polarized signals, the signal content at the port may go to zero. Hence, this radiator is not appropriate for reception of linearly polarized signals.

To incorporate the active radiator into an array, port 4 is load terminated and a phase shifter/attenuator is placed at port 3. Without loss of generality, we can assume the phase shifter is set to 0 degrees and that the variable attenuators are set to achieve some prescribed illumination distribution for sidelobe control. Let the amplitude taper be defined such that the peak of the distribution is unity. The output of an array of N active radiators is then $$V_{array} = \sum_{n=1}^{N} w_n V_{3_n}$$

$$= (1+j)\frac{\sqrt{G}}{2}\left[\begin{array}{c}\sum_{n=1}^{N} w_n(V_{V_n} - V_{H_n}) + \\ \sum_{n=1}^{N} w_n\left(n_{aV_n} - n_{aH_n} + \frac{n_{V_n} - n_{H_n}}{\sqrt{G}}\right)\end{array}\right]$$

where $w_n$ is the amplitude weight of the $n^{th}$ array element. The expected output of the array is then given as $$\overline{|V_{array}|^2} = \frac{G}{2}\left[\begin{array}{c}|V_V - V_H|^2\left(\sum_{n=1}^{N} w_n\right)^2 + \\ \left(\overline{n_{aV}^2} + \overline{n_{aH}^2} + \frac{\overline{n_V^2} + \overline{n_H^2}}{G}\right)\sum_{n=1}^{N} w_n^2\end{array}\right]$$

$$= \frac{G}{2}\sum_{n=1}^{N} w_n^2\left[\eta N|V_V - V_H|^2 + \overline{n_{aV}^2} + \overline{n_{aH}^2} + \frac{\overline{n_V^2} + \overline{n_H^2}}{G}\right]$$

where η is the illumination efficiency given by $$\eta = \frac{\left(\sum_{n=1}^{N} w_n\right)^2}{N\sum_{n=1}^{N} w_n^2}$$

and the vinculum over various quantities signifies the rms value over the array.

As the signal is amplified before combining, the signal to noise ratio (SNR) is defined independently for each polarization at the input to the aperture. Hence the input signal to noise ratio, $SNR_{in}$, is $N|V|^2/kT_0B$ where $T_0$ is the system ambient temperature and V is either $V_V$ or $V_H$.

The array output signal to noise ratio, $SNR_{out}$, is the ratio of signal to noise terms in square brackets in the expression for $\overline{|V_{array}|^2}$.

System noise figure is the ratio of input to output SNR, and is related to system noise temperature, $T_s$, by (see below)

$$F_s = (1 + T_s/T_0)/\eta$$

So with appropriate substitutions, $$T_s/T_0 = \frac{G(\overline{n_{aV}^2} + \overline{n_{aH}^2}) + \overline{n_V^2} + \overline{n_H^2}}{G2kT_0B} - 1$$

$$= \frac{\overline{n_V^2} + \overline{n_H^2}}{G2kT_0B}$$

Figure 25B:
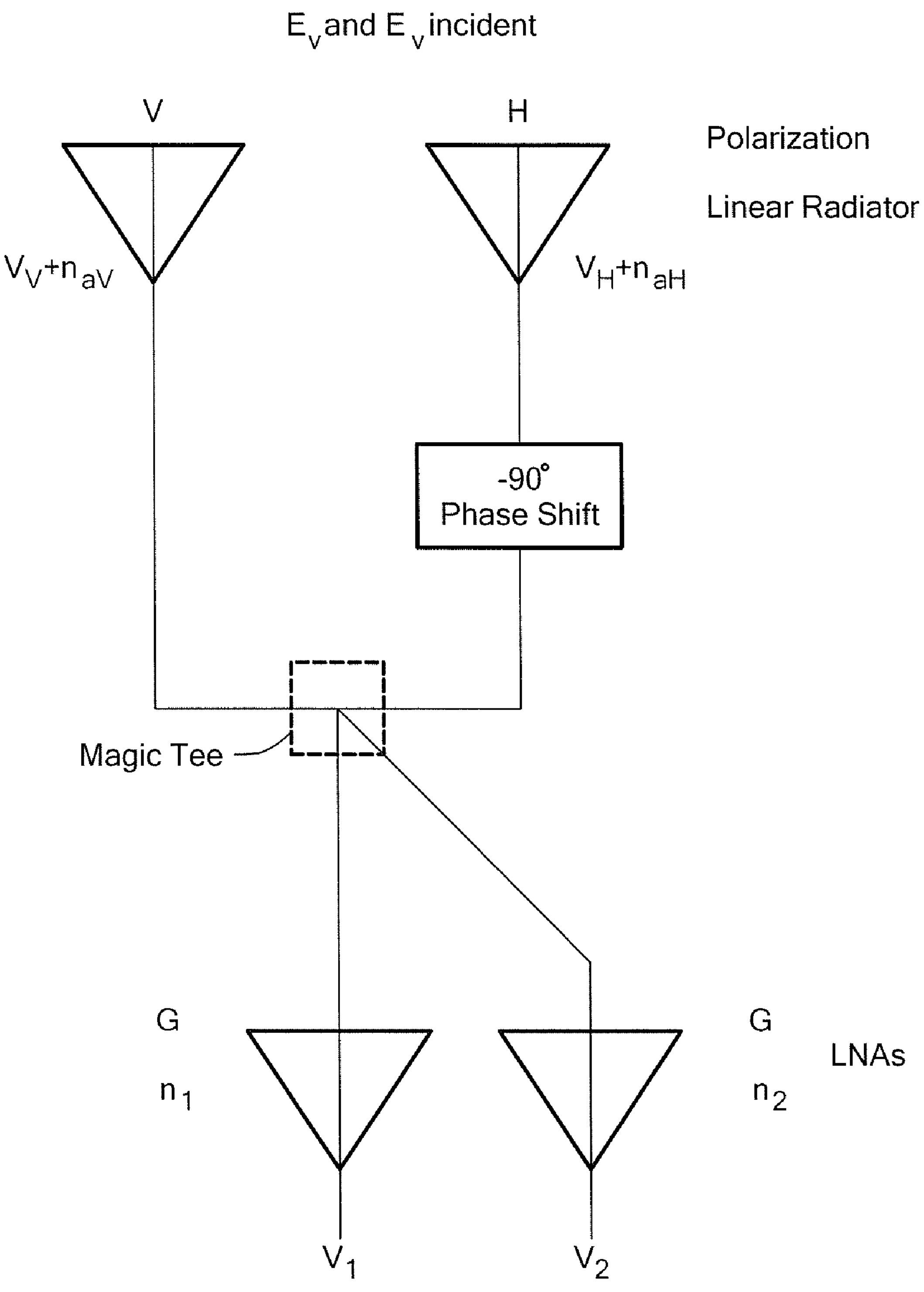
(PRIOR ART) FIG. 25B
FIG. 25B is a schematic representation of another radiator.

If we assume that the statistics of $n_V$ and $n_H$ are the same, then with the substitution $kT_0BG(F-1)$, where F is the LNA noise figure, for the LNA rms noise powers, the system noise temperature reduces to $T_s/T_0=(F-1)$ Consider now the conventional circuit shown in FIG. 25B in which the LNAs are placed at the series and shunt ports of the first magic tee and the second magic tee is removed. This is the conventional method of achieving dual circular polarization. At the outputs of the alternate active element, the voltages are $$V_1 = \frac{\sqrt{G}}{\sqrt{2}}(V_V + n_{aV}) - j\frac{\sqrt{G}}{\sqrt{2}}(V_H + n_{aH}) + n_1$$

and $$V_2 = j\frac{\sqrt{G}}{\sqrt{2}}(V_V + n_{aV}) - \frac{\sqrt{G}}{\sqrt{2}}(V_H + n_{aH}) + n_2$$

Again, without loss of generality, line and component losses are taken to be zero. With a phase shifter and attenuator associated with each element output, the SNR at the aperture is now given by $N|V_V-jV_H|^2/2kT_0B$: the additional factor of two accounts for the independence of the noise generated by each linear radiator at thermal equilibrium. The total power output of the array at the port associated with polarization 1 is therefore, $$\overline{|V_{array}|^2} = \frac{G}{2}\left[|V_V - jV_H|^2\left(\sum_{n=1}^{N} w_n\right)^2 + \left(\overline{n_{aV}^2} + \overline{n_{aH}^2} + \frac{2\overline{n_1^2}}{G}\right)\sum_{n=1}^{N} w_n^2\right]$$
$$= \frac{G}{2}\sum_{n=1}^{N} w_n^2\left[\eta N|V_V - jV_H|^2 + \overline{n_{aV}^2} + \overline{n_{aH}^2} + \frac{2\overline{n_1^2}}{G}\right]$$

It is now straightforward to show that the system noise figure and system noise temperature are also given by $F_s=(1+T_s/T_0)/\eta$. And $T_s/T_0=(F-1)$ Because the inventive radiator maintains the system noise temperature of the more conventional dual circularly polarized radiator, and because the antenna aperture gain is not affected by post amplification signal attenuation, or in this case termination, the inventive radiator provides both senses of circular polarization simultaneously without loss of system figure of merit, G/T. Hence, the radiator can be incorporated in the multibeam architecture described above for achieving full aperture performance with multiple circularly polarized beams without inserting addition beam controls at the element level.

Noise Analysis for Active Combining Networks

Figure 25C:
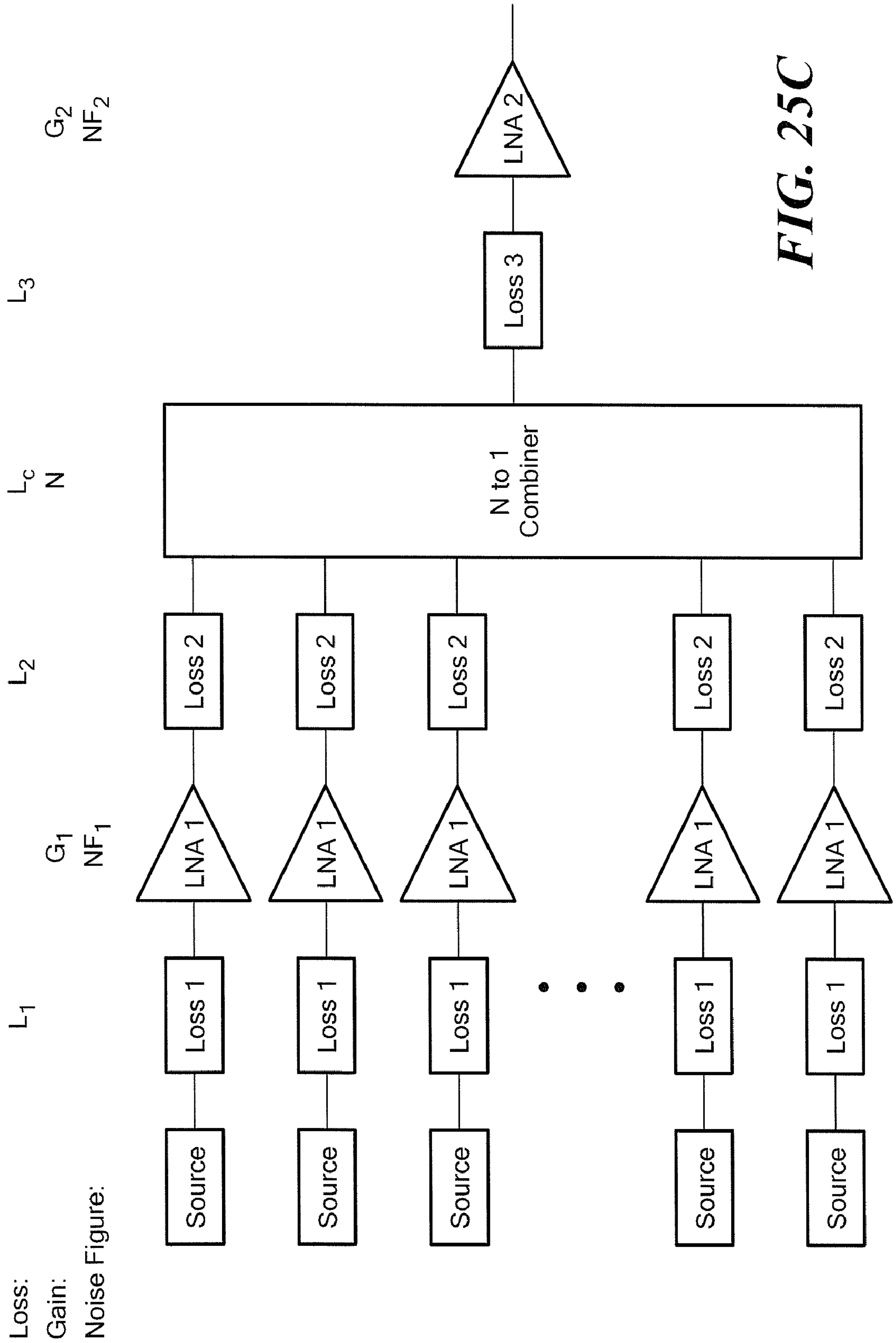
FIG. 25C is a schematic representation of an exemplary combining network.

FIG. 25C shows a general combining network with preamplification and internal losses. The sources are assumed identical, and to produce equal amplitude, equal phase outputs. The individual cascades of components are assumed to be statistically independent, but otherwise identical.

The output of each source is a signal, $s_o$. The system is assumed to be at thermal equilibrium (temperature $T_o$) and the signal is free of other noise contributions: the noise generated by each source is $kT_oB_n$ where k is Boltzmann's constant and $B_n$ is the noise bandwidth of the system. The noise voltage generated by the $i^{th}$ first loss (Loss 1) is defined as $n_{L1_i}$. The noise voltage generated by the $i^{th}$ second loss (Loss 2) is defined as $n_{L2_i}$. The noise voltage generated by the $i^{th}$ amplifier (LNA1) is defined as $n_{G1_i}$. The noise voltage generated by the N:1 combiner is defined as $n_{Lc_i}$. The noise voltage generated by Loss 3 is defined as $n_{L3_i}$. The noise voltage generated by the post-combiner amplifier (LNA2) is defined as $n_{G2}$. Then the total signals at outputs of the cascades (the inputs to the combiner) are given by $$S_i=\sqrt{G_1/(L_1*L_2)}*[s_o+\sqrt{L_1}*n_{L1_i}+\sqrt{(kT_oB_n)_i}]+n_{G1_i}/\sqrt{L_2}+n_{L2_i} \quad (1)$$

At the network output, the total signal is $$\Sigma=\sqrt{(G_2/L_3*L_c)}*\Sigma w_i*S_i+n_{G2}$$

Here the summation is over i=1, 2 . . . N, $w_i$ is the RF weight imposed on the $i^{th}$ cascade by the combining network or by variable attenuator and $n_{G2}$ is the noise voltage output of LNA 2. Note: the sum of the squared magnitudes of the weights is unity for both passive and active weighting (i.e, combiner loss and variable attenuator loss are embodied in $L_c$).

We assume that the noise processes are zero mean, and so, when we calculate the expected signal at the output of the active combiner, we obtain $$\overline{|\Sigma|^2}=(G_1*G_2/L_c*L_1*L_2*L_3)*\Sigma|w_i|^2*\{\eta*N*|s_o|^2+[kT_oB_n+L_1*|n_{L1}|^2+L_1*|n_{G1}|^2/G_1+L_1*L_2*|n_{L2}|^2/G_1+L_c*L_1*L_2*L_3*|n_{L3}|^2/G_1+L_c*L_1*L_2*L_3*|n_{G2}|^2/(G_1*G_2)+L_c*L_1*L_2*|n_{Lc}|^2/G_1]\} \quad (2)$$

where η is the efficiency ($0\leqq\eta\leqq1$) of the weighting distribution, $\eta=|\Sigma w_i|^2/(N*\Sigma|w_i|^2$, and $\Sigma|w_i|^2$ is shown explicitly even though its value is unity. In equation (2) the leading term in square braces is the rms noise power of one source, $|n_{G1}|^2$ is the rms noise power output of one LNA1 amplifier, $|n_{G2}|^2$ is the rms noise power output of amplifier LNA2, $|n_{L1}|^2$ is the rms noise power output of Loss 1, $|n_{L2}|^2$ is the noise power output of Loss 2, $|n_{L3}|^2$ is the noise power output of Loss 3 and $|n_{Lc}|^2$ is the noise power output associated with loss in the combiner.

System output noise power is then, $$P_{n_{out}} = \text{System Noise Power} \quad (3)$$
$$= kT_oB_n * \left\{\begin{array}{c} 1 + (L_1 - 1) + L_1 * (F_1 - 1) + L_1 * \\ (F_2 - 1) + \{L_c * L_1 * L_2 * (L_3 - 1)/G_1\} + \\ L_1 * L_2 * \frac{(L_c - 1)}{G_1} \end{array}\right\} * \left[\frac{G_1 * G_2}{(L_c * L_1 * L_2 * L_3)}\right]$$

where $F_1$ and $F_2$ are the noise figures of the two amplifiers. Note that only the loss of the combining network appears in the expression for total system noise. The equivalent system noise temperature is obtained from equation (3) by dividing by the product of overall-system available-power gain, $G_o$, and $kT_oB_n$, then subtracting 1.

The system noise temperature is defined as $P'_{n_{out}}/(G_o*k*B_n)$, where k is Boltzmann's constant, $B_n$ is the noise bandwidth of the system and $P'_{n_{out}}$ is the noise added by the system (in this instance, $P'_{n_{out}}=P_{n_{out}}-G_o*kT_oB_n$). The question of whether or not the combiner gain should be included in the system noise figure is related to this definition. If a signal is introduced at the source terminals of only the $i^{th}$ cascade, then, from equation (2), the output noise power terms are unchanged, while the total received signal level is reduced by a factor of $^{\sim}{}_1$ N. For this source configuration the signal-to-noise ratio degrades by 10 $\log_{10}$(N) dB because signal has been removed from the system while all internal noise sources have remained in place. But in a real system, in the absence of failures, all cascades are (roughly) equally excited and the reference is to the total incident power, not the power incident from a single source. By inspection of equation (2), the overall-system available-power gain is $G_1*G_2/(L_c*L_1*L_2*L_3)$, and the influence of the combining network on system noise temperature is seen to be in the ohmic loss term, $L_c$, an interior term in equation (3).

The system noise figure is defined as $F_s=SNR_{input}/SNR_{output}$

The signal-to-noise ratio at the input is just $N*|s_o|^2/kT_oB_n$, and the SNR at the output is $\eta*N*|s_o|^2/P_{n_{out}}$. Substitution into equation (4) produces $$F_s=(1+T_s/T_o)/\eta \quad (5)$$

By inspection, then, the system noise temperature is given as $$T_s = \left\{\begin{array}{c} (L_1 - 1) + L_1 * (F_1 - 1) + L_1 * \frac{(L_2 - 1)}{G_1} + \\ \left[\frac{(L_c * L_1 * L_2 * L_3)}{G_1}\right] * (F_2 - 1) + \\ \left\{L_c * L_1 * L_2 * \frac{(L_3 - 1)}{G_1}\right\} + L_1 * L_2 * \frac{(L_c - 1)}{G_1} \end{array}\right\} * T_o \quad (6)$$

As an example, let $L_1$=1.85 dB, $L_2$=10.35 dB, $L_3$=0.25 dB, $L_c$=2.0 dB, N=8, $G_1$=24 dB, $F_1$=4 dB, $G_2$=20 dB and $F_2$=6.3 dB. With these variable values, equation (5) produces $F_s$=6.35 dB and equation (6) produces $T_s=3.313*T_o$. The value of $\eta$ is presently assumed to be unity.

FIGS. 26-45 show analysis for an exemplary system realizing four independent beams form a single aperture where each element in the aperture has a single set of amplitude/phase controls. Using superposition of control commands and novel combining/rf distribution network and command algorithms, a passive RF network can be provided to support multiple beam generation at same and different frequencies on either transmit or receive. If an active aperture configuration is assumed, as shown above, then devices must operate in their linear ranges.

It has been determined in the analysis that increasing the number of independent beams requires that the spacing between elements be reduced to eliminate pattern artifacts related to incipient small subarray grating lobes. In one embodiment, 0.5 wavelength spacing works for two beams, 0.4 wavelength spacing works for three beams and 0.25 wavelength spacing works for four beams. However, a variety of other beam spacings can be provided to meet the needs of a particular application. It is currently believed by the inventor that more than four independent beams is not practical.

The following discussion illustrates receive set-up, but is readily extended to transmit set-up. In general, the command for one beam is formed in the usual manner, resulting in a formed beam at the straight combiner output (FIG. 12). The commands for the other beams are also formed in the usual manner, but correction phase terms are added to elements such that, depending on the beam to be exercised, adjacent elements, rows of elements and columns of elements are substantially out of phase. The multiple commands are linearly superimposed to provide a single complex command for each phase center. The commands are realized in variable phase shifters and variable attenuators, though the primary contribution is from phase control. The correction for amplitude cleans the pattern up—beam directive gain and illumination efficiency improve.

FIG. 26A includes polar and azimuth steering angles for four beams and exemplary operating frequencies. Aperture lengths in x and y coordinates are also shown with exemplary element spacing. FIG. 26B shows an exemplary number of rows and columns and positions. Since space coordinates for beams 1, 2, and 3 are also shown.

FIG. 27 shows an exemplary representation of phase commands for beams 1-4 and linear superposition of the phase commands to generate complete phase command by controlling the variable phase shifters. An exemplary representation to remove amplitude variation from the superposition by controlling the variable attenuators is also shown.

Figure 30:
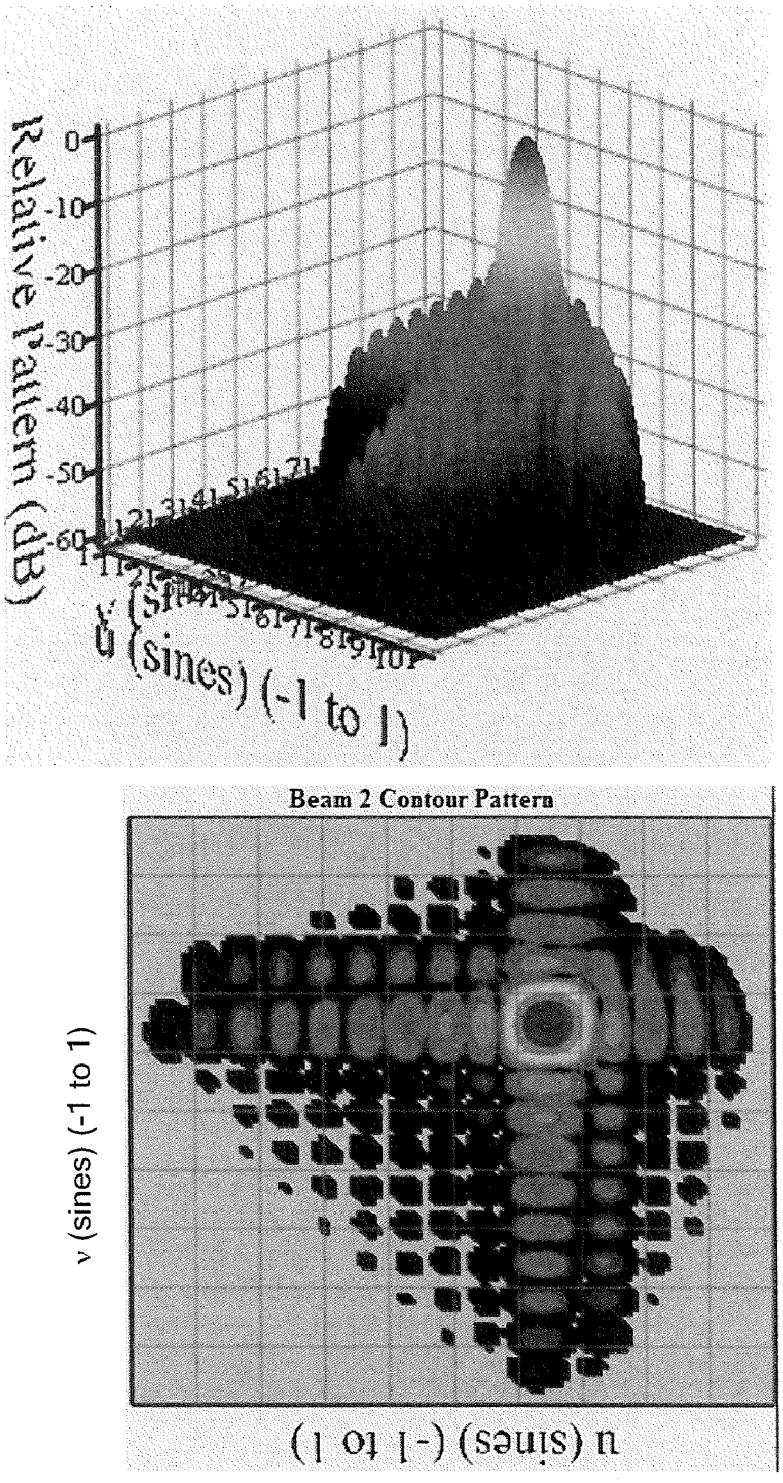
FIG. 30 shows the beam 2 pattern and contour.
Figure 32:
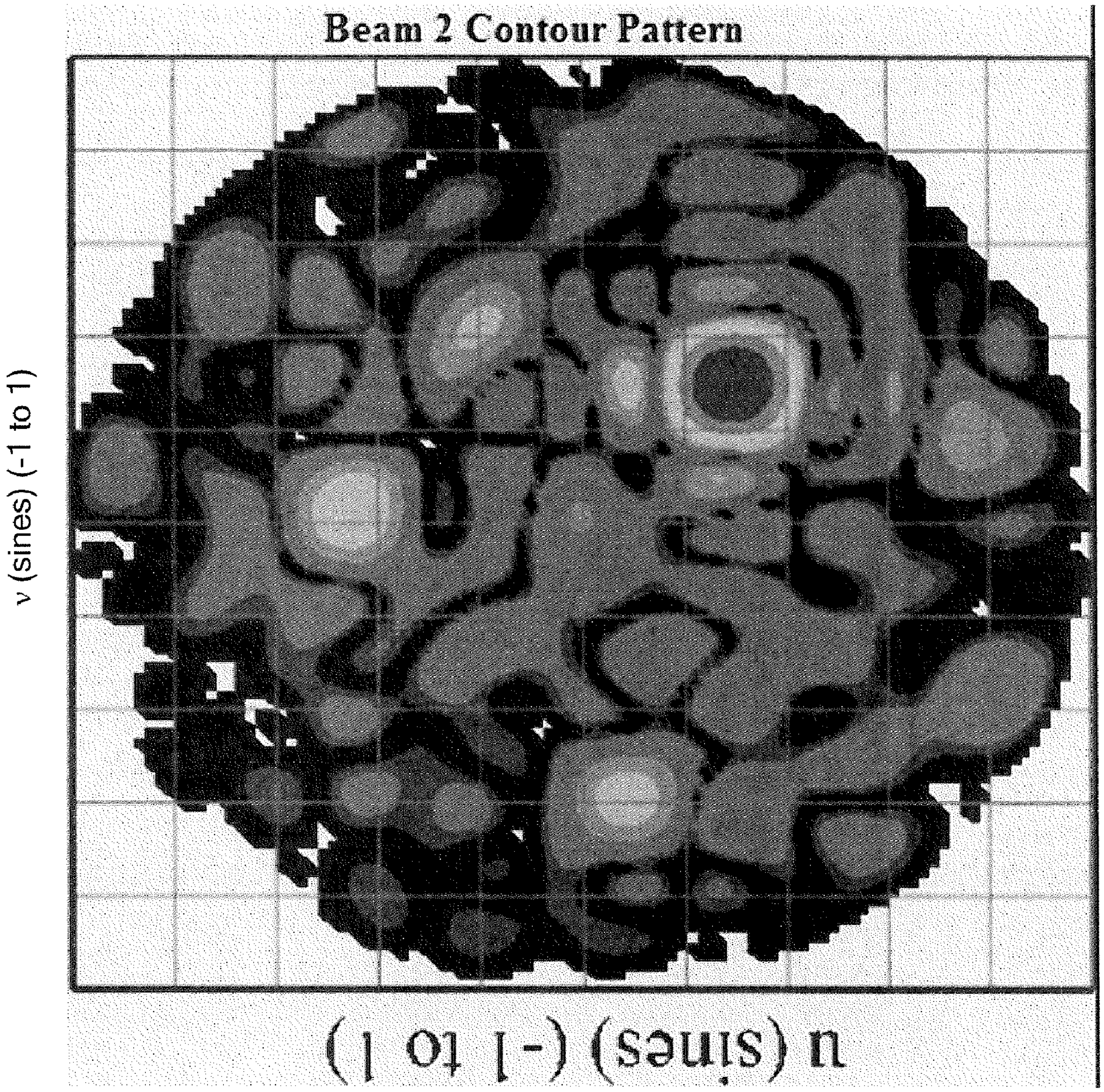
FIG. 32 shows the beam 2 contour pattern discarding amplitude variation of superposition.

FIG. 28 shows an exemplary Gaussian illumination and FIG. 29 shows an exemplary representation of the beam 2 pattern and efficiency. FIG. 30 shows the beam 2 pattern and contour. FIG. 31 shows beam 2 directivity. FIG. 32 shows the beam 2 contour pattern discarding amplitude variation of superposition.

Figure 35:
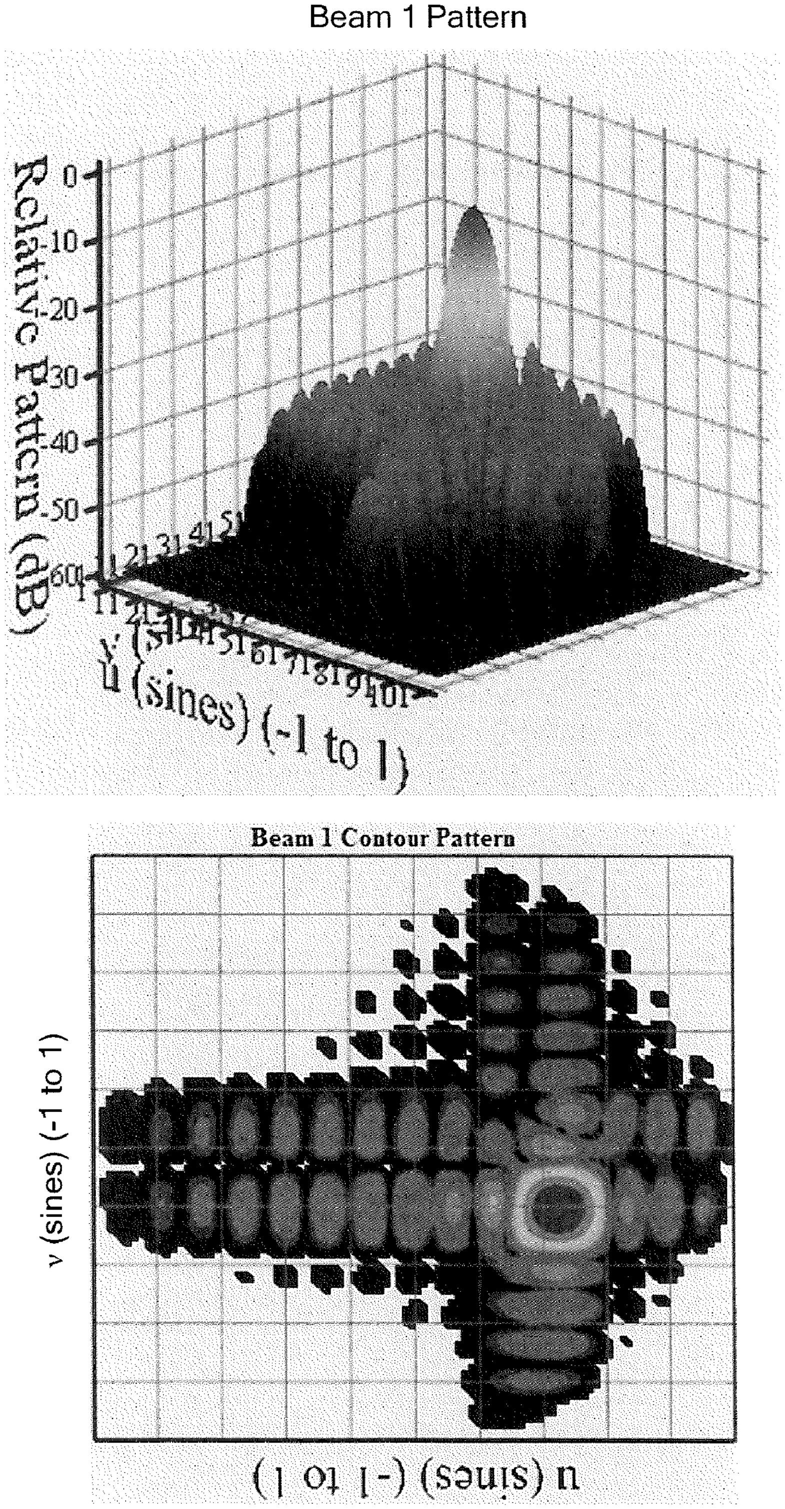
FIG. 35 shows the beam 1 pattern and contour.
Figure 37:
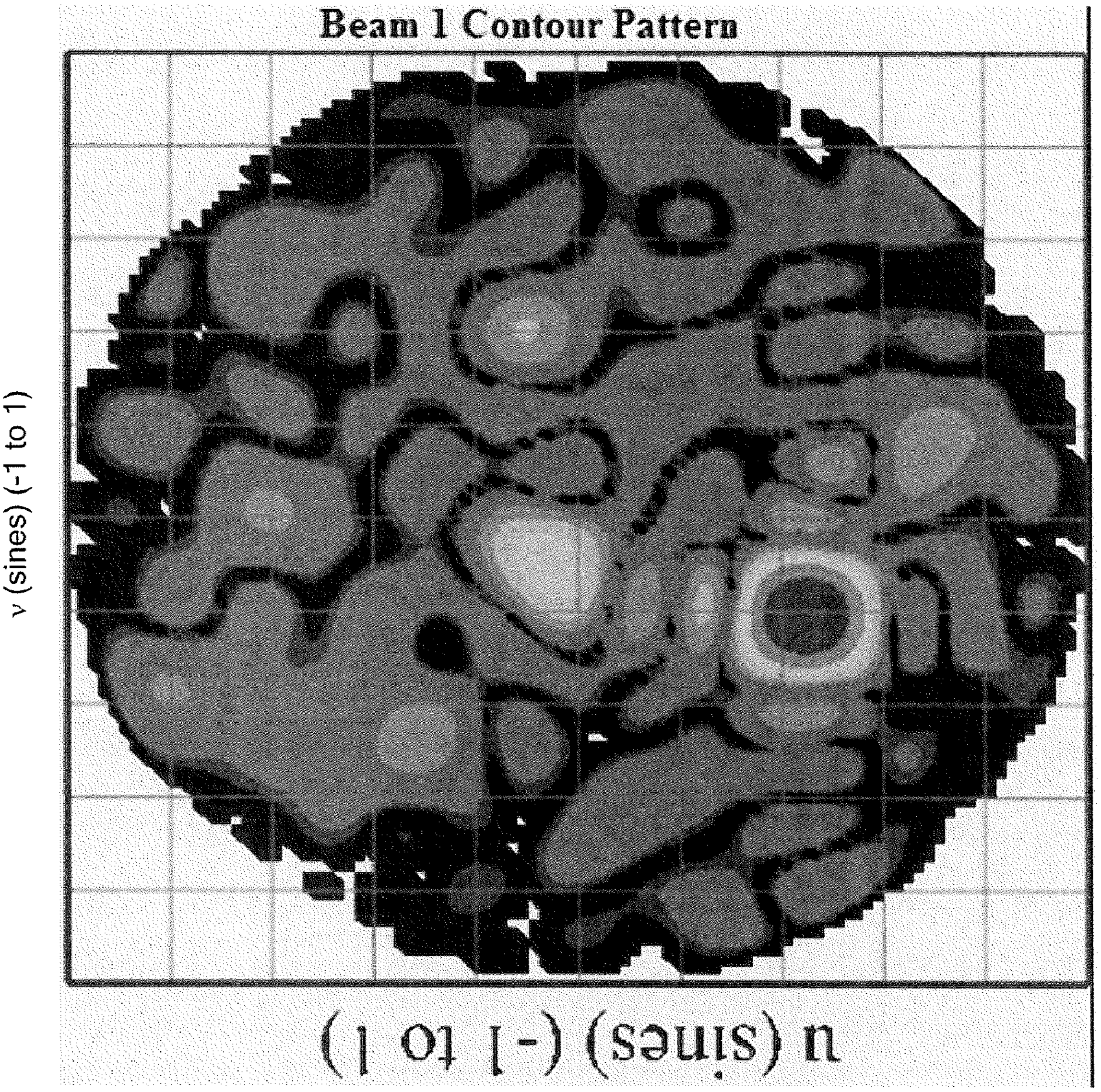
FIG. 37 shows the beam 1 contour pattern discarding amplitude variation from superposition.

FIG. 33 shows indices and observations in sine space and FIG. 34 shows beam 1 pattern and a correction phase term for beam 1. FIG. 35 shows the beam 1 pattern and contour and FIG. 36 shows beam 1 directivity. FIG. 37 shows the beam 1 contour pattern discarding amplitude variation from superposition.

Figure 39:
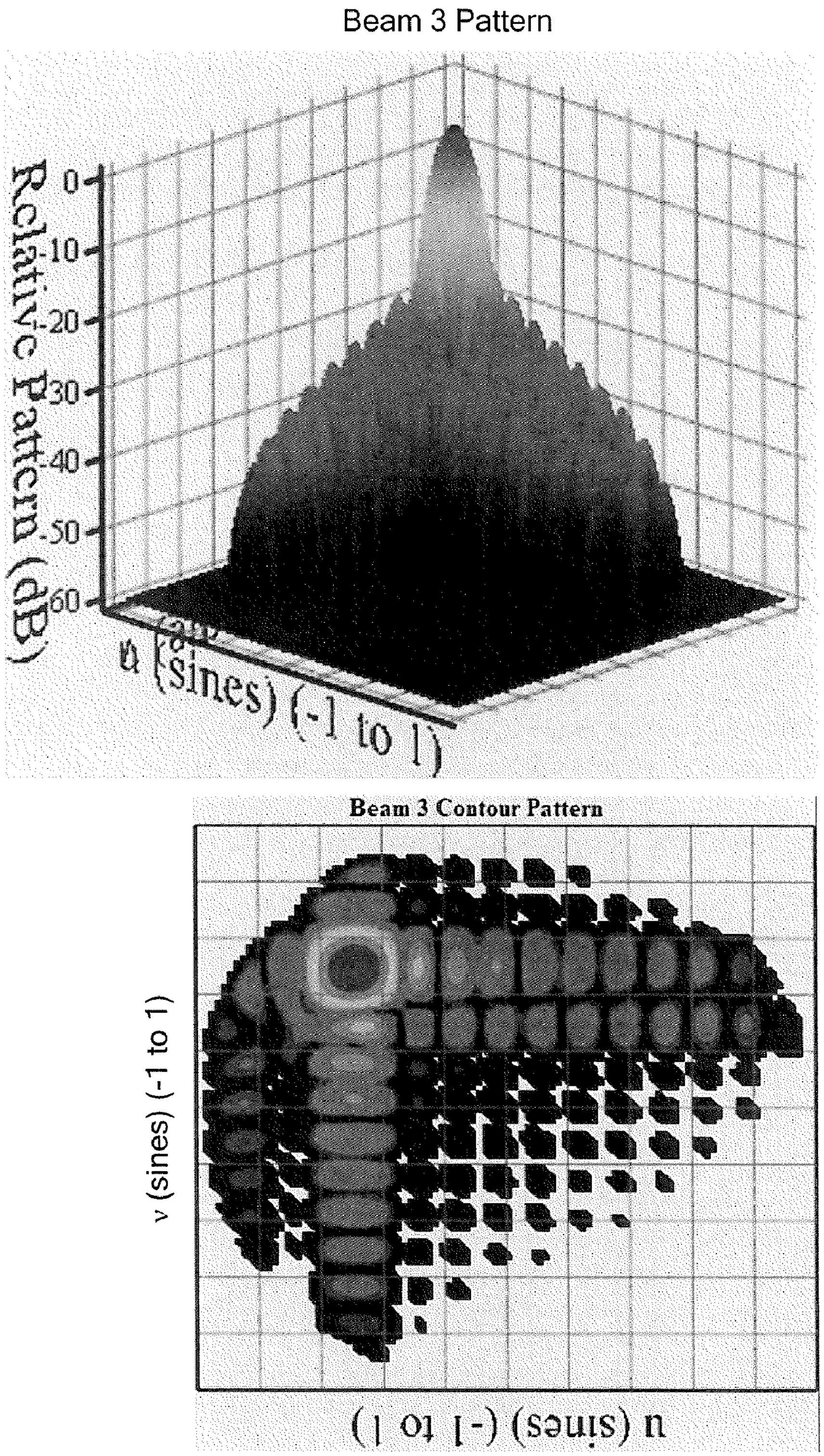
FIG. 39 shows the beam 3 pattern and contour.
Figure 41:
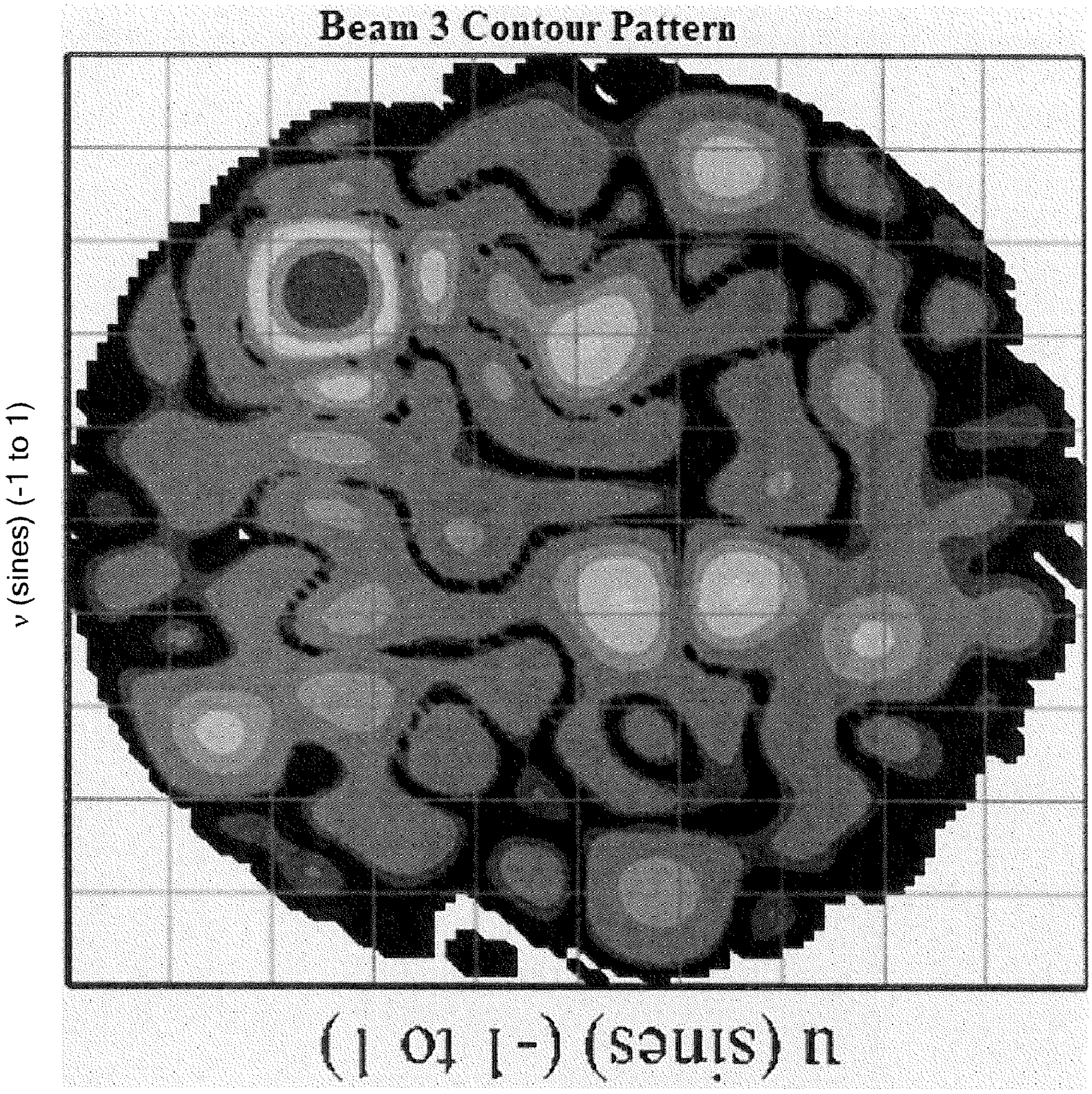
FIG. 41 shows the beam 3 contour pattern discarding amplitude variation from superposition.

FIG. 38 shows a representation of the beam 3 pattern and phase correction. FIG. 39 shows the beam 3 pattern and contour and FIG. 40 shows beam 3 directivity. FIG. 41 shows the beam 3 contour pattern discarding amplitude variation from superposition.

Figure 43:
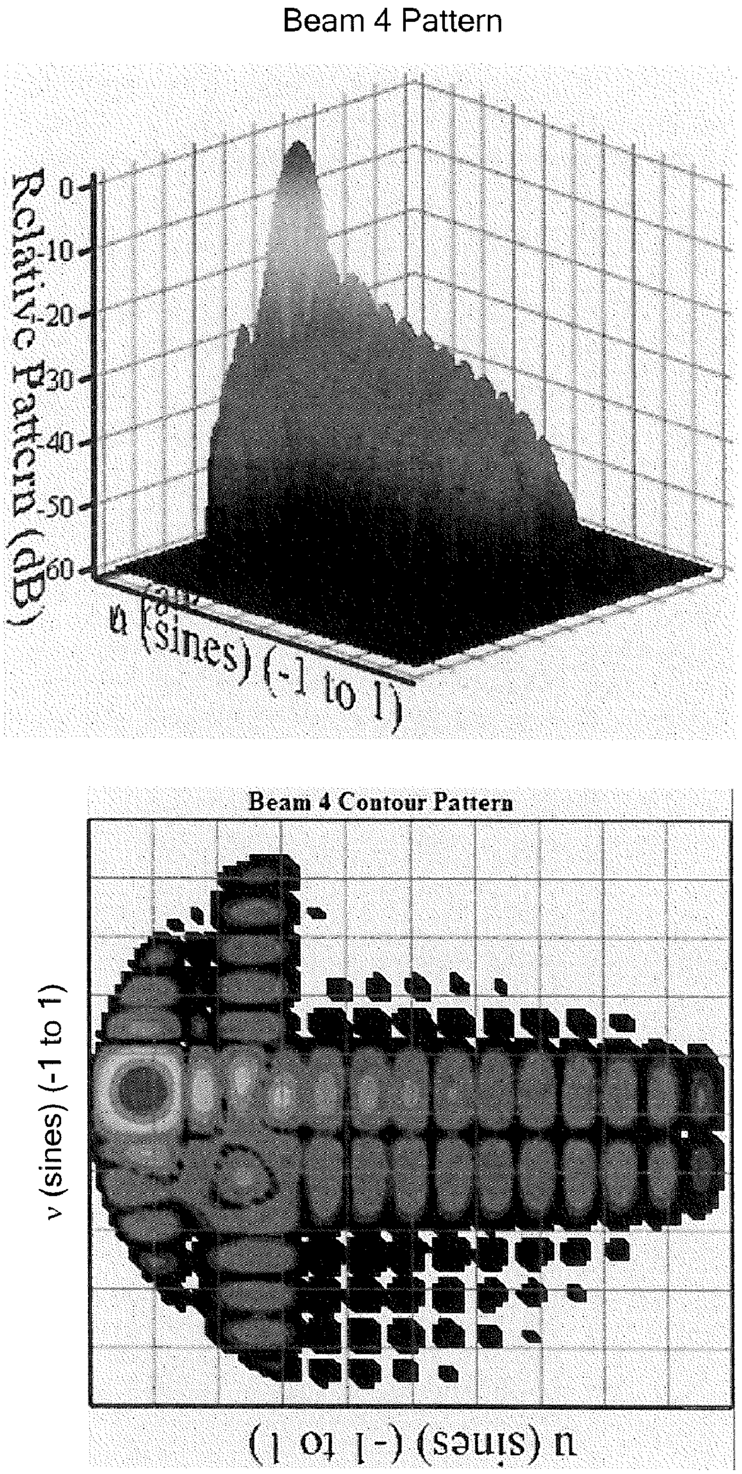
FIG. 43 shows the beam 4 pattern and contour.
Figure 45:
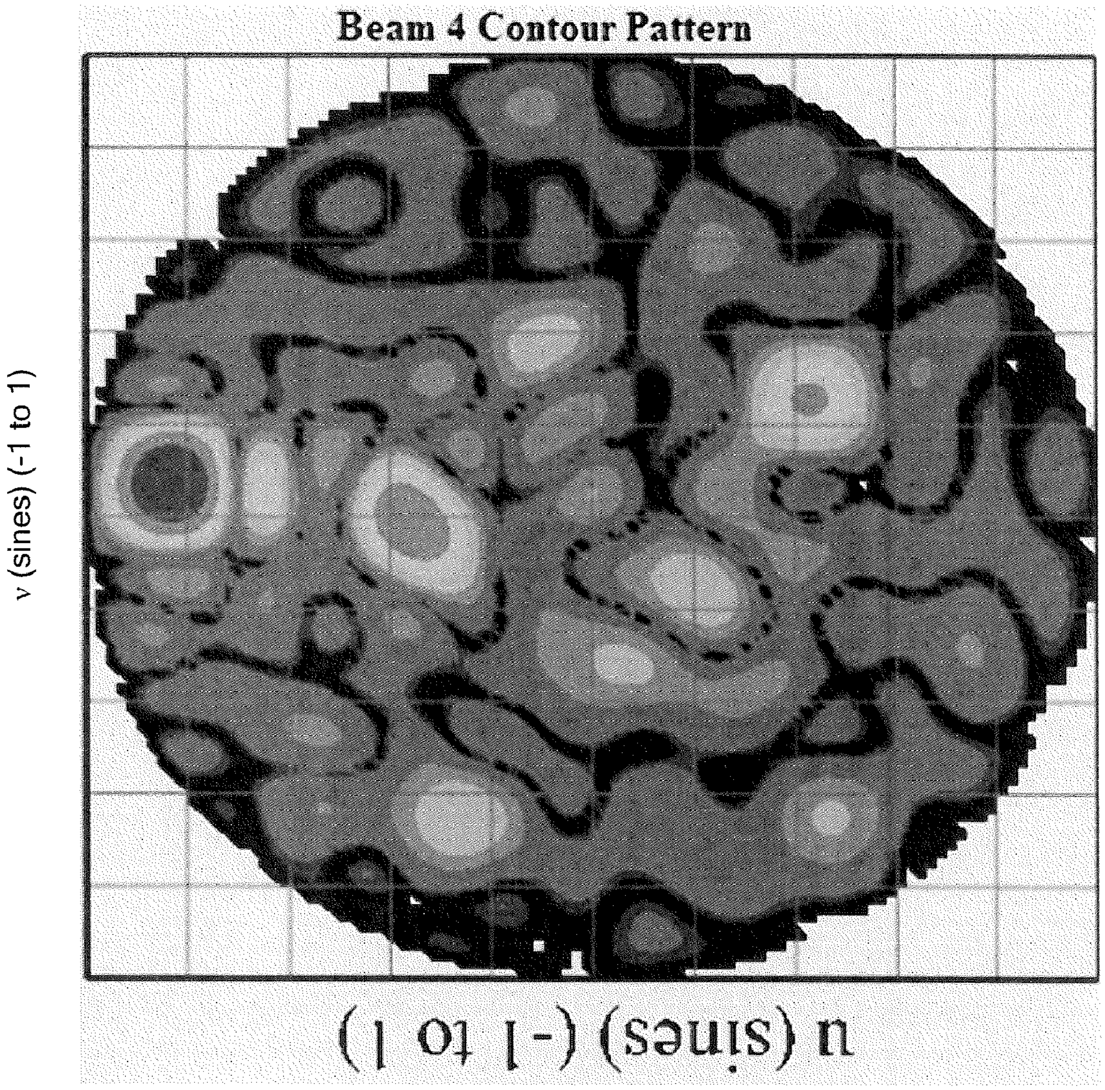
FIG. 45 shows the beam 4 contour pattern discarding amplitude variation from superposition.

FIG. 42 shows a representation of the bean 4 pattern and phase correction term. FIG. 43 shows the beam 4 pattern and contour and FIG. 44 shows beam 4 directivity. FIG. 45 shows the beam 4 contour pattern discarding amplitude variation from superposition.

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A receive electronically steered array aperture, comprising:

an active array element comprising:

- a co-phasal, dual-linear radiator having a first radiator element with a first linear polarization and a second radiator element with a second linear polarization that is orthogonal to the first linear polarization;
- a first low noise amplifier (LNA) having an input and an output, wherein the input of said first LNA is coupled to receive a signal from said first radiator element;
- a second LNA having an input and an output, wherein the input of the second LNA is coupled to receive a signal from the second radiator element;
- a 90 degree phase-shifter having an input and an output, the input of the 90 degree phase-shifter being coupled to receive a signal from the output of the second LNA;
- a first 180 degree hybrid device having first and second input ports, a sum port, and a delta port, the first input port of the first 180 degree hybrid device being coupled to receive a signal from the output of the first LNA and the second input port of the first 180 degree hybrid being coupled to receive a signal from the output of the 90 degree phase-shifter;
- a second 180 degree hybrid device having first and second input ports, a sum port, and a delta port, the first input port of the second 180 degree hybrid device being coupled to receive a signal from the sum port of the first 180 degree hybrid device and the second input port of the second 180 degree hybrid device being coupled to receive a signal from the delta port of the first 180 degree hybrid device; and
- a variable phase shifter to shift a phase of a signal received from the sum port of the second 180 degree hybrid device.

2. The aperture according to claim 1, further including a feed manifold coupled to receive a signal from the active array element.

3. The aperture according to claim 1, wherein the active array element further includes a variable attenuator coupled in series with the variable phase shifter.

4. The aperture according to claim 1, wherein the first 180 degree hybrid device comprises a magic tee.

5. The aperture according to claim 1, wherein the delta port of the second 180 degree hybrid device is load terminated.

6. The aperture according to claim 1, wherein the co-phasal, dual-linear radiator comprises a quad notch radiator.

7. A method, comprising:

concurrently receiving a right hand circularly polarized signal and a left hand circularly polarized signal at a co-phasal, dual-linear radiator having a first radiator element with a first linear polarization and a second radiator element with a second linear polarization that is orthogonal to the first linear polarization;

amplifying a signal received at the first radiator element in a first low noise amplifier (LNA) to generate a first amplified signal;

amplifying a signal received at the second radiator element in a second low noise amplifier (LNA) to generate a second amplified signal;

shifting a phase of the second amplified signal by 90 degrees to generate a phase shifted second amplified signal;

applying the first amplified signal to a first input port of a first 180 degree hybrid device;

applying the phase shifted second amplified signal to a second input port of the first 180 degree hybrid device;

applying a sum signal at a sum port of the first 180 degree hybrid device to a first input port of a second 180 degree hybrid device;

applying a difference signal at a delta port of the first 180 degree hybrid device to a second input port of the second 180 degree hybrid device, wherein the sum port and the delta port of the second 180 degree hybrid device will output substantially equal power portions of the left hand circularly polarized signal and substantially equal power portions of the right hand circularly polarized signal; and applying a signal received from either the sum port or the delta port of the second 180 degree hybrid device to a variable phase shifter to generate a phase shifted signal.

8. The method according to claim 7, further including:

applying the phase shifted signal to a feed manifold.

9. The method according to claim 7, further comprising:

applying the phase shifted signal to a variable attenuator.

10. The method according to claim 7, wherein the first 180 degree hybrid device comprises a magic tee.

11. The method according to claim 7, wherein the delta port of the second 180 degree hybrid device is load terminated.

12. The method according to claim 7, wherein the co-phasal, dual-linear radiator comprises a quad notch radiator.

13. A receive electronically steered array aperture, comprising:

a plurality of active array elements, wherein at least some of the active array elements in said plurality of active array elements include:

a co-phasal, dual-linear radiator having a first radiator element with a first linear polarization and a second radiator element with a second linear polarization that is orthogonal to the first linear polarization; and a single complex phase/amplitude control at a radiating phase center of the co-phasal, dual-linear radiator; and a feed manifold coupled to said plurality of active array elements;

wherein said receive electronically steered array aperture is capable of simultaneously receiving up to four circularly polarized plane waves, each of the plane waves being arbitrarily of left hand circular polarization or right hand circular polarization, from spatially diverse sources.

14. The aperture according to claim 2, further including:

a plurality of additional active array elements, each additional active array element including:

a co-phasal, dual-linear radiator having a first radiator element with a first linear polarization and a second radiator element with a second linear polarization that is orthogonal to the first linear polarization;

a first low noise amplifier (LNA) having an input and an output, wherein the input of said first LNA is coupled to receive a signal from said first radiator element;

a second LNA having an input and an output, wherein the input of the second LNA is coupled to receive a signal from the second radiator element;

a 90 degree phase-shifter having an input and an output, the input of the 90 degree phase-shifter being coupled to receive a signal from the output of the second LNA;

a first 180 degree hybrid device having first and second input ports, a sum port, and a delta port, the first input port of the first 180 degree hybrid device being coupled to receive a signal from the output of the first LNA and the second input port of the first 180 degree hybrid being coupled to receive a signal from the output of the 90 degree phase-shifter;

a second 180 degree hybrid device having first and second input ports, a sum port, and a delta port, the first input port of the second 180 degree hybrid device being coupled to receive a signal from the sum port of the first 180 degree hybrid device and the second input port of the second 180 degree hybrid device being coupled to receive a signal from the delta port of the first 180 degree hybrid device; and a variable phase shifter coupled to shift a phase of a signal received from the sum port of the second 180 degree hybrid device;

wherein said plurality of additional active array elements is coupled to said feed manifold.

* * * * *